United States Patent
Kaner et al.

(10) Patent No.: US 10,622,163 B2
(45) Date of Patent: Apr. 14, 2020

(54) DIRECT GROWTH OF POLYANILINE NANOTUBES ON CARBON CLOTH FOR FLEXIBLE AND HIGH-PERFORMANCE SUPERCAPACITORS

(71) Applicant: The Regents of the University of California, Oakland, CA (US)

(72) Inventors: Richard B. Kaner, Pacific Palisades, CA (US); Maher F. El-Kady, Los Angeles, CA (US); Mir Fazlollah Mousavi, Tehran (IR); Masumeh Hashemi, Tehran (IR); Mohammad S. Rahmanifar, Tehran (IR)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/472,409

(22) Filed: Mar. 29, 2017

(65) Prior Publication Data
US 2017/0287650 A1     Oct. 5, 2017

Related U.S. Application Data
(60) Provisional application No. 62/317,120, filed on Apr. 1, 2016.

(51) Int. Cl.
*H01G 11/36* (2013.01)
*H01G 11/40* (2013.01)
(Continued)

(52) U.S. Cl.
CPC ............. *H01G 11/36* (2013.01); *H01G 11/02* (2013.01); *H01G 11/40* (2013.01); *H01G 11/48* (2013.01);
(Continued)

(58) Field of Classification Search
CPC ........ H01G 11/36; H01G 11/40; H01G 11/42; H01G 11/54; H01G 11/56; H01G 11/66; H01G 11/86
See application file for complete search history.

(56) References Cited

U.S. PATENT DOCUMENTS

| 2,800,616 A | 7/1957 | Becker |
| 3,288,641 A | 11/1966 | Rightmire |

(Continued)

FOREIGN PATENT DOCUMENTS

| CN | 100372035 C | 2/2008 |
| CN | 101723310 A | 6/2010 |

(Continued)

OTHER PUBLICATIONS

Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.

(Continued)

*Primary Examiner* — Nguyen T Ha
(74) *Attorney, Agent, or Firm* — Withrow & Terranova, P.L.L.C.

(57) ABSTRACT

The present disclosure further provides an exemplary energy storage device fabricated from rectangular-tube polyaniline (PANI) that is chemically synthesized by a simple and convenient method. The rectangular-tube PANI, as an active material, is synthesized on a functionalized carbon cloth (FCC) as a substrate, and the obtained composite is immobilized on a stainless steel mesh as a current collector. The present disclosure additionally presents a facile technique for the direct synthesis of PANI nanotubes, with rectangular pores, on chemically activated CC.

34 Claims, 28 Drawing Sheets

(51) Int. Cl.
    *H01G 11/48* (2013.01)
    *H01G 11/86* (2013.01)
    *H01G 11/02* (2013.01)
    *H01G 11/70* (2013.01)

(52) U.S. Cl.
    CPC .......... *H01G 11/70* (2013.01); *H01G 11/86* (2013.01); *Y02E 60/13* (2013.01); *Y02T 10/7022* (2013.01)

(56) References Cited

U.S. PATENT DOCUMENTS

| | | | |
|---|---|---|---|
| 3,536,963 A | 10/1970 | Boos | |
| 3,652,902 A | 3/1972 | Hart et al. | |
| 5,225,296 A | 7/1993 | Ohsawa et al. | |
| 5,442,197 A | 8/1995 | Andrieu et al. | |
| 6,043,630 A | 3/2000 | Koenck et al. | |
| 6,117,585 A | 9/2000 | Anani et al. | |
| 6,451,074 B2 | 9/2002 | Bluvstein et al. | |
| 6,510,043 B1 | 1/2003 | Shiue et al. | |
| 6,522,522 B2 | 2/2003 | Yu et al. | |
| 6,982,517 B2 | 1/2006 | Reineke et al. | |
| 7,623,340 B1 | 11/2009 | Song et al. | |
| 7,875,219 B2 | 1/2011 | Zhamu et al. | |
| 8,315,039 B2 | 11/2012 | Zhamu et al. | |
| 8,503,161 B1 | 8/2013 | Chang et al. | |
| 8,593,714 B2* | 11/2013 | Agrawal | G02F 1/15 359/265 |
| 8,753,772 B2 | 6/2014 | Liu et al. | |
| 8,771,630 B2 | 7/2014 | Wu et al. | |
| 8,828,608 B2 | 9/2014 | Sun et al. | |
| 8,906,495 B2* | 12/2014 | Chen | B82Y 10/00 428/304.4 |
| 8,951,675 B2 | 2/2015 | Bhardwaj et al. | |
| 9,118,078 B2 | 8/2015 | Huang et al. | |
| 9,295,537 B2 | 3/2016 | Cao | |
| 9,437,372 B1 | 9/2016 | Zhamu et al. | |
| 2002/0136881 A1 | 9/2002 | Yanagisawa et al. | |
| 2002/0160257 A1 | 10/2002 | Lee et al. | |
| 2003/0013012 A1 | 1/2003 | Ahn et al. | |
| 2003/0169560 A1 | 9/2003 | Welsch et al. | |
| 2004/0090736 A1 | 5/2004 | Bendale et al. | |
| 2005/0153130 A1 | 7/2005 | Long et al. | |
| 2006/0121342 A1 | 6/2006 | Sano et al. | |
| 2006/0201801 A1 | 9/2006 | Bartlett et al. | |
| 2006/0207878 A1* | 9/2006 | Myung | G01N 33/5436 204/403.09 |
| 2006/0269834 A1 | 11/2006 | West et al. | |
| 2007/0172739 A1 | 7/2007 | Visco et al. | |
| 2007/0204447 A1 | 9/2007 | Bernstein et al. | |
| 2008/0090141 A1 | 4/2008 | Meitav et al. | |
| 2008/0158778 A1 | 7/2008 | Lipka et al. | |
| 2008/0180883 A1 | 7/2008 | Palusinski et al. | |
| 2008/0199737 A1 | 8/2008 | Kazaryan et al. | |
| 2008/0220293 A1 | 9/2008 | Marmaropoulos et al. | |
| 2009/0059474 A1 | 3/2009 | Zhamu et al. | |
| 2009/0117467 A1 | 5/2009 | Zhamu et al. | |
| 2009/0289328 A1 | 11/2009 | Tanioku | |
| 2010/0159346 A1 | 6/2010 | Hinago et al. | |
| 2010/0159366 A1 | 6/2010 | Shao-Horn et al. | |
| 2010/0195269 A1 | 8/2010 | Kim et al. | |
| 2010/0203362 A1 | 8/2010 | Lam et al. | |
| 2010/0221508 A1 | 9/2010 | Huang et al. | |
| 2010/0226066 A1 | 9/2010 | Sweeney et al. | |
| 2010/0237296 A1 | 9/2010 | Gilje | |
| 2010/0266964 A1 | 10/2010 | Gilje | |
| 2010/0273051 A1 | 10/2010 | Choi et al. | |
| 2010/0317790 A1 | 12/2010 | Jang et al. | |
| 2011/0026189 A1 | 2/2011 | Wei et al. | |
| 2011/0111283 A1 | 5/2011 | Rust, III et al. | |
| 2011/0111299 A1 | 5/2011 | Liu et al. | |
| 2011/0143101 A1 | 6/2011 | Sandhu | |
| 2011/0159372 A1 | 6/2011 | Zhamu et al. | |
| 2011/0163274 A1 | 7/2011 | Plee et al. | |
| 2011/0163699 A1 | 7/2011 | Elder et al. | |
| 2011/0183180 A1 | 7/2011 | Yu et al. | |
| 2011/0227000 A1 | 9/2011 | Ruoff et al. | |
| 2011/0256454 A1 | 10/2011 | Nicolas et al. | |
| 2011/0318257 A1 | 12/2011 | Sokolov et al. | |
| 2012/0111730 A1* | 5/2012 | Choi | C25D 9/04 205/161 |
| 2012/0129736 A1 | 5/2012 | Tour et al. | |
| 2012/0134072 A1 | 5/2012 | Bae et al. | |
| 2012/0145234 A1 | 6/2012 | Roy-Mayhew et al. | |
| 2012/0300364 A1 | 11/2012 | Cai et al. | |
| 2012/0313591 A1* | 12/2012 | Brambilla | B82Y 30/00 320/166 |
| 2013/0026409 A1 | 1/2013 | Baker et al. | |
| 2013/0048949 A1 | 2/2013 | Xia et al. | |
| 2013/0056346 A1 | 3/2013 | Sundara et al. | |
| 2013/0056703 A1 | 3/2013 | Elian et al. | |
| 2013/0100581 A1 | 4/2013 | Jung et al. | |
| 2013/0161570 A1 | 6/2013 | Hwang et al. | |
| 2013/0168611 A1 | 7/2013 | Zhou et al. | |
| 2013/0180912 A1 | 7/2013 | Li | |
| 2013/0182373 A1 | 7/2013 | Yu et al. | |
| 2013/0189602 A1 | 7/2013 | Lahiri et al. | |
| 2013/0217289 A1 | 8/2013 | Nayfeh et al. | |
| 2013/0264041 A1 | 10/2013 | Zhamu et al. | |
| 2013/0266858 A1 | 10/2013 | Inoue et al. | |
| 2013/0280601 A1 | 10/2013 | Geramita et al. | |
| 2013/0314844 A1 | 11/2013 | Chen et al. | |
| 2013/0330617 A1 | 12/2013 | Yoshimura et al. | |
| 2014/0029161 A1 | 1/2014 | Beidaghi et al. | |
| 2014/0030590 A1 | 1/2014 | Wang et al. | |
| 2014/0045058 A1 | 2/2014 | Zhao et al. | |
| 2014/0065447 A1* | 3/2014 | Liu | H01M 4/131 429/7 |
| 2014/0118883 A1 | 5/2014 | Xie | |
| 2014/0120453 A1 | 5/2014 | Ajayan et al. | |
| 2014/0154164 A1 | 6/2014 | Chen et al. | |
| 2014/0178763 A1 | 6/2014 | Mettan | |
| 2014/0205841 A1 | 7/2014 | Qui et al. | |
| 2014/0255776 A1 | 9/2014 | Song et al. | |
| 2014/0287308 A1 | 9/2014 | Okada et al. | |
| 2014/0313636 A1 | 10/2014 | Tour et al. | |
| 2014/0323596 A1 | 10/2014 | Jeong et al. | |
| 2015/0098167 A1 | 4/2015 | El-Kady et al. | |
| 2015/0103469 A1 | 4/2015 | Lee et al. | |
| 2015/0111449 A1 | 4/2015 | Cruz-Silva et al. | |
| 2015/0218002 A1 | 8/2015 | Plomb et al. | |
| 2015/0235776 A1 | 8/2015 | Miller | |
| 2015/0259212 A1 | 9/2015 | Li et al. | |
| 2015/0287544 A1* | 10/2015 | Irazoqui | H01G 11/36 361/502 |
| 2015/0332868 A1 | 11/2015 | Jung et al. | |
| 2015/0364738 A1 | 12/2015 | Pope et al. | |
| 2015/0364755 A1 | 12/2015 | Liu et al. | |
| 2016/0035498 A1* | 2/2016 | Honma | H01G 11/32 361/502 |
| 2016/0055983 A1 | 2/2016 | Kurungot et al. | |
| 2016/0077074 A1 | 3/2016 | Strong et al. | |
| 2016/0099116 A1 | 4/2016 | Yang | |
| 2016/0133396 A1 | 5/2016 | Hsieh | |
| 2016/0148759 A1 | 5/2016 | El-Kady et al. | |
| 2017/0338472 A1 | 11/2017 | Zhamu et al. | |

FOREIGN PATENT DOCUMENTS

| | | |
|---|---|---|
| CN | 101894679 A | 11/2010 |
| CN | 102543483 A | 7/2012 |
| CN | 102923698 A | 2/2013 |
| CN | 103723715 A | 4/2014 |
| CN | 203631326 U | 6/2014 |
| CN | 203839212 U | 9/2014 |
| CN | 104299794 A | 1/2015 |
| CN | 104355306 A | 2/2015 |
| CN | 104617300 A | 5/2015 |
| CN | 104637694 A | 5/2015 |
| EP | 1843362 A1 | 10/2007 |
| EP | 2088637 A2 | 8/2009 |
| JP | S61010855 A | 1/1986 |
| JP | S62287568 A | 12/1987 |

(56) References Cited

FOREIGN PATENT DOCUMENTS

| | | |
|---|---|---|
| JP | 2002063894 A | 2/2002 |
| JP | 2003217575 A | 7/2003 |
| JP | 2004039491 A | 2/2004 |
| JP | 2004055541 A | 2/2004 |
| JP | 2004063297 A | 2/2004 |
| JP | 2005138204 A | 6/2005 |
| JP | 20050317902 A | 11/2005 |
| JP | 2006252902 A | 9/2006 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2013534686 A | 9/2013 |
| JP | 2014053209 A | 3/2014 |
| KR | 20070083691 A | 8/2007 |
| KR | 10-2009-0107498 A | 10/2009 |
| KR | 1020100114827 B1 | 4/2017 |
| WO | 9632618 A1 | 10/1996 |
| WO | 2011019431 A1 | 2/2011 |
| WO | 2011021982 A1 | 2/2011 |
| WO | 2011072213 A2 | 6/2011 |
| WO | 2012006657 A | 1/2012 |
| WO | 2012087698 A1 | 6/2012 |
| WO | 2012138302 A1 | 10/2012 |
| WO | 2013024727 A1 | 2/2013 |
| WO | 2013040636 A1 | 3/2013 |
| WO | 2013066474 A2 | 5/2013 |
| WO | 2013070989 A1 | 5/2013 |
| WO | 2013128082 A1 | 9/2013 |
| WO | 2013155276 A1 | 10/2013 |
| WO | 2014011722 A2 | 1/2014 |
| WO | 2014062133 A1 | 4/2014 |
| WO | 2014072877 A2 | 5/2014 |
| WO | 2014134663 A1 | 9/2014 |
| WO | 2015023974 A1 | 2/2015 |
| WO | 2015069332 A1 | 5/2015 |
| WO | 2015153895 A1 | 10/2015 |
| WO | 2015195700 A1 | 12/2015 |
| WO | 2016094551 A1 | 6/2016 |

OTHER PUBLICATIONS

Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, WILEY-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.
Marcano, Daniela C. et al., "Improved Synthesis of Graphene Oxide," ACS Nano, vol. 4, Issue 8, Jul. 22, 2010, American Chemical Society, pp. 4806-4814.
Miller, John R. et al., "Electrochemical Capacitors for Energy Management," Materials Science, vol. 321, Aug. 1, 2008, AAAS, pp. 651-652.
Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.
Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.
Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.
Nathan, Arokia et al., "Flexible Electronics: The Next Ubiquitous Platform," Proceedings of the IEEE, vol. 100, Special Centennial Issue, May 13, 2012, IEEE, pp. 1486-1517.
Niu, Zhiqiang et al., "A Leavening Strategy to Prepare Reduced Graphene Oxide Foams," Advanced Materials, vol. 24, Issue 30, Aug. 8, 2012, WILEY-VCH Verlag GmbH & Co., pp. 1-7.
Oudenhoven, Jos F. M. et al., "All-Solid-State Lithium-Ion Microbatteries: A Review of Various Three-Dimensional Concepts," Advanced Energy Matterials, vol. 1, Issue 1, WILEY-VCH Verlag GmbH & Co. KGaA, Weinheim, pp. 10-33.
Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.
Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.
Pech, David et al, "Ultrahigh-power micrometre-sized supercapacitors based on onion-like carbon," Nature Nanotechnology, vol. 5, Sep. 2010, Macmillan Publishers Limited, 10 pages.
Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.
Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.
Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.
Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.
Qiu, Ling et al., "Controllable Corrugation of Chemically Converted Graphene Sheets in Water and Potential Application for Nanofiltration," Chemical Communications, vol. 47, 2011, pp. 5810-5812.
Qu, Qunting et al., "Core-Shell Structure of Polypyrrole Grown on $V_2O_5$ Nanoribbon as High Performance Anode Material for Supercapacitors," Advanced Energy Materials, vol. 2, Issue 8, 2012, WILEY-VCH Verlag GmbH & Co., pp. 1-6.
Raccichini, Rinaldo et al., "The role of graphene for electrochemical energy storage," Nature Materials, vol. 14, Issue 3, Dec. 22, 2014, Macmillan Publishers Limited, pp. 1-9.
Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.
Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.
Shao, Yuanlong et al., "Graphene-based materials for flexible supercapacitors," Chemical Society Review, vol. 44, Issue 11, Apr. 22, 2015, The Royal Society of Chemistry, 27 pages.
Shao, Yuanlong et al., "High-performance flexible asymmetric supercapacitors based on 3D porous graphene/$MnO_2$ nanorod and graphene/Ag hybrid thin-film electrodes," Journal of Materials Chemistry C, vol. 1, Dec. 5, 2012, The Royal Society of Chemistry, pp. 1245-1251.
Sheats, James R., "Manufacturing and commercialization issues in organic electronics," Journal of Materials Research, vol. 19, Issue 7, Jul. 2004, Materials Research Society, pp. 1974-1989.
Shen, Caiwei et al., "A high-energy-density micro supercapacitor of asymmetric $MnO_2$-carbon configuration by using micro-fabrication technologies," Journal of Power Sources, vol. 234, Feb. 9, 2013, Elsevier B.V., pp. 302-309.

(56) References Cited

OTHER PUBLICATIONS

Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.

Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.

Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.

Simon, Patrice et al., "Materials for electrochemical capacitors," Nature Materials, vol. 7, Issue 11, Nov. 2008, Macmillan Publishers Limited, pp. 845-854.

Simon, Patrice et al., "Where Do Batteries End and Supercapacitors Begin?" Science, vol. 343, Issue 6176, Mar. 14, 2014, American Association for the Advancement of Science, 3 pages.

Snook, Graeme A. et al., "Conducting-polymer-based supercapacitor devices and electrodes," Journal of Power Sources, vol. 196, Jul. 15, 2010, Elsevier B.V., pp. 1-12

Stoller, Meryl D. et al., "Graphene-Based Ultracapacitors," Nano Letters, vol. 8, Issue 10, Sep. 13, American Chemical Society, pp. 3498-3502.

Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.

Su, Zijin et al., "Scalable fabrication of $MnO_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.

Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, WILEY-VCH Verlag GmbH & Co. KGaA, Weinheim, pp. 2809-2815.

Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.

Toupin, Mathieu et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.

Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.

Viculis, Lisa M. et al., "A Chemical Route to Carbon Nanoscrolls," Science, vol. 299, Issue 5611, Feb. 28, 2003, American Association for the Advancement of Science, 2 pages.

Vonlanthen, David et al., "A Stable Polyaniline-Benzoquinone-Hydroquinone Supercapacitor," Advanced Materials, vol. 26, Issue 30, Jun. 13, 2014, WILEY-VCH Verlag GmbH & Co., pp. 1-6.

Wallace, Gordon G. et al., "Processable aqueous dispersions of graphene nanosheets," Nature Nanotechnology, vol. 3, Issue 2, 2008, Nature Publishing Group, pages 101-105

Wang, Gongkai et al., "Flexible Pillared Graphene-Paper Electrodes for High-Performance Electrochemical Supercapacitors," Small, vol. 8, Issue 3, Dec. 8, 2011, pp. 452-459.

Wang, Guoping et al, "A review of electrode materials for electrochemical supercapacitors," Chemical Society Reviews, vol. 41, Jul. 21, 2011, The Royal Society of Chemistry, pp. 797-828.

Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.

Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.

Wang, Huanlei et al., "Graphene-Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.

Wang, Kai et al., "Flexible supercapacitors based on cloth-supported electrodes of conducting polymer nanowire array/ SWCNT composites," Journal of Materials Chemistry, vol. 21, Issue 41, Sep. 20, 2011, The Royal Society of Chemistry, pp. 16373-16378.

Final Office Action for U.S. Appl. No. 13/725,073, dated Apr. 6, 2018, 37 pages.

Notice of Allowance for U.S. Appl. No. 15/612,405, dated May 16, 2018, 8 pages.

Third Office Action and Search Report for Chinese Patent Application No. 201380023699.7, dated Mar. 9, 2018, 16 pages.

International Search Report and Written Opinion for International Patent Application No. PCT/US2017/048883, dated Dec. 26, 2017, 10 pages.

Non-Final Office Action for U.S. Appl. No. 14/945,232, dated Jan. 29, 2018, 9 pages.

Extended European Search Report for European Patent Application No. 15809519.0, dated Feb. 5, 2018, 10 pages.

Decision on Rejection for Chinese Patent Application No. 201280070343.4, dated Jan. 5, 2018, 18 pages.

Non-Final Office Action for U.S. Appl. No. 15/612,405, dated Feb. 9, 2018, 9 pages.

Decision to Grant a Patent for Japanese Patent Application No. 2014-561017, dated Mar. 13, 2018, 4 pages.

Invitation to Pay Additional Fees for International Patent Application No. PCT/US2017/048883, dated Sep. 29, 2017, 2 pages.

Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.

Yan, Jun et al., "Preparation of graphene nanosheet/carbon nanotube/ polyaniline composite as electrode material for supercapacitors," Journal of Power Sources, vol. 195, Issue 9, Nov. 11, 2009, Elsevier B.V., pp. 3041-3045.

Examination Report for European Patent Application No. 128749892, dated Jul. 24, 2017, 5 pages.

Communication pursuant to Article 94(3) EPC for European Patent Application No. 13757195.6, dated Jul. 6, 2017, 3 pages.

International Search Report and Written Opinion for International Patent Application No. PCT/US2017/024716, dated Jun. 20, 2017, 13 pages.

Gao, Yu et al., "High power supercapcitor electrodes based on flexible TiC-CDC nano-felts," Journal of Power Sources, vol. 201, Issue 1, Mar. 2012, Elsevier B.V., pp. 368-375.

Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.

Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.

Ghidiu, Michael et al., "Conductive two-dimensional titanium carbide 'clay' with high volumetric capacitance," Nature, vol. 516, Dec. 4, 2014, Macmillan Publishers Limited, pp. 78-81.

Gilje, Scott et al., "A Chemical Route to Graphene for Device Applications," Nano Letters, vol. 7, Issue 11, Oct. 18, 2007, American Chemical Society, pp. 3394-3398.

Gilje, Scott et al., "Photothermal Deoxygenation of Graphene Oxide for Patterning and Distributed Ignition Applications," Advanced Materials, vol. 22, Issue 3, Oct. 26, 2009, WILEY-VCH Verlag GmbH & Co. KGaA, Weinheim, Germany, pp. 419-423.

Glavin, M.E. et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.

(56) References Cited

OTHER PUBLICATIONS

Gogotsi, Y. et al., "True Performance Metrics in Electrochemical Energy Storage," Science Magazine, vol. 334, Issue 6058, Nov. 18, 2011, 4 pages.

Gracia, J. et al., "Corrugated layered heptazine-based carbon nitride: the lowest energy modifications of $C_3N_4$ ground state," Journal of Materials Chemistry, vol. 19, 2009, pp. 3013-3019.

Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.

Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.

Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.

Günes, Fethullah et al., "Layer-by-Layer Doping of Few-Layer Graphene Film," ACS Nano, vol. 4, Issue 8, Jul. 27, 2010, American Chemical Society, pp. 4595-4600.

He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.

Hu, Liangbing et al., "Symmetrical $MnO_2$-Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.

Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.

Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.

Hwang, Jee Y. et al., "Direct preparation and processing of graphene/$RuO2$ nanocomposite electrodes for high-performance capacitive energy storage," Nano Energy, vol. 18, Sep. 25, 2015, Elsevier B.V., pp. 57-70.

Jana, Milan et al., "Non-covalent functionalization of reduced graphene oxide using sulfanilic acid azocromotrop and its application as a supercapacitor electrode material," Journal of Materials Chemistry A, vol. 3, Issue 14, Feb. 24, 2015, The Royal Society of Chemistry, pp. 7323-7331.

Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.

Jimbo, "Transistors," Sparkfun, https://learn.sparkfun.com/tutorials/transistors/extending-the-water-analogy, accessed Dec. 14, 2015, SparkFun Electronics, 3 pages.

Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.

Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.

Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.

Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.

Kiani, Mohammad Ali et al., "Fabrication of High Power LiNi0. 5Mn1.5O4 Battery Cathodes by Nanostructuring of Electrode Materials," RSC Advances, vol. 5, Issue 62, May 26, 2015, The Royal Society of Chemistry, pp. 1-6.

Kiani, M.A. et al., "Size effect investigation on battery performance: Comparison between micro- and nano-particles of 3-$Ni(OH)_2$ as nickel battery cathode material," Journal of Power Sources, vol. 195, Issue 17, Apr. 2, 2010, Elsevier B.V., pp. 5794-5800.

Kiani, M.A. et al., "Synthesis of Nano- and Micro-Particles of $LiMn_2O_4$: Electrochemical Investigation and Assessment as a Cathode in Li Battery," International Journal of Electrochemical Science, vol. 6, Issue 7, Jul. 1, 2011, ESG, pp. 2581-2595.

Kovtyukhova, Nina, I. et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.

Lam, L.T. et al., "Development of ultra-battery for hybrid-electric vehicle applications," Journal of Power Sources, vol. 158, Issue 2, May 2, 2006, Elsevier B.V., pp. 1140-1148.

Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.

Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.

Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.

Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.

Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.

Li, Dan et al., "Processable aqueous dispersions of graphene nanosheets," Nature Nanotechnology, vol. 3, Feb. 2008, Nature Publishing Group, pp. 101-105.

Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.

Li, Peixu et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American Chemical Society, pp. 5228-5234.

Li, Qi et al., "Design and Synthesis of $MnO_2$/Mn/$MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.

Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.

Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.

Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.

Linden, David et al., "Handbook of Batteries," McGraw-Hill Handbooks, Third Edition, 2010, New York, The McGraw-Hill Companies, Inc., 1,454 pages.

Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.

(56) References Cited

OTHER PUBLICATIONS

Liu, Wen-Wen et al., "Superior Micro-Supercapacitors Based on Graphene Quantum Dots," Advanced Functional Materials, vol. 23, Issue 33, Mar. 26, 2013, WILEY-VCH Verlag GmbH & Co. KGaA, Weinheim, pp. 4111-4122.

Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.

Long, Jeffrey W. et al., "Asymmetric electrochemical capacitors—Stretching the limits of aqueous electrolytes," MRS Bulletin, vol. 36, Jul. 2011, Materials Research Society, pp. 513-522.

Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.

Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.

Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.

Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.

Allen, Matthew J. et al., "Honeycomb Carbon: A Review of Graphene," Chemical Reviews, vol. 110, Issue 1, Jul. 17, 2009, American Chemical Society, pp. 132-145.

Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.

Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.

Author Unknown, "ELTON: Super Capactiors," www.elton-cap.com/, Retrieved Apr. 15, 2016, ELTON, 1 page.

Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.

Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.

Author Unknown, "Turnigy Graphene Batteries," Batteries & Accessories, https://hobbyking.com/en_us/batteries-accessories/turnigy-graphene-2.html, retrieved Apr. 3, 2017, HobbyKing, 39 pages.

Arthur, Timothy, S. et al., "Three-dimensional electrodes and battery architectures," MRS Bulletin, vol. 36, Jul. 2011, Materials Research Society, pp. 523-531.

Bai, Ming-Hua et al., "Electrodeposition of vanadium oxide—polyaniline composite nanowire electrodes for high energy density supercapacitors," Journal of Materials Chemistry A, vol. 2, Issue 28, Jan. 29, 2014, The Royal Society of Chemistry, pp. 10882-10888.

Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.

Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, WILEY-VCH Verlag GmbH & Co. KGaA, Weinheim, pp. 4501-4510.

Beidaghi, Majid et al.,"Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.

Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.

Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.

Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.

Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.

Brodie, B.C., "Ueber das Atomgewicht des Graphits," Justus Liebigs Annalen der Chemie, vol. 114, Issue 1, 1860, WILEY-VCH Verlag GmbH & Co. KGaA, Weinheim, pp. 6-24.

Burke, Andrew, "R&D considerations for the performance and application of electrochemical capacitors," Electrochimica Acta, vol. 53, Jan. 26, 2007, Elsevier Ltd., pp. 1083-1091.

Cao, Liujun et al., "Direct Laser-Patterned Micro-Supercapacitors from Paintable $MoS_2$ Films," Small, vol. 9, Issue 17, Apr. 16, 2013, WILEY-VCH Verlag GmbH & Co. KGaA, Weinheim, pp. 2905-2910.

Chan, Candace K. et al, "High-performance lithium battery anodes using silicon nanowires," Nature Nanotechnology, vol. 3, Issue 1, Jan. 2008, Nature Publishing Group, pp. 31-35.

Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.

Chen, Ji et al., "High-yield preparation of graphene oxide from small graphite flakes via an improved Hummers method with a simple purification process," Carbon, vol. 81, Jan. 2015, Elsevier Ltd., pp. 1-9.

Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, WILEY-VCH Verlag GmbH & Co. KGaA, Weinheim, pp. 851-856.

Chen, Wei et al., "High-Performance Nanostructured Supercapacitors on a Sponge," Nano Letters, vol. 11, Issue 12, Sep. 16, 2011, American Chemical Society, 22 pages.

Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.

Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.

Chi, Kai et al., "Freestanding Graphene Paper Supported Three-Dimensional Porous Graphene-Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.

Chmiola, John et al., "Monolithic Carbide-Derived Carbon Films for Micro-Supercapacitors," Science, vol. 328, Issue 5977, Apr. 2010, American Association for the Advancement of Science, 4 pages.

Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.

Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.

Deville, Sylvain, "Freeze-Casting of Porous Ceramics: A Review of Current Achievements and Issues," Advanced Engineering Materials, vol. 10, Issue 3, Mar. 20, 2008, WILEY-VCH Verlag GmbH & Co., pp. 155-169.

(56) References Cited

OTHER PUBLICATIONS

Deville, Sylvain, "Metastable and unstable cellular solidification of colloidal suspensions," Nature Materials, vol. 8, Dec. 2009, Macmillan Publishers Limited, pp. 966-972.
De Volder, Michaël et al., "Corrugated Carbon Nanotube Microstructures with Geometrically Tunable compliance," ACS NANO, vol. 5, Issue 9, Aug. 1, 2011, pp. 7310-7317.
Dunn, Bruce et al., "Electrical Energy Storage for the Grid: A Battery of Choices," Science, vol. 334, Issue 928, Nov. 18, 2011, American Association for the Advancement of Science, pp. 928-935.
Eda, Goki et al., "Chemically Derived Graphene Oxide: Towards Large-Area Thin-Film Electronics and Optoelectronics," Advanced Materials, vol. 22, Issue 22, Apr. 28, 2010, WILEY-VCH Verlag GmbH & Co., pp. 2392-2415.
El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.
El-Kady, Maher F. et al., "Laser Scribing of High-Performance and Flexible Graphene-Based Electrochemical Capacitors," Science Magazine, Mar. 16, 2012, vol. 335, No. 6074, 6 pages.
El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.
El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.
El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.
Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, WILEY-VCH Verlag GmbH & Co. KGaA, Weinheim, pp. 2366-2375.
Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.
Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.
Foo, Ce Yao et al., "Flexible and Highly Scalable $V_2O_5$-rGO Electrodes in an Organic Electrolyte for Supercapacitor Devices," Advanced Energy Materials, vol. 4, Issue 12, Aug. 26, 2014, WILEY-VCH Verlag GmbH & Co. KGaA, Weinheim, pp. 1-7.
Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, WILEY-VCH Verlag GmbH & Co, pp. 3958-3964.
Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.
Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.
Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.
Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.
Wang, Xu et al., "Manganese Oxide Micro-Supercapacitors with Ultra-high Areal Capacitance,"Electronic Supplementary Material (ESI) for Nanoscale, vol. 5, Mar. 21, 2013, The Royal Society of Chemistry, 6 pages.
Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.
Wassei, Jonathan K. et al., "Oh the Places You'll Go with Graphene", Accounts of Chemical Research, Dec. 20, 2012, Vers. 9, 11 pages.
Weng, Zhe et al., "Graphene-Cellulose Paper Flexible Supercapacitors," Advanced Energy Materials, vol. 1, Issue 5, Aug. 10, 2011, WILEY-VCH Verlag GmbH & Co., pp. 917-922.
Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.
Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.
Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.
Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.
Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.
Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.
Yan, Jun et al., "Fast and reversible surface redox reaction of graphene-$MnO_2$composites as supercapacitor electrodes," Carbon, vol. 48, Issue 13, Jun. 25, 2010, Elsevier Ltd., pp. 3825-3833.
Yan, Jun et al., "Recent Advances in Design and Fabrication of Electrochemical Supercapacitors with High Energy Densities," Advanced Energy Materials, vol. 4, Issue 4, 1300816, Dec. 23, 2013, WILEY-VCH Verlag GmbH & Co., pp. 1-43.
Yang, Xiaowei et al, "Bioinspired Effective Prevention of Restacking in Multilayered Graphene Films: Towards the Next Generation of High-Performance Supercapacitors," Advanced Materials, vol. 23, Issue 25, May 10, 2011, WILEY-VCH Verlag GmbH & Co., pp. 2833-2838.
Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.
Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.
Yoo, Jung Joon et al., "Ultrathin Planar Graphene Supercapacitors," Nano Letters, vol. 11, Issue 4, Mar. 7, 2011, American Chemical Society, pp. 1423-1427.
Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.

(56) References Cited

OTHER PUBLICATIONS

Yu, Guihua et al., "Solution-Processed Graphene/MnO$_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D MnO$_2$ -Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, WILEY-VCH Verlag GmbH & Co. KGaA, Weinheim, pp. 1-9.
Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al, "Nanostructured carbon-metal oxide composite electrodes for supercapacitors: a review," Nanoscale, vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCI Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped Fe$_3$O$_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/Fe$_2$O$_3$ Composite as a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B. V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Non-Final Office Action for U.S. Appl. No. 13/725,073, dated Aug. 28, 2017, 41 pages.
Second Office Action for Chinese Patent Application No. 201380023699.7, dated Aug. 9, 2017, 8 pages.
International Search Report and Written Opinion for International Patent Application No. PCT/US2017/038992, dated Sep. 21, 2017, 12 pages.
Fourth Office Action for Chinese Patent Application No. 201280070343.4, dated Apr. 26, 2017, 22 pages.
Notice of Reason for Rejection for Japanese Patent Application No. 2014-548972, dated May 23, 2017, 4 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/023632, dated May 31, 2017, 11 pages.
Non-Final Office Action for U.S. Appl. No. 15/319,286, dated Jun. 27, 2018, 9 pages.
Non-Final Office Action for U.S. Appl. No. 15/382,871, dated Jun. 27, 2018, 11 pages.
Examination Report for European Patent Application No. 13757195.6, dated Jun. 13, 2018, 7 pages.
Partial Supplementary European Search Report for European Patent Application No. 15861794.4, dated Jun. 28, 2018, 16 pages.
International Preliminary Report on Patentability for International Patent Application No. PCT/US2016/067468, dated Jul. 5, 2018, 7 pages.
Decision on Rejection for Chinese Patent Application No. 201380023699.7, dated Aug. 16, 2018, 11 pages.
International Preliminary Report on Patentability for International Patent Application No. PCT/US2017/024716, dated Oct. 11, 2018, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
Extended European Search Report for European Patent Application No. 15861794.4, dated Oct. 2, 2018, 13 pages.

(56) References Cited

OTHER PUBLICATIONS

Notification of the First Office Action for Chinese Patent Application No. 201580072540.3, dated Jun. 25, 2018, 14 pages.
International Preliminary Report on Patentability for International Patent Application No. PCT/US2017/014126, dated Aug. 2, 2018, 10 pages.
First Office Action for Canadian Patent Application No. 2,862,806, dated Nov. 22, 2018, 5 pages.
Notification of the First Office Action for Chinese Patent Application No. 201580043429.1, dated Oct. 29, 2018, 19 pages.
International Search Report and Written Opinion for International Patent Application No. PCT/US2018/041728, dated Nov. 9, 2018, 10 pages.
Corrected Notice of Allowability for U.S. Appl. No. 15/319,286, dated Nov. 30, 2018, 5 pages.
Final Office Action for U.S. Appl. No. 14/945,232, dated Aug. 10, 2018, 7 pages.
Notice of Allowance for U.S. Appl. No. 15/319,286, dated Oct. 1, 2018, 8 pages.
Non-Final Office Action for U.S. Appl. No. 15/410,404, dated Sep. 27, 2018, 9 pages.
Advisory Action for U.S. Appl. No. 14/945,232, dated Oct. 15, 2018, 3 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
Corrected Notice of Allowability for U.S. Appl. No. 15/319,286, dated Oct. 29, 2018, 5 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Notice of Preliminary Rejection for Korean Patent Application No. 10-2014-7020353, dated Apr. 15, 2019, 11 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Interview Summary for U.S. Appl. No. 14/945,232, dated Apr. 11, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Non-Final Office Action for U.S. Appl. No. 15/688,342, dated Mar. 26, 2019, 9 pages.
Examination Report for European Patent Application No. 12874989.2, dated Mar. 5, 2019, 5 pages.
Office Action for Canadian Patent Application No. 2,866,250, dated Jan. 11, 2019, 3 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Examination Report No. 1 for Australian Patent Application No. 2015349949, dated Mar. 8, 2019, 4 pages.
International Preliminary Report on Patentability for International Patent Application No. PCT/US2017/048883, dated Mar. 14, 2019, 7 pages.
International Preliminary Report on Patentability for International Patent Application No. PCT/US2017/038992, dated Jan. 3, 2019, 10 pages.
Non-Final Office Action for U.S. Appl. No. 15/427,210, dated Feb. 28, 2019, 17 pages.
Non-Final Office Action for U.S. Appl. No. 16/029,930, dated Jan. 14, 2019, 8 pages.
Corrected Notice of Allowability for U.S. Appl. No. 15/319,286, dated Jan. 18, 2019, 5 pages.
Non-Final Office Action for U.S. Appl. No. 14/945,232, dated Jan. 9, 2019, 7 pages.
Final Office Action for U.S. Appl. No. 15/382,871, dated Jan. 25, 2019, 16 pages.
Final Office Action for U.S. Appl. No. 15/410,404, dated Feb. 21, 2019, 9 pages.
Office Action for Canadian Patent Application No. 2,862,806, dated Sep. 30, 2019, 3 pages.
Decision of Rejection for Japanese Patent Application No. 2016-573846, dated Oct. 29, 2019, 9 pages.
First Office Action for Chinese Patent Application No. 2016800753323, dated Aug. 27, 2019, 15 pages.
Extended European Search Report for European Patent Application No. 17741923.1, dated Nov. 15, 2019, 18 pages.
Extended European Search Report for European Patent Application No. 17776536.9, dated Oct. 30, 2019, 8 pages.
Extended European Search Report for European Patent Application No. 17771081.1, dated Oct. 22, 2019, 6 pages.
Cannarella et al., "Mechanical Properties of a Battery Separator under Compression and Tension," Journal of the Electrochemical Society, vol. 161, No. 11, Sep. 26, 2014, pp. F3117-F3122.
Non-Final Office Action for U.S. Appl. No. 15/427,210, dated Sep. 3, 2019, 16 pages.
Applicant-Initiated Interview Summary for U.S. Appl. No. 16/029,930, dated Jul. 29, 2019, 4 pages.
Non-Final Office Action for U.S. Appl. No. 14/945,232, dated Sep. 3, 2019, 8 pages.
Non-Final Office Action for U.S. Appl. No. 15/382,871, dated Sep. 16, 2019, 9 pages.
Non-Final Office Action for U.S. Appl. No. 16/428,409, dated Sep. 16, 2019, 12 pages.
Applicant-Initiated Interview Summary for U.S. Appl. No. 15/427,210, dated May 29, 2019, 3 pages.
Non-Final Office Action for U.S. Appl. No. 15/466,425, dated Jul. 10, 2019, 8 pages.
Non-Final Office Action for U.S. Appl. No. 15/612,405, dated Jun. 18, 2019, 12 pages.
Final Office Action for U.S. Appl. No. 14/945,232, dated Jul. 17, 2019, 8 pages.
Notice of Allowance for U.S. Appl. No. 15/382,871, dated May 17, 2019, 10 pages.
Non-Final Office Action for U.S. Appl. No. 15/410,404, dated May 24, 2019, 9 pages.
Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Notice of Reexamination for Chinese Patent Application No. 201280070343.4, dated Jun. 27, 2019, 14 pages.
Notification of the Second Office Action for Chinese Patent Application No. 201580043429.1, dated Jun. 20, 2019, 9 pages.
Notice of Acceptance for Australian Patent Application No. 2015349949, dated Jul. 12, 2019, 3 pages.
Extended European Search Report for European Patent Application No. 16879927.8, dated Jul. 9, 2019, 14 pages.
Partial Supplementary European Search Report for European Patent Application No. 17741923.1, dated Jul. 23, 2019, 13 pages.
Notice of Preliminary Rejection for Korean Patent Application No. 10-2014-7028084, dated Aug. 22, 2019, 30 pages.
Notification of Reasons for Rejection for Japanese Patent Application No. 2017-526533, dated Aug. 20, 2019, 4 pages.
Notice of Acceptance for Australian Patent Application No. 2015277264, dated Jul. 31, 2019, 3 pages.
Notification of the Third Office Action for Chinese Patent Application No. 201580072540.3, dated Jul. 17, 2019, 9 pages.

(56) References Cited

OTHER PUBLICATIONS

Fernandez-Merino, M.J. et al., "Vitamin C Is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.
Lu, J. et al., "Advanced applications of ionic liquids in polymer science," Progress in Polymer Science, vol. 34, 2009, Elsevier Ltd., pp. 431-448.
Yan, Jun et al., "High-performance supercapacitor electrodes based on highly corrugated graphene sheets," Carbon, vol. 50, 2012, Elsevier Ltd., pp. 2179-2188.
Final Office Action for U.S. Appl. No. 16/029,930, dated Nov. 15, 2019, 16 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Applicant-Initiated Interview Summary for U.S. Appl. No. 15/466,425, dated Oct. 22, 2019, 3 pages.
Notice of Allowance and Examiner-Initiated Interview Summary for U.S. Appl. No. 15/410,404, dated Oct. 25, 2019, 11 pages.
Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2 Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, WILEY-VCH Venag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
U.S. Appl. No. 13/725,073, filed Dec. 21, 2012.
U.S. Appl. No. 15/427,210, filed Feb. 8, 2017.
U.S. Appl. No. 14/382,463, filed Sep. 2, 2014.
U.S. Appl. No. 15/319,286, filed Dec. 15, 2016.
U.S. Appl. No. 14/945,232, filed Nov. 18, 2015.
U.S. Appl. No. 15/382,871, filed Dec. 19, 2016.
U.S. Appl. No. 15/410,404, filed Jan. 19, 2017.
U.S. Appl. No. 15/466,425, filed Mar. 22, 2017.

Vranes, M. et al., "Physicochemical Characterization of 1-Butyl-3-methylimidazolium and 1-Butyl-1-methylpyrrolidinium Bis{trifluoromethylsulfonyl}imide," Journal of Chemical & Engineering Data, vol. 57, Mar. 7, 2012, American Chemical Society, pp. 1072-1077.
Notice of Allowance for U.S. Appl. No. 15/427,210, dated Dec. 18, 2019, 9 pages.
Final Office Action for U.S. Appl. No. 15/612,405, dated Dec. 27, 2019, 17 pages.
Notice of Allowance for U.S. Appl. No. 14/945,232, dated Dec. 20, 2019, 9 pages.
Applicant-Initiated Interview Summary for U.S. Appl. No. 15/382,871, dated Dec. 31, 2019, 5 pages.
Corrected Notice of Allowability for U.S. Appl. No. 15/410,404, dated Dec. 3, 2019, 6 pages.
Non-Final Office Action for U.S. Appl. No. 16/692,123, dated Dec. 27, 2019, 11 pages.
Gao, C. et al., "Superior Cycling Performance of SiOx/C Composite with Arrayed Mesoporous Architecture as Anode Material for Lithium-Ion Batteries," Journal of The Electrochemical Society, vol. 161, No. 14, 2014, The Electrochemical Society, pp. A2216-A2221.
Grant of Patent for Korean Patent Application No. 10-2014-7020353, dated Oct. 29, 2019, 3 pages.
Office Action for Canadian Patent Application No. 2,866,250, dated Dec. 17, 2019, 3 pages.
Examination Report for European Patent Application No. 15809519.0, dated Dec. 9, 2019, 7 pages.
Official Action for Eurasian Patent Application No. 201791078, dated Nov. 6, 2019, 4 pages.
Official Action for Eurasian Patent Application No. 201892199, dated Nov. 28, 2019, 6 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Official Action for Eurasian Patent Application No. 201892118, dated Nov. 28, 2019, 4 pages.
Notice of Reexamination for Chinese Patent Application No. 201280070343.4, dated Feb. 3, 2020, 7 pages.
Examination Report for European Patent Application No. 13757195.6, dated Jan. 29, 2020, 4 pages.
Office Action for Brazilian Patent Application No. 112016029468, dated Jan. 21, 2020, 6 pages.
Third Office Action for Chinese Patent Application No. 201580043429.1, dated Jan. 3, 2020, 20 pages.
Office Action for Brazilian Patent Application No. 112017010257, dated Jan. 28, 2020, 7 pages.
First Office Action for Chinese Patent Application No. 2017800076125, dated Nov. 28, 2019, 20 pages.
First Office Action for Chinese Patent Application No. 2017800249783, dated Jan. 6, 2020, 15 pages.
International Preliminary Report on Patentability for International Patent Application No. PCT/US2018/041728, dated Jan. 23, 2020, 7 pages.
Office Action for Israeli Patent Application No. 249506, dated Dec. 3, 2019, 8 pages.
Supplemental Notice of Allowability for U.S. Appl. No. 14/945,232, dated Feb. 12, 2020, 5 pages.
Final Office Action for U.S. Appl. No. 15/466,425, dated Jan. 28, 2020, 8 pages.
Supplemental Notice of Allowability for U.S. Appl. No. 14/945,232, dated Feb. 26, 2020, 5 pages.

* cited by examiner

DIRECT GROWTH OF POLYANILINE NANOTUBES ON CARBON CLOTH FOR FLEXIBLE AND HIGH-PERFORMANCE SUPERCAPACITORS

CROSS-REFERENCE

This application claims the benefit of U.S. Provisional Application No. 62/317,120, filed Apr. 1, 2016, which application is incorporated herein by reference.

BACKGROUND

The development of high-performance energy storage devices has gained significant attention in a broad range of applications. While normal electronic devices progress rapidly, according to Moore's law, batteries have advanced only slightly, mainly due to the limitations of current materials' energy densities and capacities. As such, batteries with a reduced charge time and an increased charge density may have a profound effect on the design and use of portable electronics and renewable energy devices.

SUMMARY

Provided herein are methods, devices, and systems for growing nanotubes on functionalized carbon cloth. The growing may include the manufacture (or synthesis) of functionalized carbon cloth, the manufacture (or synthesis) of nanotubes and nanostructures, and/or the manufacture (or synthesis) of an electrolyte. Some embodiments provide methods, devices, and systems for the manufacture (or synthesis) of functionalized carbon cloth and/or for the manufacture (or synthesis) of nanotubes and nanostructures and/or for the manufacture (or synthesis) of electrolytes and/or for the manufacture (or synthesis) of supercapacitors.

A first aspect disclosed herein is a device comprising a functionalized carbon electrode comprising a carbon substrate and a conducting polymer disposed on the carbon substrate.

In some embodiments, the functionalized carbon electrode comprises a polyaniline functionalized carbon electrode.

In some embodiments, the carbon substrate comprises carbon cloth, carbon fiber, amorphous carbon, glassy carbon, carbon nanofoam, carbon aerogel or any combination thereof.

In some embodiments, the conducting polymer is a semiflexible rod polymer. In some embodiments, the semiflexible rod polymer comprises polyaniline, poly(p-phenylene oxide), poly(p-phenylene sulfide), poly(3,4-ethylenedioxythiophene), polypyrrole, polythiophene, poly(3-alkythiophene), poly(3-methylthiophene), poly(3-hexylthiophene), or any combination thereof. In some embodiments, the conducting polymer has a nanotube morphology, wherein the nanotube has a cross-sectional shape comprising a rectangle, a square, a circle, or a polygon.

In some embodiments, the nanotube has a length of about 100 nanometers to about 10,000 nanometers. In some embodiments, the nanotube has a length of at least about 100 nanometers. In some embodiments, the nanotube has a length of at most about 10,000 nanometers. In some embodiments, the nanotube has a length of about 100 nanometers to about 500 nanometers, about 100 nanometers to about 1,000 nanometers, about 100 nanometers to about 2,000 nanometers, about 100 nanometers to about 3,000 nanometers, about 100 nanometers to about 4,000 nanometers, about 100 nanometers to about 5,000 nanometers, about 100 nanometers to about 6,000 nanometers, about 100 nanometers to about 7,000 nanometers, about 100 nanometers to about 8,000 nanometers, about 100 nanometers to about 9,000 nanometers, about 100 nanometers to about 10,000 nanometers, about 500 nanometers to about 1,000 nanometers, about 500 nanometers to about 2,000 nanometers, about 500 nanometers to about 3,000 nanometers, about 500 nanometers to about 4,000 nanometers, about 500 nanometers to about 5,000 nanometers, about 500 nanometers to about 6,000 nanometers, about 500 nanometers to about 7,000 nanometers, about 500 nanometers to about 8,000 nanometers, about 500 nanometers to about 9,000 nanometers, about 500 nanometers to about 10,000 nanometers, about 1,000 nanometers to about 2,000 nanometers, about 1,000 nanometers to about 3,000 nanometers, about 1,000 nanometers to about 4,000 nanometers, about 1,000 nanometers to about 5,000 nanometers, about 1,000 nanometers to about 6,000 nanometers, about 1,000 nanometers to about 7,000 nanometers, about 1,000 nanometers to about 8,000 nanometers, about 1,000 nanometers to about 9,000 nanometers, about 1,000 nanometers to about 10,000 nanometers, about 2,000 nanometers to about 3,000 nanometers, about 2,000 nanometers to about 4,000 nanometers, about 2,000 nanometers to about 5,000 nanometers, about 2,000 nanometers to about 6,000 nanometers, about 2,000 nanometers to about 7,000 nanometers, about 2,000 nanometers to about 8,000 nanometers, about 2,000 nanometers to about 9,000 nanometers, about 2,000 nanometers to about 10,000 nanometers, about 3,000 nanometers to about 4,000 nanometers, about 3,000 nanometers to about 5,000 nanometers, about 3,000 nanometers to about 6,000 nanometers, about 3,000 nanometers to about 7,000 nanometers, about 3,000 nanometers to about 8,000 nanometers, about 3,000 nanometers to about 9,000 nanometers, about 3,000 nanometers to about 10,000 nanometers, about 4,000 nanometers to about 5,000 nanometers, about 4,000 nanometers to about 6,000 nanometers, about 4,000 nanometers to about 7,000 nanometers, about 4,000 nanometers to about 8,000 nanometers, about 4,000 nanometers to about 9,000 nanometers, about 4,000 nanometers to about 10,000 nanometers, about 5,000 nanometers to about 6,000 nanometers, about 5,000 nanometers to about 7,000 nanometers, about 5,000 nanometers to about 8,000 nanometers, about 5,000 nanometers to about 9,000 nanometers, about 5,000 nanometers to about 10,000 nanometers, about 6,000 nanometers to about 7,000 nanometers, about 6,000 nanometers to about 8,000 nanometers, about 6,000 nanometers to about 9,000 nanometers, about 6,000 nanometers to about 10,000 nanometers, about 7,000 nanometers to about 8,000 nanometers, about 7,000 nanometers to about 9,000 nanometers, about 7,000 nanometers to about 10,000 nanometers, about 8,000 nanometers to about 9,000 nanometers, about 8,000 nanometers to about 10,000 In some embodiments, the nanotube has an outer width of about 10 nanometers to about 1,000 nanometers. In some embodiments, the nanotube has an outer width of at least about 10 nanometers. In some embodiments, the nanotube has an outer width of at most about 1,000 nanometers. In some embodiments, the nanotube has an outer width of about 10 nanometers to about 50 nanometers, about 10 nanometers to about 100 nanometers, about 10 nanometers to about 200 nanometers, about 10 nanometers to about 300 nanometers, about 10 nanometers to about 400 nanometers, about 10 nanometers to about 500 nanometers, about 10 nanometers to about 600 nanometers, about 10 nanometers to about 700 nanometers, about 10 nanometers to about 800 nanometers, about 10 nanometers to about 900 nanometers, about 10 nanometers to about 1,000 nanometers, about 50 nanometers to about 100 nanometers, about 50 nanometers to about 200 nanometers, about 50 nanometers to about 300 nanometers, about 50 nanometers to about 400 nanometers, about 50 nanometers to about 500 nanometers, about 50 nanometers to about 600 nanometers, about 50 nanometers to about 700 nanometers, about 50 nanometers to about 800 nanometers, about 50 nanometers to about 900 nanometers, about 50 nanometers to about 1,000 nanometers, about 100 nanometers to about 200 nanometers, about 100 nanometers to about 300 nanometers, about 100 nanometers to about 400 nanometers, about 100 nanometers to about 500 nanometers, about 100 nanometers to about 600 nanometers, about 100 nanometers to about 700 nanometers, about 100 nanometers to about 800 nanometers, about 100 nanometers to about 900 nanometers, about 100 nanometers to about 1,000 nanometers, about 200 nanometers to about 300 nanometers, about 200 nanometers to about 400 nanometers, about 200 nanometers to about 500 nanometers, about 200 nanometers to about 600 nanometers, about 200 nanometers to about 700 nanometers, about 200 nanometers to about 800 nanometers, about 200 nanometers to about 900 nanometers, about 200 nanometers to about 1,000 nanometers, about 300 nanometers to about 400 nanometers, about 300 nanometers to about 500 nanometers, about 300 nanometers to about 600 nanometers, about 300 nanometers to about 700 nanometers, about 300 nanometers to about 800 nanometers, about 300 nanometers to about 900 nanometers, about 300 nanometers to about 1,000 nanometers, about 400 nanometers to about 500 nanometers, about 400 nanometers to about 600 nanometers, about 400 nanometers to about 700 nanometers, about 400 nanometers to about 800 nanometers, about 400 nanometers to about 900 nanometers, about 400 nanometers to about 1,000 nanometers, about 500 nanometers to about 600 nanometers, about 500 nanometers to about 700 nanometers, about 500 nanometers to about 800 nanometers, about 500 nanometers to about 900 nanometers, about 500 nanometers to about 1,000 nanometers, about 600 nanometers to about 700 nanometers, about 600 nanometers to about 800 nanometers, about 600 nanometers to about 900 nanometers, about 600 nanometers to about 1,000 nanometers, about 700 nanometers to about 800 nanometers, about 700 nanometers to about 900 nanometers, about 700 nanometers to about 1,000 nanometers, about 800 nanometers to about 900 nanometers, about 800 nanometers to about 1,000 nanometers, or about 900 nanometers to about 1,000 nanometers.

In some embodiments, the nanotube has an inner width of about 50 nanometers to about 800 nanometers. In some embodiments, the nanotube has an inner width of at least about 50 nanometers. In some embodiments, the nanotube has an inner width of at most about 800 nanometers. In some embodiments, the nanotube has an inner width of about 50 nanometers to about 100 nanometers, about 50 nanometers to about 300 nanometers, about 50 nanometers to about 400 nanometers, about 50 nanometers to about 500 nanometers, about 50 nanometers to about 600 nanometers, about 50 nanometers to about 700 nanometers, about 50 nanometers to about 800 nanometers, about 100 nanometers to about 300 nanometers, about 100 nanometers to about 400 nanometers, about 100 nanometers to about 500 nanometers, about 100 nanometers to about 600 nanometers, about 100 nanometers to about 700 nanometers, about 100 nanometers to about 800 nanometers, about 300 nanometers to about 400 nanometers, about 300 nanometers to about 500 nanometers, about 300 nanometers to about 600 nanometers, about 300 nanometers to about 700 nanometers, about 300 nanometers to about 800 nanometers, about 400 nanometers to about 500 nanometers, about 400 nanometers to about 600 nanometers, about 400 nanometers to about 700 nanometers, about 400 nanometers to about 800 nanometers, about 500 nanometers to about 600 nanometers, about 500 nanometers to about 700 nanometers, about 500 nanometers to about 800 nanometers, about 600 nanometers to about 700 nanometers, about 600 nanometers to about 800 nanometers, or about 700 nanometers to about 800 nanometers.

In some embodiments, the surface of the nanotube includes one or more nanostructures. In some embodiments, the one or more nanostructure comprise(s) a nanorod, nanochain, nanofiber, nanoflake, nanoflower, nanoparticle, nanoplatelet, nanoribbon, nanoring, nanosheet, or a combination thereof.

In some embodiments, the nanostructure has a length of about 4 nanometers to about 400 nanometers. In some embodiments, the nanostructure has a length of at least about 4 nanometers. In some embodiments, the nanostructure has a length of at most about 400 nanometers. In some embodiments, the nanostructure has a length of about 4 nanometers to about 10 nanometers, about 4 nanometers to about 25 nanometers, about 4 nanometers to about 50 nanometers, about 4 nanometers to about 75 nanometers, about 4 nanometers to about 100 nanometers, about 4 nanometers to about 200 nanometers, about 4 nanometers to about 300 nanometers, about 4 nanometers to about 400 nanometers, about 10 nanometers to about 25 nanometers, about 10 nanometers to about 50 nanometers, about 10 nanometers to about 75 nanometers, about 10 nanometers to about 100 nanometers, about 10 nanometers to about 200 nanometers, about 10 nanometers to about 300 nanometers, about 10 nanometers to about 400 nanometers, about 25 nanometers to about 50 nanometers, about 25 nanometers to about 75 nanometers, about 25 nanometers to about 100 nanometers, about 25 nanometers to about 200 nanometers, about 25 nanometers to about 300 nanometers, about 25 nanometers to about 400 nanometers, about 50 nanometers to about 75 nanometers, about 50 nanometers to about 100 nanometers, about 50 nanometers to about 200 nanometers, about 50 nanometers to about 300 nanometers, about 50 nanometers to about 400 nanometers, about 75 nanometers to about 100 nanometers, about 75 nanometers to about 200 nanometers, about 75 nanometers to about 300 nanometers, about 75 nanometers to about 400 nanometers, about 100 nanometers to about 200 nanometers, about 100 nanometers to about 300 nanometers, about 100 nanometers to about 400 nanometers, about 200 nanometers to about 300 nanometers, about 200 nanometers to about 400 nanometers, or about 300 nanometers to about 400 nanometers.

In some embodiments, the nanostructure has a width of about 4 nanometers to about 400 nanometers. In some embodiments, the nanostructure has a width of at least about 4 nanometers. In some embodiments, the nanostructure has a width of at most about 400 nanometers. In some embodiments, the nanostructure has a width of about 4 nanometers to about 10 nanometers, about 4 nanometers to about 25 nanometers, about 4 nanometers to about 50 nanometers, about 4 nanometers to about 75 nanometers, about 4 nanometers to about 100 nanometers, about 4 nanometers to about 200 nanometers, about 4 nanometers to about 300 nanometers, about 4 nanometers to about 400 nanometers, about 10 nanometers to about 25 nanometers, about 10 nanometers to about 50 nanometers, about 10 nanometers to about 75 nanometers, about 10 nanometers to about 100 nanometers, about 10 nanometers to about 200 nanometers, about 10 nanometers to about 300 nanometers, about 10 nanometers to about 400 nanometers, about 25 nanometers to about 50 nanometers, about 25 nanometers to about 75 nanometers, about 25 nanometers to about 100 nanometers, about 25 nanometers to about 200 nanometers, about 25 nanometers to about 300 nanometers, about 25 nanometers to about 400 nanometers, about 50 nanometers to about 75 nanometers, about 50 nanometers to about 100 nanometers, about 50 nanometers to about 200 nanometers, about 50 nanometers to about 300 nanometers, about 50 nanometers to about 400 nanometers, about 75 nanometers to about 100 nanometers, about 75 nanometers to about 200 nanometers, about 75 nanometers to about 300 nanometers, about 75 nanometers to about 400 nanometers, about 100 nanometers to about 200 nanometers, about 100 nanometers to about 300 nanometers, about 100 nanometers to about 400 nanometers, about 200 nanometers to about 300 nanometers, about 200 nanometers to about 400 nanometers, or about 300 nanometers to about 400 nanometers.

In some embodiments, the electrode has an areal capacitance of about 150 millifarads per square centimeters (mF/cm$^2$) to about 750 mF/cm$^2$. In some embodiments, the electrode has an areal capacitance of at least about 150 mF/cm$^2$. In some embodiments, the electrode has an areal capacitance of at least about 750 mF/cm$^2$. In some embodiments, the electrode has an areal capacitance of about 150 mF/cm$^2$ to about 250 mF/cm$^2$, about 150 mF/cm$^2$ to about 350 mF/cm$^2$, about 150 mF/cm$^2$ to about 450 mF/cm$^2$, about 150 mF/cm$^2$ to about 550 mF/cm$^2$, about 150 mF/cm$^2$ to about 650 mF/cm$^2$, about 150 mF/cm$^2$ to about 750 mF/cm$^2$, about 250 mF/cm$^2$ to about 350 mF/cm$^2$, about 250 mF/cm$^2$ to about 450 mF/cm$^2$, about 250 mF/cm$^2$ to about 550 mF/cm$^2$, about 250 mF/cm$^2$ to about 650 mF/cm$^2$, about 250 mF/cm$^2$ to about 750 mF/cm$^2$, about 350 mF/cm$^2$ to about 450 mF/cm$^2$, about 350 mF/cm$^2$ to about 550 mF/cm$^2$, about 350 mF/cm$^2$ to about 650 mF/cm$^2$, about 350 mF/cm$^2$ to about 750 mF/cm$^2$, about 450 mF/cm$^2$ to about 550 mF/cm$^2$, about 450 mF/cm$^2$ to about 650 mF/cm$^2$, about 450 mF/cm$^2$ to about 750 mF/cm$^2$, about 550 mF/cm$^2$ to about 650 mF/cm$^2$, about 550 mF/cm$^2$ to about 750 mF/cm$^2$, or about 650 mF/cm$^2$ to about 750 mF/cm$^2$.

In some embodiments, the resistance of the electrode decreases after 1,000 folding cycles by about 1% to about 8%. In some embodiments, the resistance of the electrode decreases after 1,000 folding cycles by at most about 8%. In some embodiments the resistance of the electrode decreases after 1,000 folding cycles by about 1% to about 2%, about 1% to about 3%, about 1% to about 4%, about 1% to about 5%, about 1% to about 6%, about 1% to about 7%, about 1% to about 8%, about 2% to about 3%, about 2% to about 4%, about 2% to about 5%, about 2% to about 6%, about 2% to about 7%, about 2% to about 8%, about 3% to about 4%, about 3% to about 5%, about 3% to about 6%, about 3% to about 7%, about 3% to about 8%, about 4% to about 5%, about 4% to about 6%, about 4% to about 7%, about 4% to about 8%, about 5% to about 6%, about 5% to about 7%, about 5% to about 8%, about 6% to about 7%, about 6% to about 8%, or about 7% to about 8%.

A second aspect disclosed herein is a supercapacitor comprising two or more electrodes, wherein each electrode comprises a functionalized carbon electrode, a current collector, and an electrolyte.

In some embodiments the functionalized carbon electrode comprises: a carbon substrate comprising carbon cloth, carbon fiber, amorphous carbon, glassy carbon, carbon nanofoam, carbon aerogel, graphene foam or any combination thereof; and a conducting polymer disposed on the carbon substrate, wherein the conducting polymer comprises polyaniline, poly(p-phenylene oxide), poly(p-phenylene sulfide), poly(3,4-ethylenedioxythiophene), polypyrrole, polythiophene, poly(3-alkythiophene), poly(3-methylthiophene), poly(3-hexylthiophene), or any combination thereof.

In some embodiments, the functionalized carbon electrode is a polyaniline functionalized carbon electrode.

In some embodiments, the current collector is metallic. In some embodiments, the current collector is ferritic. In some embodiments, the current collector comprises stainless steel, crucible steel, carbon steel, spring steel, alloy steel, maraging steel, weathering steel, tool steel, or any combination thereof.

In some embodiments, an electrolyte is disposed between the first functionalized carbon electrode and the second functionalized carbon electrode. In some embodiments, the electrolyte is a redox electrolyte. In some embodiments, the electrolyte comprises an acid. In some embodiments, the electrolyte comprises a solvent. In some embodiments, the electrolyte comprises an acid and a solvent. In some embodiments, the acid is a strong acid. In some embodiments, the strong acid comprises perchloric acid, hydroiodic acid, hydrobromic acid, hydrochloric acid, sulfuric acid, p-toluenesulfonic acid, methanesulfonic acid, or any combination thereof.

In some embodiments, the solvent comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof.

In some embodiments, the concentration of the acid is about 0.5 molar (M) to about 2 M. In some embodiments, the concentration of the acid is at least about 0.5 M. In some embodiments, the concentration of the acid is at most about 2 M. In some embodiments, the concentration of the acid is about 0.5 M to about 0.75 M, about 0.5 M to about 1 M, about 0.5 M to about 1.25 M, about 0.5 M to about 1.5 M, about 0.5 M to about 1.75 M, about 0.5 M to about 2 M, about 0.75 M to about 1 M, about 0.75 M to about 1.25 M, about 0.75 M to about 1.5 M, about 0.75 M to about 1.75 M, about 0.75 M to about 2 M, about 1 M to about 1.25 M, about 1 M to about 1.5 M, about 1 M to about 1.75 M, about 1 M to about 2 M, about 1.25 M to about 1.5 M, about 1.25 M to about 1.75 M, about 1.25 M to about 2 M, about 1.5 M to about 1.75 M, about 1.5 M to about 2 M, or about 1.75 M to about 2 M.

In some embodiments, the electrolyte is aqueous.

In those embodiments, the supercapacitor has a working potential of about 0.3 volts (V) to about 1 V. In those embodiments, the supercapacitor has a working potential of at least about 0.3 V. In those embodiments, the supercapacitor has a working potential of at most about 1V. In those embodiments, the supercapacitor has a working potential of about 0.3 V to about 0.4 V, about 0.3 V to about 0.5 V, about 0.3 V to about 0.6 V, about 0.3 V to about 0.7 V, about 0.3 V to about 0.8 V, about 0.3 V to about 0.9 V, about 0.3 V to about 1 V, about 0.4 V to about 0.5 V, about 0.4 V to about 0.6 V, about 0.4 V to about 0.7 V, about 0.4 V to about 0.8 V, about 0.4 V to about 0.9 V, about 0.4 V to about 1 V, about 0.5 V to about 0.6 V, about 0.5 V to about 0.7 V, about 0.5 V to about 0.8 V, about 0.5 V to about 0.9 V, about 0.5 V to about 1 V, about 0.6 V to about 0.7 V, about 0.6 V to about 0.8 V, about 0.6 V to about 0.9 V, about 0.6 V to about 1 V, about 0.7 V to about 0.8 V, about 0.7 V to about 0.9 V, about 0.7 V to about 1 V, about 0.8 V to about 0.9 V, about 0.8 V to about 1 V, or about 0.9 V to about 1 V.

In those embodiments, after about 1,000 cycles of charging, the gravimetric capacitance of the supercapacitor reduces by about 4% to about 18%. In those embodiments, after about 1,000 cycles of charging, the gravimetric capacitance of the supercapacitor reduces by at most about 18%. In those embodiments, after about 1,000 cycles of charging, the gravimetric capacitance of the supercapacitor reduces by about 4% to about 8%, about 4% to about 10%, about 4% to about 12%, about 4% to about 14%, about 4% to about 16%, about 4% to about 18%, about 8% to about 10%, about 8% to about 12%, about 8% to about 14%, about 8% to about 16%, about 8% to about 18%, about 10% to about 12%, about 10% to about 14%, about 10% to about 16%, about 10% to about 18%, about 12% to about 14%, about 12% to about 16%, about 12% to about 18%, about 14% to about 16%, about 14% to about 18%, or about 16% to about 18%.

In those embodiments, after about 5,000 cycles of charging, the gravimetric capacitance of the supercapacitor reduces by about 6% to about 26%. In those embodiments, after about 5,000 cycles of charging, the gravimetric capacitance of the supercapacitor reduces by at least about 6%. In those embodiments, after about 5,000 cycles of charging, the gravimetric capacitance of the supercapacitor reduces by at most about 26%. In those embodiments, after about 5,000 cycles of charging, the gravimetric capacitance of the supercapacitor reduces by about 6% to about 10%, about 6% to about 14%, about 6% to about 18%, about 6% to about 22%, about 6% to about 26%, about 10% to about 14%, about 10% to about 18%, about 10% to about 22%, about 10% to about 26%, about 14% to about 18%, about 14% to about 22%, about 14% to about 26%, about 18% to about 22%, about 18% to about 26%, or about 22% to about 26%.

In those embodiments, the supercapacitor has a gravimetric capacitance, in a current density of about 1 amps/grams (A/g), of about 300 farads/grams (F/g) to about 1,400 F/g. In those embodiments, the supercapacitor has a gravimetric capacitance, in a current density of about 1 A/g, of at least about 300 F/g. In those embodiments, the supercapacitor has a gravimetric capacitance, in a current density of about 1 A/g, of at most about 1,400 F/g. In those embodiments, the supercapacitor has a gravimetric capacitance, in a current density of about 1 A/g, of about 300 F/g to about 500 F/g, about 300 F/g to about 700 F/g, about 300 F/g to about 900 F/g, about 300 F/g to about 1,100 F/g, about 300 F/g to about 1,400 F/g, about 500 F/g to about 700 F/g, about 500 F/g to about 900 F/g, about 500 F/g to about 1,100 F/g, about 500 F/g to about 1,400 F/g, about 700 F/g to about 900 F/g, about 700 F/g to about 1,100 F/g, about 700 F/g to about 1,400 F/g, about 900 F/g to about 1,100 F/g, about 900 F/g to about 1,400 F/g, or about 1,100 F/g to about 1,400 F/g.

In those embodiments, the supercapacitor has a gravimetric capacitance, in a current density of about 2 A/g, of about 250 F/g to about 1,200 F/g. In those embodiments, the supercapacitor has a gravimetric capacitance, in a current density of about 2 A/g, of at least about 250 F/g. In those embodiments, the supercapacitor has a gravimetric capacitance, in a current density of about 2 A/g, of at most about 1.20 F/g. In those embodiments, the supercapacitor has a gravimetric capacitance, in a current density of about 2 A/g, of about 250 F/g to about 500 F/g, about 250 F/g to about 750 F/g, about 250 F/g to about 1,000 F/g, about 250 F/g to about 1,200 F/g, about 500 F/g to about 750 F/g, about 500 F/g to about 1,000 F/g, about 500 F/g to about 1,200 F/g, about 750 F/g to about 1,000 F/g, about 750 F/g to about 1,200 F/g, or about 1,000 F/g to about 1,200 F/g.

In those embodiments, the supercapacitor has a gravimetric capacitance, in a current density of about 10 A/g, of about 200 F/g to about 900 F/g. In those embodiments, the supercapacitor has a gravimetric capacitance, in a current density of about 10 A/g, of at least about 200 F/g. In those embodiments, the supercapacitor has a gravimetric capacitance, in a current density of about 10 A/g, of at most about 900 F/g. In those embodiments, the supercapacitor has a gravimetric capacitance, in a current density of about 10 A/g, of about 200 F/g to about 300 F/g, about 200 F/g to about 400 F/g, about 200 F/g to about 500 F/g, about 200 F/g to about 600 F/g, about 200 F/g to about 700 F/g, about 200 F/g to about 800 F/g, about 200 F/g to about 900 F/g, about 300 F/g to about 400 F/g, about 300 F/g to about 500 F/g, about 300 F/g to about 600 F/g, about 300 F/g to about 700 F/g, about 300 F/g to about 800 F/g, about 300 F/g to about 900 F/g, about 400 F/g to about 500 F/g, about 400 F/g to about 600 F/g, about 400 F/g to about 700 F/g, about 400 F/g to about 800 F/g, about 400 F/g to about 900 F/g, about 500 F/g to about 600 F/g, about 500 F/g to about 700 F/g, about 500 F/g to about 800 F/g, about 500 F/g to about 900 F/g, about 600 F/g to about 700 F/g, about 600 F/g to about 800 F/g, about 600 F/g to about 900 F/g, about 700 F/g to about 800 F/g, about 700 F/g to about 900 F/g, or about 800 F/g to about 900 F/g.

In those embodiments, the supercapacitor has a gravimetric capacitance, in a current density of about 20 A/g, of about 150 F/g to about 700 F/g. In those embodiments, the supercapacitor has a gravimetric capacitance, in a current density of about 20 A/g, of at least about 150 F/g. In those embodiments, the supercapacitor has a gravimetric capacitance, in a current density of about 20 A/g, of at most about 700 F/g. In those embodiments, the supercapacitor has a gravimetric capacitance, in a current density of about 20 A/g, of about 150 F/g to about 250 F/g, about 150 F/g to about 350 F/g, about 150 F/g to about 450 F/g, about 150 F/g to about 550 F/g, about 150 F/g to about 650 F/g, about 150 F/g to about 700 F/g, about 250 F/g to about 350 F/g, about 250 F/g to about 450 F/g, about 250 F/g to about 550 F/g, about 250 F/g to about 650 F/g, about 250 F/g to about 700 F/g, about 350 F/g to about 450 F/g, about 350 F/g to about 550 F/g, about 350 F/g to about 650 F/g, about 350 F/g to about 700 F/g, about 450 F/g to about 550 F/g, about 450 F/g to about 650 F/g, about 450 F/g to about 700 F/g, about 550 F/g to about 650 F/g, about 550 F/g to about 700 F/g, or about 650 F/g to about 700 F/g.

In those embodiments, the supercapacitor has a gravimetric capacitance, in a current density of about 50 A/g, of about 125 F/g to about 600 F/g. In those embodiments, the supercapacitor has a gravimetric capacitance, in a current density of about 50 A/g, of at least about 125 F/g. In those embodiments, the supercapacitor has a gravimetric capacitance, in a current density of about 50 A/g, of at least about 600 F/g. In those embodiments, the supercapacitor has a gravimetric capacitance, in a current density of about 50 A/g, of about 125 F/g to about 150 F/g, about 125 F/g to about 200 F/g, about 125 F/g to about 300 F/g, about 125 F/g to about 400 F/g, about 125 F/g to about 500 F/g, about 125 F/g to about 600 F/g, about 150 F/g to about 200 F/g, about 150 F/g to about 300 F/g, about 150 F/g to about 400 F/g, about 150 F/g to about 500 F/g, about 150 F/g to about 600 F/g, about 200 F/g to about 300 F/g, about 200 F/g to about 400 F/g, about 200 F/g to about 500 F/g, about 200 F/g to about 600 F/g, about 300 F/g to about 400 F/g, about 300 F/g to about 500 F/g, about 300 F/g to about 600 F/g, about 400 F/g to about 500 F/g, about 400 F/g to about 600 F/g, or about 500 F/g to about 600 F/g.

In those embodiments, the supercapacitor has a gravimetric energy density of about 30 watt hours per kilogram (Wh/kg) to about 120 Wh/kg. In those embodiments, the supercapacitor has a gravimetric energy density of at least about 30 Wh/kg. In those embodiments, the supercapacitor has a gravimetric energy density of at most about 120 Wh/kg. In those embodiments, the supercapacitor has a gravimetric energy density of about 30 Wh/kg to about 40 Wh/kg, about 30 Wh/kg to about 50 Wh/kg, about 30 Wh/kg to about 60 Wh/kg, about 30 Wh/kg to about 70 Wh/kg, about 30 Wh/kg to about 80 Wh/kg, about 30 Wh/kg to about 100 Wh/kg, about 30 Wh/kg to about 120 Wh/kg, about 40 Wh/kg to about 50 Wh/kg, about 40 Wh/kg to about 60 Wh/kg, about 40 Wh/kg to about 70 Wh/kg, about 40 Wh/kg to about 80 Wh/kg, about 40 Wh/kg to about 100 Wh/kg, about 40 Wh/kg to about 120 Wh/kg, about 50 Wh/kg to about 60 Wh/kg, about 50 Wh/kg to about 70 Wh/kg, about 50 Wh/kg to about 80 Wh/kg, about 50 Wh/kg to about 100 Wh/kg, about 50 Wh/kg to about 120 Wh/kg, about 60 Wh/kg to about 70 Wh/kg, about 60 Wh/kg to about 80 Wh/kg, about 60 Wh/kg to about 100 Wh/kg, about 60 Wh/kg to about 120 Wh/kg, about 70 Wh/kg to about 80 Wh/kg, about 70 Wh/kg to about 100 Wh/kg, about 70 Wh/kg to about 120 Wh/kg, about 80 Wh/kg to about 100 Wh/kg, about 80 Wh/kg to about 120 Wh/kg, or about 100 Wh/kg to about 120 Wh/kg.

In some embodiments, the electrolyte is aqueous and further comprises a quinone wherein the quinone comprises 1,2-Benzoquinone; 1,4-Benzoquinone; 1,4-Naphthoquinone; 9,10-Anthraquinone; or any combination thereof.

In those embodiments, the quinone has a concentration of about 0.25 M to about 1 M. In those embodiments, the quinone has a concentration of at least about 0.25 M. In those embodiments, the quinone has a concentration of at most about 1 M. In those embodiments, the quinone has a concentration of about 0.25 M to about 0.375 M, about 0.25 M to about 0.5 M, about 0.25 M to about 0.625 M, about 0.25 M to about 1 M, about 0.375 M to about 0.5 M, about 0.375 M to about 0.625 M, about 0.375 M to about 1 M, about 0.5 M to about 0.625 M, about 0.5 M to about 1 M, or about 0.625 M to about 1 M.

In those embodiments, the supercapacitor has a working potential of about 0.4 V to about 1.2 V. In those embodiments, the supercapacitor has a working potential of at least about 0.4 V. In those embodiments, the supercapacitor has a working potential of at most about 1.2 V In those embodiments, the supercapacitor has a working potential of about 0.4 V to about 0.5 V, about 0.4 V to about 0.6 V, about 0.4 V to about 0.7 V, about 0.4 V to about 0.8 V, about 0.4 V to about 0.9 V, about 0.4 V to about 1 V, about 0.4 V to about 1.1 V, about 0.4 V to about 1.2 V, about 0.5 V to about 0.6 V, about 0.5 V to about 0.7 V, about 0.5 V to about 0.8 V, about 0.5 V to about 0.9 V, about 0.5 V to about 1 V, about 0.5 V to about 1.1 V, about 0.5 V to about 1.2 V, about 0.6 V to about 0.7 V, about 0.6 V to about 0.8 V, about 0.6 V to about 0.9 V, about 0.6 V to about 1 V, about 0.6 V to about 1.1 V, about 0.6 V to about 1.2 V, about 0.7 V to about 0.8 V, about 0.7 V to about 0.9 V, about 0.7 V to about 1 V, about 0.7 V to about 1.1 V, about 0.7 V to about 1.2 V, about 0.8 V to about 0.9 V, about 0.8 V to about 1 V, about 0.8 V to about 1.1 V, about 0.8 V to about 1.2 V, about 0.9 V to about 1 V, about 0.9 V to about 1.1 V, about 0.9 V to about 1.2 V, about 1 V to about 1.1 V, about 1 V to about 1.2 V, or about 1.1 V to about 1.2 V.

In those embodiments, the supercapacitor has a gravimetric capacitance, in a current density of about 0.2 A/g, of about 300 F/g to about 1,400 F/g. In those embodiments, the supercapacitor has a gravimetric capacitance, in a current density of about 0.2 A/g, of at least about 300 F/g. In those embodiments, the supercapacitor has a gravimetric capacitance, in a current density of about 0.2 A/g, of at most about 11,400 F/g. In those embodiments, the supercapacitor has a gravimetric capacitance, in a current density of about 0.2 A/g, of about 300 F/g to about 500 F/g, about 300 F/g to about 700 F/g, about 300 F/g to about 900 F/g, about 300 F/g to about 1,100 F/g, about 300 F/g to about 1,400 F/g, about 500 F/g to about 700 F/g, about 500 F/g to about 900 F/g, about 500 F/g to about 1,100 F/g, about 500 F/g to about 1,400 F/g, about 700 F/g to about 900 F/g, about 700 F/g to about 1,100 F/g, about 700 F/g to about 1,400 F/g, about 900 F/g to about 1,100 F/g, about 900 F/g to about 1,400 F/g, or about 1,100 F/g to about 1,400 F/g.

In those embodiments, the supercapacitor has a gravimetric energy density of about 12 Wh/kg to about 120 Wh/kg. In those embodiments, the supercapacitor has a gravimetric energy density of at least about 12 Wh/kg. In those embodiments, the supercapacitor has a gravimetric energy density of at most about 120 Wh/kg. In those embodiments, the supercapacitor has a gravimetric energy density of about 12 Wh/kg to about 20 Wh/kg, about 12 Wh/kg to about 40 Wh/kg, about 12 Wh/kg to about 60 Wh/kg, about 12 Wh/kg to about 80 Wh/kg, about 12 Wh/kg to about 100 Wh/kg, about 12 Wh/kg to about 120 Wh/kg, about 20 Wh/kg to about 40 Wh/kg, about 20 Wh/kg to about 60 Wh/kg, about 20 Wh/kg to about 80 Wh/kg, about 20 Wh/kg to about 100 Wh/kg, about 20 Wh/kg to about 120 Wh/kg, about 40 Wh/kg to about 60 Wh/kg, about 40 Wh/kg to about 80 Wh/kg, about 40 Wh/kg to about 100 Wh/kg, about 40 Wh/kg to about 120 Wh/kg, about 60 Wh/kg to about 80 Wh/kg, about 60 Wh/kg to about 100 Wh/kg, about 60 Wh/kg to about 120 Wh/kg, about 80 Wh/kg to about 100 Wh/kg, about 80 Wh/kg to about 120 Wh/kg, or about 100 Wh/kg to about 120 Wh/kg.

In some embodiments, the electrolyte is a gel and further comprises a quinone comprising 1,2-Benzoquinone, 1,4-Benzoquinone, 1,4-Naphthoquinone, 9,10-Anthraquinone or any combination thereof.

In those embodiments, the concentration of the quinone is about 5 millimolar (mM) to about 20 millimolar. In those embodiments, the concentration of the quinone is at least about 5 millimolar. In those embodiments, the concentration of the quinone is at most about 20 millimolar. In those embodiments, the concentration of the quinone is about 5 millimolar to about 7 millimolar, about 5 millimolar to about 9 millimolar, about 5 millimolar to about 11 millimolar, about 5 millimolar to about 13 millimolar, about 5 millimolar to about 15 millimolar, about 5 millimolar to about 20 millimolar, about 7 millimolar to about 9 millimolar, about 7 millimolar to about 11 millimolar, about 7 millimolar to about 13 millimolar, about 7 millimolar to about 15 millimolar, about 7 millimolar to about 20 millimolar, about 9 millimolar to about 11 millimolar, about 9 millimolar to about 13 millimolar, about 9 millimolar to about 15 millimolar, about 9 millimolar to about 20 millimolar, about 11 millimolar to about 13 millimolar, about 11 millimolar to about 15 millimolar, about 11 millimolar to about 20 millimolar, about 13 millimolar to about 15 millimolar, about 13 millimolar to about 20 millimolar, or about 15 millimolar to about 20 millimolar.

In those embodiments, the supercapacitor has a working potential of about 0.4 V to about 1.6 V. In those embodiments, the supercapacitor has a working potential of at least about 0.4 V. In those embodiments, the supercapacitor has a working potential of at most about 0.4 V. In those embodiments, the supercapacitor has a working potential of about 0.4 V to about 0.5 V, about 0.4 V to about 0.6 V, about 0.4

V to about 0.7 V, about 0.4 V to about 0.8 V, about 0.4 V to about 0.9 V, about 0.4 V to about 1 V, about 0.4 V to about 1.2 V, about 0.4 V to about 1.4 V, about 0.4 V to about 1.6 V, about 0.5 V to about 0.6 V, about 0.5 V to about 0.7 V, about 0.5 V to about 0.8 V, about 0.5 V to about 0.9 V, about 0.5 V to about 1 V, about 0.5 V to about 1.2 V, about 0.5 V to about 1.4 V, about 0.5 V to about 1.6 V, about 0.6 V to about 0.7 V, about 0.6 V to about 0.8 V, about 0.6 V to about 0.9 V, about 0.6 V to about 1 V, about 0.6 V to about 1.2 V, about 0.6 V to about 1.4 V, about 0.6 V to about 1.6 V, about 0.7 V to about 0.8 V, about 0.7 V to about 0.9 V, about 0.7 V to about 1 V, about 0.7 V to about 1.2 V, about 0.7 V to about 1.4 V, about 0.7 V to about 1.6 V, about 0.8 V to about 0.9 V, about 0.8 V to about 1 V, about 0.8 V to about 1.2 V, about 0.8 V to about 1.4 V, about 0.8 V to about 1.6 V, about 0.9 V to about 1 V, about 0.9 V to about 1.2 V, about 0.9 V to about 1.4 V, about 0.9 V to about 1.6 V, about 1 V to about 1.2 V, about 1 V to about 1.4 V, about 1 V to about 1.6 V, about 1.2 V to about 1.4 V, about 1.2 V to about 1.6 V, or about 1.4 V to about 1.6 V.

In those embodiments, the supercapacitor has a gravimetric capacitance, in a current density of about 2 A/g, of about 350 F/g to about 1,400 F/g. In those embodiments, the supercapacitor has a gravimetric capacitance, in a current density of about 2 A/g, of at least about 350 F/g. In those embodiments, the supercapacitor has a gravimetric capacitance, in a current density of about 2 A/g, of at most about 1,400 F/g. In those embodiments, the supercapacitor has a gravimetric capacitance, in a current density of about 2 A/g, of about 350 F/g to about 450 F/g, about 350 F/g to about 550 F/g, about 350 F/g to about 650 F/g, about 350 F/g to about 750 F/g, about 350 F/g to about 850 F/g, about 350 F/g to about 1,000 F/g, about 350 F/g to about 1,200 F/g, about 350 F/g to about 1,400 F/g, about 450 F/g to about 550 F/g, about 450 F/g to about 650 F/g, about 450 F/g to about 750 F/g, about 450 F/g to about 850 F/g, about 450 F/g to about 1,000 F/g, about 450 F/g to about 1,200 F/g, about 450 F/g to about 1,400 F/g, about 550 F/g to about 650 F/g, about 550 F/g to about 750 F/g, about 550 F/g to about 850 F/g, about 550 F/g to about 1,000 F/g, about 550 F/g to about 1,200 F/g, about 550 F/g to about 1,400 F/g, about 650 F/g to about 750 F/g, about 650 F/g to about 850 F/g, about 650 F/g to about 1,000 F/g, about 650 F/g to about 1,200 F/g, about 650 F/g to about 1,400 F/g, about 750 F/g to about 850 F/g, about 750 F/g to about 1,000 F/g, about 750 F/g to about 1,200 F/g, about 750 F/g to about 1,400 F/g, about 850 F/g to about 1,000 F/g, about 850 F/g to about 1,200 F/g, about 850 F/g to about 1,400 F/g, about 1,000 F/g to about 1,200 F/g, about 1,000 F/g to about 1,400 F/g, or about 1,200 F/g to about 1,400 F/g.

In those embodiments, the supercapacitor has a gravimetric energy density of about 30 Wh/kg to about 130 Wh/kg. In those embodiments, the supercapacitor has a gravimetric energy density of at least about 30 Wh/kg. In those embodiments, the supercapacitor has a gravimetric energy density of at most about 130 Wh/kg. In those embodiments, the supercapacitor has a gravimetric energy density of about 30 Wh/kg to about 40 Wh/kg, about 30 Wh/kg to about 50 Wh/kg, about 30 Wh/kg to about 60 Wh/kg, about 30 Wh/kg to about 70 Wh/kg, about 30 Wh/kg to about 80 Wh/kg, about 30 Wh/kg to about 100 Wh/kg, about 30 Wh/kg to about 120 Wh/kg, about 30 Wh/kg to about 130 Wh/kg, about 40 Wh/kg to about 50 Wh/kg, about 40 Wh/kg to about 60 Wh/kg, about 40 Wh/kg to about 70 Wh/kg, about 40 Wh/kg to about 80 Wh/kg, about 40 Wh/kg to about 100 Wh/kg, about 40 Wh/kg to about 120 Wh/kg, about 40 Wh/kg to about 130 Wh/kg, about 50 Wh/kg to about 60 Wh/kg, about 50 Wh/kg to about 70 Wh/kg, about 50 Wh/kg to about 80 Wh/kg, about 50 Wh/kg to about 100 Wh/kg, about 50 Wh/kg to about 120 Wh/kg, about 50 Wh/kg to about 130 Wh/kg, about 60 Wh/kg to about 70 Wh/kg, about 60 Wh/kg to about 80 Wh/kg, about 60 Wh/kg to about 100 Wh/kg, about 60 Wh/kg to about 120 Wh/kg, about 60 Wh/kg to about 130 Wh/kg, about 70 Wh/kg to about 80 Wh/kg, about 70 Wh/kg to about 100 Wh/kg, about 70 Wh/kg to about 120 Wh/kg, about 70 Wh/kg to about 130 Wh/kg, about 80 Wh/kg to about 100 Wh/kg, about 80 Wh/kg to about 120 Wh/kg, about 80 Wh/kg to about 130 Wh/kg, about 100 Wh/kg to about 120 Wh/kg, about 100 Wh/kg to about 130 Wh/kg, or about 120 Wh/kg to about 130 Wh/kg.

In some embodiments, the supercapacitor further comprises a third functionalized carbon electrode. In some embodiments the third functionalized carbon electrode is a polyaniline functionalized carbon electrode.

In some embodiments, the electrolyte is disposed between the electrodes. In some embodiments, the electrolyte comprises an acid. In some embodiments, the electrolyte comprises a solvent. In some embodiments, the electrolyte comprises an acid and a solvent. In some embodiments, the acid is a strong acid. In some embodiments, the strong acid comprises perchloric acid, hydroiodic acid, hydrobromic acid, hydrochloric acid, sulfuric acid, p-toluenesulfonic acid methanesulfonic acid, or any combination thereof. In some embodiments, the solvent comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof. In some embodiments the concentration of the acid has a great influence on the structure and properties of polyaniline (PANI).

In those embodiments, the concentration of the quinone is about 0.25 millimolar to about 1 millimolar. In those embodiments, the concentration of the quinone is at least about 0.25 millimolar. In those embodiments, the concentration of the quinone is at most about 1 millimolar. In those embodiments, the concentration of the quinone is about 0.25 millimolar to about 0.375 millimolar, about 0.25 millimolar to about 0.5 millimolar, about 0.25 millimolar to about 0.625 millimolar, about 0.25 millimolar to about 0.75 millimolar, about 0.25 millimolar to about 1 millimolar, about 0.375 millimolar to about 0.5 millimolar, about 0.375 millimolar to about 0.625 millimolar, about 0.375 millimolar to about 0.75 millimolar, about 0.375 millimolar to about 1 millimolar, about 0.5 millimolar to about 0.625 millimolar, about 0.5 millimolar to about 0.75 millimolar, about 0.5 millimolar to about 1 millimolar, about 0.625 millimolar to about 0.75 millimolar, about 0.625 millimolar to about 1 millimolar, or about 0.75 millimolar to about 1 millimolar.

In those embodiments, the supercapacitor has a working potential of about 0.1 V to about 1.6 V. In those embodiments, the supercapacitor has a working potential of at least about 0.1 V. In those embodiments, the supercapacitor has a working potential of at most about 1.6 V. In those embodiments, the supercapacitor has a working potential of about 0.1 V to about 0.2 V, about 0.1 V to about 0.3 V, about 0.1 V to about 0.4 V, about 0.1 V to about 0.6 V, about 0.1 V to about 0.8 V, about 0.1 V to about 1 V, about 0.1 V to about 1.2 V, about 0.1 V to about 1.4 V, about 0.1 V to about 1.6 V, about 0.2 V to about 0.3 V, about 0.2 V to about 0.4 V, about 0.2 V to about 0.6 V, about 0.2 V to about 0.8 V, about 0.2 V to about 1 V, about 0.2 V to about 1.2 V, about 0.2 V to about 1.4 V, about 0.2 V to about 1.6 V, about 0.3 V to about 0.4 V, about 0.3 V to about 0.6 V, about 0.3 V to about 0.8 V, about 0.3 V to about 1 V, about 0.3 V to about 1.2 V, about 0.3 V to about 1.4 V, about 0.3 V to about 1.6 V, about 0.4 V to about 0.6 V, about 0.4 V to about 0.8 V, about 0.4 V to about 1 V, about 0.4 V to about 1.2 V, about 0.4 V to about 1.4 V, about 0.4 V to about 1.6 V, about 0.6 V to about 0.8 V, about 0.6 V to about 1 V, about 0.6 V to about 1.2 V, about 0.6 V to about 1.4 V, about 0.6 V to about 1.6 V, about 0.8 V to about 1 V, about 0.8 V to about 1.2 V, about 0.8 V to about 1.4 V, about 0.8 V to about 1.6 V, about 1 V to about 1.2 V, about 1 V to about 1.4 V, about 1 V to about 1.6 V, about 1.2 V to about 1.4 V, about 1.2 V to about 1.6 V, or about 1.4 V to about 1.6 V.

In those embodiments, the supercapacitor has a gravimetric capacitance, in a current density of about 10 A/g, of about 5,000 F/g to about 20,000 F/g. In those embodiments, the supercapacitor has a gravimetric capacitance, in a current density of about 10 A/g, of at least about 5,000 F/g. In those embodiments, the supercapacitor has a gravimetric capacitance, in a current density of about 10 A/g, of at most about 20,000 F/g. In those embodiments, the supercapacitor has a gravimetric capacitance, in a current density of about 10 A/g, of about 5,000 F/g to about 6,000 F/g, about 5,000 F/g to about 7,000 F/g, about 5,000 F/g to about 8,000 F/g, about 5,000 F/g to about 9,000 F/g, about 5,000 F/g to about 10,000 F/g, about 5,000 F/g to about 12,500 F/g, about 5,000 F/g to about 15,000 F/g, about 5,000 F/g to about 17,500 F/g, about 5,000 F/g to about 20,000 F/g, about 6,000 F/g to about 7,000 F/g, about 6,000 F/g to about 8,000 F/g, about 6,000 F/g to about 9,000 F/g, about 6,000 F/g to about 10,000 F/g, about 6,000 F/g to about 12,500 F/g, about 6,000 F/g to about 15,000 F/g, about 6,000 F/g to about 17,500 F/g, about 6,000 F/g to about 20,000 F/g, about 7,000 F/g to about 8,000 F/g, about 7,000 F/g to about 9,000 F/g, about 7,000 F/g to about 10,000 F/g, about 7,000 F/g to about 12,500 F/g, about 7,000 F/g to about 15,000 F/g, about 7,000 F/g to about 17,500 F/g, about 7,000 F/g to about 20,000 F/g, about 8,000 F/g to about 9,000 F/g, about 8,000 F/g to about 10,000 F/g, about 8,000 F/g to about 12,500 F/g, about 8,000 F/g to about 15,000 F/g, about 8,000 F/g to about 17,500 F/g, about 8,000 F/g to about 20,000 F/g, about 9,000 F/g to about 10,000 F/g, about 9,000 F/g to about 12,500 F/g, about 9,000 F/g to about 15,000 F/g, about 9,000 F/g to about 17,500 F/g, about 9,000 F/g to about 20,000 F/g, about 10,000 F/g to about 12,500 F/g, about 10,000 F/g to about 15,000 F/g, about 10,000 F/g to about 17,500 F/g, about 10,000 F/g to about 20,000 F/g, about 12,500 F/g to about 15,000 F/g, about 12,500 F/g to about 17,500 F/g, about 12,500 F/g to about 20,000 F/g, about 15,000 F/g to about 17,500 F/g, about 15,000 F/g to about 20,000 F/g, or about 17,500 F/g to about 20,000 F/g.

A third aspect disclosed herein is a supercapacitor comprising two or more electrodes, wherein the first electrode comprises a functionalized carbon electrode and the second electrode comprises an activated carbon electrode; a current collector; and an electrolyte. In some embodiments, the current collector is metallic. In some embodiments, the functionalized carbon electrode is a polyaniline functionalized carbon electrode. In some embodiments, the current collector is ferritic. In some embodiments, the current collector comprises stainless steel, crucible steel, carbon steel, spring steel, alloy steel, maraging steel, weathering steel, tool steel, or any combination thereof.

In some embodiments, the electrolyte is disposed between the first functionalized carbon electrode and the second functionalized carbon electrode. In some embodiments, the electrolyte comprises an acid. In some embodiments, the electrolyte comprises a solvent. In some embodiments, the electrolyte comprises an acid and a solvent. In some embodiments, the acid is a strong acid. In some embodiments, the strong acid comprises perchloric acid, hydroiodic acid, hydrobromic acid, hydrochloric acid, sulfuric acid, p-toluenesulfonic acid methanesulfonic acid, or any combination thereof. In some embodiments, the solvent comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof.

In some embodiments the electrolyte is an aqueous electrolyte.

In those embodiments, the supercapacitor has a working potential of about 0.6 V to about 2.6 V. In those embodiments, the supercapacitor has a working potential of at least about 0.6 V. In those embodiments, the supercapacitor has a working potential of at most about 2.6 V. In those embodiments, the supercapacitor has a working potential of about 0.6 V to about 0.8 V, about 0.6 V to about 1 V, about 0.6 V to about 1.2 V, about 0.6 V to about 1.4 V, about 0.6 V to about 1.6 V, about 0.6 V to about 1.8 V, about 0.6 V to about 2 V, about 0.6 V to about 2.2 V, about 0.6 V to about 2.4 V, about 0.6 V to about 2.6 V, about 0.8 V to about 1 V, about 0.8 V to about 1.2 V, about 0.8 V to about 1.4 V, about 0.8 V to about 1.6 V, about 0.8 V to about 1.8 V, about 0.8 V to about 2 V, about 0.8 V to about 2.2 V, about 0.8 V to about 2.4 V, about 0.8 V to about 2.6 V, about 1 V to about 1.2 V, about 1 V to about 1.4 V, about 1 V to about 1.6 V, about 1 V to about 1.8 V, about 1 V to about 2 V, about 1 V to about 2.2 V, about 1 V to about 2.4 V, about 1 V to about 2.6 V, about 1.2 V to about 1.4 V, about 1.2 V to about 1.6 V, about 1.2 V to about 1.8 V, about 1.2 V to about 2 V, about 1.2 V to about 2.2 V, about 1.2 V to about 2.4 V, about 1.2 V to about 2.6 V, about 1.4 V to about 1.6 V, about 1.4 V to about 1.8 V, about 1.4 V to about 2 V, about 1.4 V to about 2.2 V, about 1.4 V to about 2.4 V, about 1.4 V to about 2.6 V, about 1.6 V to about 1.8 V, about 1.6 V to about 2 V, about 1.6 V to about 2.2 V, about 1.6 V to about 2.4 V, about 1.6 V to about 2.6 V, about 1.8 V to about 2 V, about 1.8 V to about 2.2 V, about 1.8 V to about 2.4 V, about 1.8 V to about 2.6 V, about 2 V to about 2.2 V, about 2 V to about 2.4 V, about 2 V to about 2.6 V, about 2.2 V to about 2.4 V, about 2.2 V to about 2.6 V, or about 2.4 V to about 2.6 V.

In those embodiments, the supercapacitor has a gravimetric capacitance, in a current density of about 2 A/g, of about 150 F/g to about 600 F/g. In those embodiments, the supercapacitor has a gravimetric capacitance, in a current density of about 2 A/g, of at least about 150 F/g. In those embodiments, the supercapacitor has a gravimetric capacitance, in a current density of about 2 A/g, of at most about 600 F/g. In those embodiments, the supercapacitor has a gravimetric capacitance, in a current density of about 2 A/g, of about 150 F/g to about 200 F/g, about 150 F/g to about 250 F/g, about 150 F/g to about 300 F/g, about 150 F/g to about 350 F/g, about 150 F/g to about 400 F/g, about 150 F/g to about 450 F/g, about 150 F/g to about 500 F/g, about 150 F/g to about 550 F/g, about 150 F/g to about 600 F/g, about 200 F/g to about 250 F/g, about 200 F/g to about 300 F/g, about 200 F/g to about 350 F/g, about 200 F/g to about 400 F/g, about 200 F/g to about 450 F/g, about 200 F/g to about 500 F/g, about 200 F/g to about 550 F/g, about 200 F/g to about 600 F/g, about 250 F/g to about 300 F/g, about 250 F/g to about 350 F/g, about 250 F/g to about 400 F/g, about 250 F/g to about 450 F/g, about 250 F/g to about 500 F/g, about 250 F/g to about 550 F/g, about 250 F/g to about 600 F/g, about 300 F/g to about 350 F/g, about 300 F/g to about 400 F/g, about 300 F/g to about 450 F/g, about 300 F/g to about 500 F/g, about 300 F/g to about 550 F/g, about 300 F/g to about 600 F/g, about 350 F/g to about 400 F/g, about 350 F/g to about 450 F/g, about 350 F/g to about 500 F/g, about 350 F/g to about 550 F/g, about 350 F/g to about 600 F/g, about 400 F/g to about 450 F/g, about 400 F/g to about 500 F/g, about 400 F/g to about 550 F/g, about 400 F/g to about 600 F/g, about 450 F/g to about 500 F/g, about 450 F/g to about 550 F/g, about 450 F/g to about 600 F/g, about 500 F/g to about 550 F/g, about 500 F/g to about 600 F/g, or about 550 F/g to about 600 F/g.

In those embodiments, the supercapacitor has a gravimetric energy density of about 45 Wh/kg to about 180 Wh/kg. In those embodiments, the supercapacitor has a gravimetric energy density of at least about 45 Wh/kg. In those embodiments, the supercapacitor has a gravimetric energy density of at most about 180 Wh/kg. In those embodiments, the supercapacitor has a gravimetric energy density of about 45 Wh/kg to about 60 Wh/kg, about 45 Wh/kg to about 80 Wh/kg, about 45 Wh/kg to about 100 Wh/kg, about 45 Wh/kg to about 120 Wh/kg, about 45 Wh/kg to about 140 Wh/kg, about 45 Wh/kg to about 160 Wh/kg, about 45 Wh/kg to about 180 Wh/kg, about 60 Wh/kg to about 80 Wh/kg, about 60 Wh/kg to about 100 Wh/kg, about 60 Wh/kg to about 120 Wh/kg, about 60 Wh/kg to about 140 Wh/kg, about 60 Wh/kg to about 160 Wh/kg, about 60 Wh/kg to about 180 Wh/kg, about 80 Wh/kg to about 100 Wh/kg, about 80 Wh/kg to about 120 Wh/kg, about 80 Wh/kg to about 140 Wh/kg, about 80 Wh/kg to about 160 Wh/kg, about 80 Wh/kg to about 180 Wh/kg, about 100 Wh/kg to about 120 Wh/kg, about 100 Wh/kg to about 140 Wh/kg, about 100 Wh/kg to about 160 Wh/kg, about 100 Wh/kg to about 180 Wh/kg, about 120 Wh/kg to about 140 Wh/kg, about 120 Wh/kg to about 160 Wh/kg, about 120 Wh/kg to about 180 Wh/kg, about 140 Wh/kg to about 160 Wh/kg, about 140 Wh/kg to about 180 Wh/kg, or about 160 Wh/kg to about 180 Wh/kg.

In some embodiments, the aqueous electrolyte comprises a quinone.

In those embodiments, the concentration of the quinone is about 0.25 millimolar to about 1 millimolar. In those embodiments, the concentration of the quinone is at least about 0.25 millimolar. In those embodiments, the concentration of the quinone is at most about 1 millimolar. In those embodiments, the concentration of the quinone is about 0.25 millimolar to about 0.375 millimolar, about 0.25 millimolar to about 0.5 millimolar, about 0.25 millimolar to about 0.625 millimolar, about 0.25 millimolar to about 0.75 millimolar, about 0.25 millimolar to about 1 millimolar, about 0.375 millimolar to about 0.5 millimolar, about 0.375 millimolar to about 0.625 millimolar, about 0.375 millimolar to about 0.75 millimolar, about 0.375 millimolar to about 1 millimolar, about 0.5 millimolar to about 0.625 millimolar, about 0.5 millimolar to about 0.75 millimolar, about 0.5 millimolar to about 1 millimolar, about 0.625 millimolar to about 0.75 millimolar, about 0.625 millimolar to about 1 millimolar, or about 0.75 millimolar to about 1 millimolar.

In those embodiments, the supercapacitor has a working potential of about 0.6 V to about 3.5 V. In those embodiments, the supercapacitor has a working potential of at least about 0.6 V. In those embodiments, the supercapacitor has a working potential of at most about 3.5 V. In those embodiments, the supercapacitor has a working potential of about 0.6 V to about 0.8 V, about 0.6 V to about 1 V, about 0.6 V to about 1.2 V, about 0.6 V to about 1.4 V, about 0.6 V to about 1.6 V, about 0.6 V to about 1.8 V, about 0.6 V to about 2 V, about 0.6 V to about 2.5 V, about 0.6 V to about 3 V, about 0.6 V to about 3.5 V, about 0.8 V to about 1 V, about 0.8 V to about 1.2 V, about 0.8 V to about 1.4 V, about 0.8 V to about 1.6 V, about 0.8 V to about 1.8 V, about 0.8 V to about 2 V, about 0.8 V to about 2.5 V, about 0.8 V to about 3 V, about 0.8 V to about 3.5 V, about 1 V to about 1.2 V, about 1 V to about 1.4 V, about 1 V to about 1.6 V, about 1 V to about 1.8 V, about 1 V to about 2 V, about 1 V to about 2.5 V, about 1 V to about 3 V, about 1 V to about 3.5 V, about 1.2 V to about 1.4 V, about 1.2 V to about 1.6 V, about 1.2 V to about 1.8 V, about 1.2 V to about 2 V, about 1.2 V to about 2.5 V, about 1.2 V to about 3 V, about 1.2 V to about 3.5 V, about 1.4 V to about 1.6 V, about 1.4 V to about 1.8 V, about 1.4 V to about 2 V, about 1.4 V to about 2.5 V, about 1.4 V to about 3 V, about 1.4 V to about 3.5 V, about 1.6 V to about 1.8 V, about 1.6 V to about 2 V, about 1.6 V to about 2.5 V, about 1.6 V to about 3 V, about 1.6 V to about 3.5 V, about 1.8 V to about 2 V, about 1.8 V to about 2.5 V, about 1.8 V to about 3 V, about 1.8 V to about 3.5 V, about 2 V to about 2.5 V, about 2 V to about 3 V, about 2 V to about 3.5 V, about 2.5 V to about 3 V, about 2.5 V to about 3.5 V, or about 3 V to about 3.5 V.

In those embodiments, the supercapacitor has a gravimetric capacitance, in a current density of about 2 A/g, of about 150 F/g to about 700 F/g. In those embodiments, the supercapacitor has a gravimetric capacitance, in a current density of about 2 A/g, of at least about 150 F/g. In those embodiments, the supercapacitor has a gravimetric capacitance, in a current density of about 2 A/g, of at most about 700 F/g. In those embodiments, the supercapacitor has a gravimetric capacitance, in a current density of about 2 A/g, of about 150 F/g to about 200 F/g, about 150 F/g to about 250 F/g, about 150 F/g to about 300 F/g, about 150 F/g to about 350 F/g, about 150 F/g to about 400 F/g, about 150 F/g to about 450 F/g, about 150 F/g to about 500 F/g, about 150 F/g to about 600 F/g, about 150 F/g to about 700 F/g, about 200 F/g to about 250 F/g, about 200 F/g to about 300 F/g, about 200 F/g to about 350 F/g, about 200 F/g to about 400 F/g, about 200 F/g to about 450 F/g, about 200 F/g to about 500 F/g, about 200 F/g to about 600 F/g, about 200 F/g to about 700 F/g, about 250 F/g to about 300 F/g, about 250 F/g to about 350 F/g, about 250 F/g to about 400 F/g, about 250 F/g to about 450 F/g, about 250 F/g to about 500 F/g, about 250 F/g to about 600 F/g, about 250 F/g to about 700 F/g, about 300 F/g to about 350 F/g, about 300 F/g to about 400 F/g, about 300 F/g to about 450 F/g, about 300 F/g to about 500 F/g, about 300 F/g to about 600 F/g, about 300 F/g to about 700 F/g, about 350 F/g to about 400 F/g, about 350 F/g to about 450 F/g, about 350 F/g to about 500 F/g, about 350 F/g to about 600 F/g, about 350 F/g to about 700 F/g, about 400 F/g to about 450 F/g, about 400 F/g to about 500 F/g, about 400 F/g to about 600 F/g, about 400 F/g to about 700 F/g, about 450 F/g to about 500 F/g, about 450 F/g to about 600 F/g, about 450 F/g to about 700 F/g, about 500 F/g to about 600 F/g, about 500 F/g to about 700 F/g, or about 600 F/g to about 700 F/g.

In those embodiments, the supercapacitor has a gravimetric energy density of about 40 Wh/kg to about 1,600 Wh/kg. In those embodiments, the supercapacitor has a gravimetric energy density of at least about 40 Wh/kg. In those embodiments, the supercapacitor has a gravimetric energy density of at most about 1,600 Wh/kg. In those embodiments, the supercapacitor has a gravimetric energy density of about 40 Wh/kg to about 50 Wh/kg, about 40 Wh/kg to about 100 Wh/kg, about 40 Wh/kg to about 250 Wh/kg, about 40 Wh/kg to about 500 Wh/kg, about 40 Wh/kg to about 750 Wh/kg, about 40 Wh/kg to about 1,000 Wh/kg, about 40 Wh/kg to about 1,250 Wh/kg, about 40 Wh/kg to about 1,600 Wh/kg, about 50 Wh/kg to about 100 Wh/kg, about 50

Wh/kg to about 250 Wh/kg, about 50 Wh/kg to about 500 Wh/kg, about 50 Wh/kg to about 750 Wh/kg, about 50 Wh/kg to about 1,000 Wh/kg, about 50 Wh/kg to about 1,250 Wh/kg, about 50 Wh/kg to about 1,600 Wh/kg, about 100 Wh/kg to about 250 Wh/kg, about 100 Wh/kg to about 500 Wh/kg, about 100 Wh/kg to about 750 Wh/kg, about 100 Wh/kg to about 1,000 Wh/kg, about 100 Wh/kg to about 1,250 Wh/kg, about 100 Wh/kg to about 1,600 Wh/kg, about 250 Wh/kg to about 500 Wh/kg, about 250 Wh/kg to about 750 Wh/kg, about 250 Wh/kg to about 1,000 Wh/kg, about 250 Wh/kg to about 1,250 Wh/kg, about 250 Wh/kg to about 1,600 Wh/kg, about 500 Wh/kg to about 750 Wh/kg, about 500 Wh/kg to about 1,000 Wh/kg, about 500 Wh/kg to about 1,250 Wh/kg, about 500 Wh/kg to about 1,600 Wh/kg, about 750 Wh/kg to about 1,000 Wh/kg, about 750 Wh/kg to about 1,250 Wh/kg, about 750 Wh/kg to about 1,600 Wh/kg, about 1,000 Wh/kg to about 1,250 Wh/kg, about 1,000 Wh/kg to about 1,600 Wh/kg, or about 1,250 Wh/kg to about 1,600 Wh/kg.

In some embodiments, the electrolyte is a gel electrolyte.

In those embodiments, the supercapacitor has a working potential of about 0.6 V to about 2.4 V. In those embodiments, the supercapacitor has a working potential of at least about 0.6 V. In those embodiments, the supercapacitor has a working potential of at most about 2.4 V. In those embodiments, the supercapacitor has a working potential of about 0.6 V to about 0.8 V, about 0.6 V to about 1 V, about 0.6 V to about 1.2 V, about 0.6 V to about 1.4 V, about 0.6 V to about 1.6 V, about 0.6 V to about 1.8 V, about 0.6 V to about 2 V, about 0.6 V to about 2.2 V, about 0.6 V to about 2.4 V, about 0.8 V to about 1 V, about 0.8 V to about 1.2 V, about 0.8 V to about 1.4 V, about 0.8 V to about 1.6 V, about 0.8 V to about 1.8 V, about 0.8 V to about 2 V, about 0.8 V to about 2.2 V, about 0.8 V to about 2.4 V, about 1 V to about 1.2 V, about 1 V to about 1.4 V, about 1 V to about 1.6 V, about 1 V to about 1.8 V, about 1 V to about 2 V, about 1 V to about 2.2 V, about 1 V to about 2.4 V, about 1.2 V to about 1.4 V, about 1.2 V to about 1.6 V, about 1.2 V to about 1.8 V, about 1.2 V to about 2 V, about 1.2 V to about 2.2 V, about 1.2 V to about 2.4 V, about 1.4 V to about 1.6 V, about 1.4 V to about 1.8 V, about 1.4 V to about 2 V, about 1.4 V to about 2.2 V, about 1.4 V to about 2.4 V, about 1.6 V to about 1.8 V, about 1.6 V to about 2 V, about 1.6 V to about 2.2 V, about 1.6 V to about 2.4 V, about 1.8 V to about 2 V, about 1.8 V to about 2.2 V, about 1.8 V to about 2.4 V, about 2 V to about 2.2 V, about 2 V to about 2.4 V, or about 2.2 V to about 2.4 V.

In those embodiments, the supercapacitor has a gravimetric capacitance, in a current density of about 2 A/g, of about 150 F/g to about 650 F/g. In those embodiments, the supercapacitor has a gravimetric capacitance, in a current density of about 2 A/g, of at least about 150 F/g. In those embodiments, the supercapacitor has a gravimetric capacitance, in a current density of about 2 A/g, of at most about 650 F/g. In those embodiments, the supercapacitor has a gravimetric capacitance, in a current density of about 2 A/g, of about 150 F/g to about 200 F/g, about 150 F/g to about 250 F/g, about 150 F/g to about 300 F/g, about 150 F/g to about 350 F/g, about 150 F/g to about 400 F/g, about 150 F/g to about 450 F/g, about 150 F/g to about 500 F/g, about 150 F/g to about 550 F/g, about 150 F/g to about 600 F/g, about 150 F/g to about 650 F/g, about 200 F/g to about 250 F/g, about 200 F/g to about 300 F/g, about 200 F/g to about 350 F/g, about 200 F/g to about 400 F/g, about 200 F/g to about 450 F/g, about 200 F/g to about 500 F/g, about 200 F/g to about 550 F/g, about 200 F/g to about 600 F/g, about 200 F/g to about 650 F/g, about 250 F/g to about 300 F/g, about 250 F/g to about 350 F/g, about 250 F/g to about 400 F/g, about 250 F/g to about 450 F/g, about 250 F/g to about 500 F/g, about 250 F/g to about 550 F/g, about 250 F/g to about 600 F/g, about 250 F/g to about 650 F/g, about 300 F/g to about 350 F/g, about 300 F/g to about 400 F/g, about 300 F/g to about 450 F/g, about 300 F/g to about 500 F/g, about 300 F/g to about 550 F/g, about 300 F/g to about 600 F/g, about 300 F/g to about 650 F/g, about 350 F/g to about 400 F/g, about 350 F/g to about 450 F/g, about 350 F/g to about 500 F/g, about 350 F/g to about 550 F/g, about 350 F/g to about 600 F/g, about 350 F/g to about 650 F/g, about 400 F/g to about 450 F/g, about 400 F/g to about 500 F/g, about 400 F/g to about 550 F/g, about 400 F/g to about 600 F/g, about 400 F/g to about 650 F/g, about 450 F/g to about 500 F/g, about 450 F/g to about 550 F/g, about 450 F/g to about 600 F/g, about 450 F/g to about 650 F/g, about 500 F/g to about 550 F/g, about 500 F/g to about 600 F/g, about 500 F/g to about 650 F/g, about 550 F/g to about 600 F/g, about 550 F/g to about 650 F/g, or about 600 F/g to about 650 F/g.

In those embodiments, the supercapacitor has a gravimetric energy density of about 30 Wh/kg to about 130 Wh/kg. In those embodiments, the supercapacitor has a gravimetric energy density of at least about 30 Wh/kg. In those embodiments, the supercapacitor has a gravimetric energy density of at most about 130 Wh/kg. In those embodiments, the supercapacitor has a gravimetric energy density of about 30 Wh/kg to about 40 Wh/kg, about 30 Wh/kg to about 50 Wh/kg, about 30 Wh/kg to about 60 Wh/kg, about 30 Wh/kg to about 70 Wh/kg, about 30 Wh/kg to about 80 Wh/kg, about 30 Wh/kg to about 90 Wh/kg, about 30 Wh/kg to about 100 Wh/kg, about 30 Wh/kg to about 110 Wh/kg, about 30 Wh/kg to about 120 Wh/kg, about 30 Wh/kg to about 130 Wh/kg, about 40 Wh/kg to about 50 Wh/kg, about 40 Wh/kg to about 60 Wh/kg, about 40 Wh/kg to about 70 Wh/kg, about 40 Wh/kg to about 80 Wh/kg, about 40 Wh/kg to about 90 Wh/kg, about 40 Wh/kg to about 100 Wh/kg, about 40 Wh/kg to about 110 Wh/kg, about 40 Wh/kg to about 120 Wh/kg, about 40 Wh/kg to about 130 Wh/kg, about 50 Wh/kg to about 60 Wh/kg, about 50 Wh/kg to about 70 Wh/kg, about 50 Wh/kg to about 80 Wh/kg, about 50 Wh/kg to about 90 Wh/kg, about 50 Wh/kg to about 100 Wh/kg, about 50 Wh/kg to about 110 Wh/kg, about 50 Wh/kg to about 120 Wh/kg, about 50 Wh/kg to about 130 Wh/kg, about 60 Wh/kg to about 70 Wh/kg, about 60 Wh/kg to about 80 Wh/kg, about 60 Wh/kg to about 90 Wh/kg, about 60 Wh/kg to about 100 Wh/kg, about 60 Wh/kg to about 110 Wh/kg, about 60 Wh/kg to about 120 Wh/kg, about 60 Wh/kg to about 130 Wh/kg, about 70 Wh/kg to about 80 Wh/kg, about 70 Wh/kg to about 90 Wh/kg, about 70 Wh/kg to about 100 Wh/kg, about 70 Wh/kg to about 110 Wh/kg, about 70 Wh/kg to about 120 Wh/kg, about 70 Wh/kg to about 130 Wh/kg, about 80 Wh/kg to about 90 Wh/kg, about 80 Wh/kg to about 100 Wh/kg, about 80 Wh/kg to about 110 Wh/kg, about 80 Wh/kg to about 120 Wh/kg, about 80 Wh/kg to about 130 Wh/kg, about 90 Wh/kg to about 100 Wh/kg, about 90 Wh/kg to about 110 Wh/kg, about 90 Wh/kg to about 120 Wh/kg, about 90 Wh/kg to about 130 Wh/kg, about 100 Wh/kg to about 110 Wh/kg, about 100 Wh/kg to about 120 Wh/kg, about 100 Wh/kg to about 130 Wh/kg, about 110 Wh/kg to about 120 Wh/kg, about 110 Wh/kg to about 130 Wh/kg, or about 120 Wh/kg to about 130 Wh/kg.

In some embodiments the gel electrolyte comprises a quinone.

In those embodiments, the concentration of the quinone is about 0.25 millimolar to about 1 millimolar. In those embodiments, the concentration of the quinone is at least about 0.25 millimolar. In those embodiments, the concentration of the quinone is at most about 1 millimolar. In those embodiments, the concentration of the quinone is about 0.25 millimolar to about 0.375 millimolar, about 0.25 millimolar to about 0.5 millimolar, about 0.25 millimolar to about 0.625 millimolar, about 0.25 millimolar to about 0.75 millimolar, about 0.25 millimolar to about 1 millimolar, about 0.375 millimolar to about 0.5 millimolar, about 0.375 millimolar to about 0.625 millimolar, about 0.375 millimolar to about 0.75 millimolar, about 0.375 millimolar to about 1 millimolar, about 0.5 millimolar to about 0.625 millimolar, about 0.5 millimolar to about 0.75 millimolar, about 0.5 millimolar to about 1 millimolar, about 0.625 millimolar to about 0.75 millimolar, about 0.625 millimolar to about 1 millimolar, or about 0.75 millimolar to about 1 millimolar.

In those embodiments, the supercapacitor has a working potential of about 0.7 V to about 2.8 V. In those embodiments, the supercapacitor has a working potential of at least about 0.7 V. In those embodiments, the supercapacitor has a working potential of at most about 2.8 V. In those embodiments, the supercapacitor has a working potential of about 0.7 V to about 0.8 V, about 0.7 V to about 1 V, about 0.7 V to about 1.2 V, about 0.7 V to about 1.4 V, about 0.7 V to about 1.6 V, about 0.7 V to about 1.8 V, about 0.7 V to about 2 V, about 0.7 V to about 2.2 V, about 0.7 V to about 2.4 V, about 0.7 V to about 2.6 V, about 0.7 V to about 2.8 V, about 0.8 V to about 1 V, about 0.8 V to about 1.2 V, about 0.8 V to about 1.4 V, about 0.8 V to about 1.6 V, about 0.8 V to about 1.8 V, about 0.8 V to about 2 V, about 0.8 V to about 2.2 V, about 0.8 V to about 2.4 V, about 0.8 V to about 2.6 V, about 0.8 V to about 2.8 V, about 1 V to about 1.2 V, about 1 V to about 1.4 V, about 1 V to about 1.6 V, about 1 V to about 1.8 V, about 1 V to about 2 V, about 1 V to about 2.2 V, about 1 V to about 2.4 V, about 1 V to about 2.6 V, about 1 V to about 2.8 V, about 1.2 V to about 1.4 V, about 1.2 V to about 1.6 V, about 1.2 V to about 1.8 V, about 1.2 V to about 2 V, about 1.2 V to about 2.2 V, about 1.2 V to about 2.4 V, about 1.2 V to about 2.6 V, about 1.2 V to about 2.8 V, about 1.4 V to about 1.6 V, about 1.4 V to about 1.8 V, about 1.4 V to about 2 V, about 1.4 V to about 2.2 V, about 1.4 V to about 2.4 V, about 1.4 V to about 2.6 V, about 1.4 V to about 2.8 V, about 1.6 V to about 1.8 V, about 1.6 V to about 2 V, about 1.6 V to about 2.2 V, about 1.6 V to about 2.4 V, about 1.6 V to about 2.6 V, about 1.6 V to about 2.8 V, about 1.8 V to about 2 V, about 1.8 V to about 2.2 V, about 1.8 V to about 2.4 V, about 1.8 V to about 2.6 V, about 1.8 V to about 2.8 V, about 2 V to about 2.2 V, about 2 V to about 2.4 V, about 2 V to about 2.6 V, about 2 V to about 2.8 V, about 2.2 V to about 2.4 V, about 2.2 V to about 2.6 V, about 2.2 V to about 2.8 V, about 2.4 V to about 2.6 V, about 2.4 V to about 2.8 V, or about 2.6 V to about 2.8 V.

In those embodiments, the supercapacitor has a gravimetric capacitance, in a current density of about 2 A/g, of about 2,500 F/g to about 10,000 F/g. In those embodiments, the supercapacitor has a gravimetric capacitance, in a current density of about 2 A/g, of at least about 2,500 F/g. In those embodiments, the supercapacitor has a gravimetric capacitance, in a current density of about 2 A/g, of at most about 10,000 F/g. In those embodiments, the supercapacitor has a gravimetric capacitance, in a current density of about 2 A/g, of about 2,500 F/g to about 3,000 F/g, about 2,500 F/g to about 4,000 F/g, about 2,500 F/g to about 5,000 F/g, about 2,500 F/g to about 6,000 F/g, about 2,500 F/g to about 7,000 F/g, about 2,500 F/g to about 8,000 F/g, about 2,500 F/g to about 9,000 F/g, about 2,500 F/g to about 10,000 F/g, about 3,000 F/g to about 4,000 F/g, about 3,000 F/g to about 5,000 F/g, about 3,000 F/g to about 6,000 F/g, about 3,000 F/g to about 7,000 F/g, about 3,000 F/g to about 8,000 F/g, about 3,000 F/g to about 9,000 F/g, about 3,000 F/g to about 10,000 F/g, about 4,000 F/g to about 5,000 F/g, about 4,000 F/g to about 6,000 F/g, about 4,000 F/g to about 7,000 F/g, about 4,000 F/g to about 8,000 F/g, about 4,000 F/g to about 9,000 F/g, about 4,000 F/g to about 10,000 F/g, about 5,000 F/g to about 6,000 F/g, about 5,000 F/g to about 7,000 F/g, about 5,000 F/g to about 8,000 F/g, about 5,000 F/g to about 9,000 F/g, about 5,000 F/g to about 10,000 F/g, about 6,000 F/g to about 7,000 F/g, about 6,000 F/g to about 8,000 F/g, about 6,000 F/g to about 9,000 F/g, about 6,000 F/g to about 10,000 F/g, about 7,000 F/g to about 8,000 F/g, about 7,000 F/g to about 9,000 F/g, about 7,000 F/g to about 10,000 F/g, about 8,000 F/g to about 9,000 F/g, about 8,000 F/g to about 10,000 F/g, or about 9,000 F/g to about 10,000 F/g.

In those embodiments, the supercapacitor has a gravimetric energy density, as normalized by the weight of the electrodes, of about 700 Wh/kg to about 3,000 Wh/kg. In those embodiments, the supercapacitor has a gravimetric energy density, as normalized by the weight of the electrodes, of at least about 700 Wh/kg. In those embodiments, the supercapacitor has a gravimetric energy density, as normalized by the weight of the electrodes, of at most about 3.00 Wh/kg. In those embodiments, the supercapacitor has a gravimetric energy density, as normalized by the weight of the electrodes, of about 700 Wh/kg to about 1,000 Wh/kg, about 700 Wh/kg to about 1,250 Wh/kg, about 700 Wh/kg to about 1,500 Wh/kg, about 700 Wh/kg to about 1,750 Wh/kg, about 700 Wh/kg to about 2,000 Wh/kg, about 700 Wh/kg to about 2,250 Wh/kg, about 700 Wh/kg to about 2,500 Wh/kg, about 700 Wh/kg to about 2,750 Wh/kg, about 700 Wh/kg to about 3,000 Wh/kg, about 1,000 Wh/kg to about 1,250 Wh/kg, about 1,000 Wh/kg to about 1,500 Wh/kg, about 1,000 Wh/kg to about 1,750 Wh/kg, about 1,000 Wh/kg to about 2,000 Wh/kg, about 1,000 Wh/kg to about 2,250 Wh/kg, about 1,000 Wh/kg to about 2,500 Wh/kg, about 1,000 Wh/kg to about 2,750 Wh/kg, about 1,000 Wh/kg to about 3,000 Wh/kg, about 1,250 Wh/kg to about 1,500 Wh/kg, about 1,250 Wh/kg to about 1,750 Wh/kg, about 1,250 Wh/kg to about 2,000 Wh/kg, about 1,250 Wh/kg to about 2,250 Wh/kg, about 1,250 Wh/kg to about 2,500 Wh/kg, about 1,250 Wh/kg to about 2,750 Wh/kg, about 1,250 Wh/kg to about 3,000 Wh/kg, about 1,500 Wh/kg to about 1,750 Wh/kg, about 1,500 Wh/kg to about 2,000 Wh/kg, about 1,500 Wh/kg to about 2,250 Wh/kg, about 1,500 Wh/kg to about 2,500 Wh/kg, about 1,500 Wh/kg to about 2,750 Wh/kg, about 1,500 Wh/kg to about 3,000 Wh/kg, about 1,750 Wh/kg to about 2,000 Wh/kg, about 1,750 Wh/kg to about 2,250 Wh/kg, about 1,750 Wh/kg to about 2,500 Wh/kg, about 1,750 Wh/kg to about 2,750 Wh/kg, about 1,750 Wh/kg to about 3,000 Wh/kg, about 2,000 Wh/kg to about 2,250 Wh/kg, about 2,000 Wh/kg to about 2,500 Wh/kg, about 2,000 Wh/kg to about 2,750 Wh/kg, about 2,000 Wh/kg to about 3,000 Wh/kg, about 2,250 Wh/kg to about 2,500 Wh/kg, about 2,250 Wh/kg to about 2,750 Wh/kg, about 2,250 Wh/kg to about 3,000 Wh/kg, about 2,500 Wh/kg to about 2,750 Wh/kg, about 2,500 Wh/kg to about 3,000 Wh/kg, or about 2,750 Wh/kg to about 3,000 Wh/kg.

In those embodiments, the supercapacitor has a gravimetric energy density, as normalized by the volume of the electrodes, of about 100 Wh/L to about 2,000 Wh/L. In those embodiments, the supercapacitor has a gravimetric energy density, as normalized by the volume of the electrodes, of at least about 100 Wh/L. In those embodiments, the supercapacitor has a gravimetric energy density, as normalized by the volume of the electrodes, of at most about 2,000 Wh/L.

In those embodiments, the supercapacitor has a gravimetric energy density, as normalized by the volume of the electrodes, of about 500 Wh/L to about 625 Wh/L, about 500 Wh/L to about 750 Wh/L, about 500 Wh/L to about 875 Wh/L, about 500 Wh/L to about 100 Wh/L, about 500 Wh/L to about 1,125 Wh/L, about 500 Wh/L to about 1,250 Wh/L, about 500 Wh/L to about 1,375 Wh/L, about 500 Wh/L to about 1,500 Wh/L, about 500 Wh/L to about 1,750 Wh/L, about 500 Wh/L to about 2,000 Wh/L, about 625 Wh/L to about 750 Wh/L, about 625 Wh/L to about 875 Wh/L, about 625 Wh/L to about 100 Wh/L, about 625 Wh/L to about 1,125 Wh/L, about 625 Wh/L to about 1,250 Wh/L, about 625 Wh/L to about 1,375 Wh/L, about 625 Wh/L to about 1,500 Wh/L, about 625 Wh/L to about 1,750 Wh/L, about 625 Wh/L to about 2,000 Wh/L, about 750 Wh/L to about 875 Wh/L, about 750 Wh/L to about 100 Wh/L, about 750 Wh/L to about 1,125 Wh/L, about 750 Wh/L to about 1,250 Wh/L, about 750 Wh/L to about 1,375 Wh/L, about 750 Wh/L to about 1,500 Wh/L, about 750 Wh/L to about 1,750 Wh/L, about 750 Wh/L to about 2,000 Wh/L, about 875 Wh/L to about 100 Wh/L, about 875 Wh/L to about 1,125 Wh/L, about 875 Wh/L to about 1,250 Wh/L, about 875 Wh/L to about 1,375 Wh/L, about 875 Wh/L to about 1,500 Wh/L, about 875 Wh/L to about 1,750 Wh/L, about 875 Wh/L to about 2,000 Wh/L, about 100 Wh/L to about 1,125 Wh/L, about 100 Wh/L to about 1,250 Wh/L, about 100 Wh/L to about 1,375 Wh/L, about 100 Wh/L to about 1,500 Wh/L, about 100 Wh/L to about 1,750 Wh/L, about 100 Wh/L to about 2,000 Wh/L, about 1,125 Wh/L to about 1,250 Wh/L, about 1,125 Wh/L to about 1,375 Wh/L, about 1,125 Wh/L to about 1,500 Wh/L, about 1,125 Wh/L to about 1,750 Wh/L, about 1,125 Wh/L to about 2,000 Wh/L, about 1,250 Wh/L to about 1,375 Wh/L, about 1,250 Wh/L to about 1,500 Wh/L, about 1,250 Wh/L to about 1,750 Wh/L, about 1,250 Wh/L to about 2,000 Wh/L, about 1,375 Wh/L to about 1,500 Wh/L, about 1,375 Wh/L to about 1,750 Wh/L, about 1,375 Wh/L to about 2,000 Wh/L, about 1,500 Wh/L to about 1,750 Wh/L, about 1,500 Wh/L to about 2,000 Wh/L, or about 1,750 Wh/L to about 2,000 Wh/L.

In those embodiments, the supercapacitor has a gravimetric energy density, as normalized by the volume of the electrodes and the redox electrolyte, of about 100 Wh/kg to about 2,000 Wh/kg. In those embodiments, the supercapacitor has a gravimetric energy density, as normalized by the volume of the electrodes and the redox electrolyte, of at least about 100 Wh/kg. In those embodiments, the supercapacitor has a gravimetric energy density, as normalized by the volume of the electrodes and the redox electrolyte, of at most about 2,000 Wh/kg. In those embodiments, the supercapacitor has a gravimetric energy density, as normalized by the volume of the electrodes and the redox electrolyte, of about 500 Wh/kg to about 625 Wh/kg, about 500 Wh/kg to about 750 Wh/kg, about 500 Wh/kg to about 875 Wh/kg, about 500 Wh/kg to about 100 Wh/kg, about 500 Wh/kg to about 1,125 Wh/kg, about 500 Wh/kg to about 1,250 Wh/kg, about 500 Wh/kg to about 1,375 Wh/kg, about 500 Wh/kg to about 1,500 Wh/kg, about 500 Wh/kg to about 1,750 Wh/kg, about 500 Wh/kg to about 2,000 Wh/kg, about 625 Wh/kg to about 750 Wh/kg, about 625 Wh/kg to about 875 Wh/kg, about 625 Wh/kg to about 100 Wh/kg, about 625 Wh/kg to about 1,125 Wh/kg, about 625 Wh/kg to about 1,250 Wh/kg, about 625 Wh/kg to about 1,375 Wh/kg, about 625 Wh/kg to about 1,500 Wh/kg, about 625 Wh/kg to about 1,750 Wh/kg, about 625 Wh/kg to about 2,000 Wh/kg, about 750 Wh/kg to about 875 Wh/kg, about 750 Wh/kg to about 100 Wh/kg, about 750 Wh/kg to about 1,125 Wh/kg, about 750 Wh/kg to about 1,250 Wh/kg, about 750 Wh/kg to about 1,375 Wh/kg, about 750 Wh/kg to about 1,500 Wh/kg, about 750 Wh/kg to about 1,750 Wh/kg, about 750 Wh/kg to about 2,000 Wh/kg, about 875 Wh/kg to about 100 Wh/kg, about 875 Wh/kg to about 1,125 Wh/kg, about 875 Wh/kg to about 1,250 Wh/kg, about 875 Wh/kg to about 1,375 Wh/kg, about 875 Wh/kg to about 1,500 Wh/kg, about 875 Wh/kg to about 1,750 Wh/kg, about 875 Wh/kg to about 2,000 Wh/kg, about 100 Wh/kg to about 1,125 Wh/kg, about 100 Wh/kg to about 1,250 Wh/kg, about 100 Wh/kg to about 1,375 Wh/kg, about 100 Wh/kg to about 1,500 Wh/kg, about 100 Wh/kg to about 1,750 Wh/kg, about 100 Wh/kg to about 2,000 Wh/kg, about 1,125 Wh/kg to about 1,250 Wh/kg, about 1,125 Wh/kg to about 1,375 Wh/kg, about 1,125 Wh/kg to about 1,500 Wh/kg, about 1,125 Wh/kg to about 1,750 Wh/kg, about 1,125 Wh/kg to about 2,000 Wh/kg, about 1,250 Wh/kg to about 1,375 Wh/kg, about 1,250 Wh/kg to about 1,500 Wh/kg, about 1,250 Wh/kg to about 1,750 Wh/kg, about 1,250 Wh/kg to about 2,000 Wh/kg, about 1,375 Wh/kg to about 1,500 Wh/kg, about 1,375 Wh/kg to about 1,750 Wh/kg, about 1,375 Wh/kg to about 2,000 Wh/kg, about 1,500 Wh/kg to about 1,750 Wh/kg, about 1,500 Wh/kg to about 2,000 Wh/kg, or about 1,750 Wh/kg to about 2,000 Wh/kg.

In those embodiments, the supercapacitor has a gravimetric energy density, as normalized by the volume of the electrodes and the redox electrolyte, of about 100 Wh/L to about 1,800 Wh/L. In those embodiments, the supercapacitor has a gravimetric energy density, as normalized by the volume of the electrodes and the redox electrolyte, of at least about 100 Wh/L. In those embodiments, the supercapacitor has a gravimetric energy density, as normalized by the volume of the electrodes and the redox electrolyte, of at most about 1,800 Wh/L. In those embodiments, the supercapacitor has a gravimetric energy density, as normalized by the volume of the electrodes and the redox electrolyte, of about 400 Wh/L to about 600 Wh/L, about 400 Wh/L to about 800 Wh/L, about 400 Wh/L to about 100 Wh/L, about 400 Wh/L to about 1,200 Wh/L, about 400 Wh/L to about 1,400 Wh/L, about 400 Wh/L to about 1,600 Wh/L, about 400 Wh/L to about 1,800 Wh/L, about 600 Wh/L to about 800 Wh/L, about 600 Wh/L to about 100 Wh/L, about 600 Wh/L to about 1,200 Wh/L, about 600 Wh/L to about 1,400 Wh/L, about 600 Wh/L to about 1,600 Wh/L, about 600 Wh/L to about 1,800 Wh/L, about 800 Wh/L to about 100 Wh/L, about 800 Wh/L to about 1,200 Wh/L, about 800 Wh/L to about 1,400 Wh/L, about 800 Wh/L to about 1,600 Wh/L, about 800 Wh/L to about 1,800 Wh/L, about 100 Wh/L to about 1,200 Wh/L, about 100 Wh/L to about 1,400 Wh/L, about 100 Wh/L to about 1,600 Wh/L, about 100 Wh/L to about 1,800 Wh/L, about 1,200 Wh/L to about 1,400 Wh/L, about 1,200 Wh/L to about 1,600 Wh/L, about 1,200 Wh/L to about 1,800 Wh/L, about 1,400 Wh/L to about 1,600 Wh/L, about 1,400 Wh/L to about 1,800 Wh/L, or about 1,600 Wh/L to about 1,800 Wh/L.

In those embodiments, the supercapacitor has a gravimetric energy density, as normalized by the mass and volume of the electrodes, the redox electrolyte and the carbon cloth, of about 30 Wh/kg to about 120 Wh/kg. In those embodiments, the supercapacitor has a gravimetric energy density, as normalized by the mass and volume of the electrodes, the redox electrolyte and the carbon cloth, of at least about 30 Wh/kg. In those embodiments, the supercapacitor has a gravimetric energy density, as normalized by the mass and volume of the electrodes, the redox electrolyte, and the carbon cloth, of at most about 120 Wh/kg. In those embodiments, the supercapacitor has a gravimetric energy density, as normalized by the mass and volume of the electrodes, the redox electrolyte and the carbon cloth, of about 30 Wh/kg to about 40 Wh/kg, about 30 Wh/kg to about 50 Wh/kg, about 30 Wh/kg to about 60 Wh/kg, about 30 Wh/kg to about 70 Wh/kg, about 30 Wh/kg to about 80 Wh/kg, about 30 Wh/kg to about 90 Wh/kg, about 30 Wh/kg to about 100 Wh/kg, about 30 Wh/kg to about 120 Wh/kg, about 40 Wh/kg to about 50 Wh/kg, about 40 Wh/kg to about 60 Wh/kg, about 40 Wh/kg to about 70 Wh/kg, about 40 Wh/kg to about 80 Wh/kg, about 40 Wh/kg to about 90 Wh/kg, about 40 Wh/kg to about 100 Wh/kg, about 40 Wh/kg to about 120 Wh/kg, about 50 Wh/kg to about 60 Wh/kg, about 50 Wh/kg to about 70 Wh/kg, about 50 Wh/kg to about 80 Wh/kg, about 50 Wh/kg to about 90 Wh/kg, about 50 Wh/kg to about 100 Wh/kg, about 50 Wh/kg to about 120 Wh/kg, about 60 Wh/kg to about 70 Wh/kg, about 60 Wh/kg to about 80 Wh/kg, about 60 Wh/kg to about 90 Wh/kg, about 60 Wh/kg to about 100 Wh/kg, about 60 Wh/kg to about 120 Wh/kg, about 70 Wh/kg to about 80 Wh/kg, about 70 Wh/kg to about 90 Wh/kg, about 70 Wh/kg to about 100 Wh/kg, about 70 Wh/kg to about 120 Wh/kg, about 80 Wh/kg to about 90 Wh/kg, about 80 Wh/kg to about 100 Wh/kg, about 80 Wh/kg to about 120 Wh/kg, about 90 Wh/kg to about 100 Wh/kg, about 90 Wh/kg to about 120 Wh/kg, or about 100 Wh/kg to about 120 Wh/kg.

In those embodiments, the supercapacitor has a gravimetric energy density, as normalized by the mass and volume of the electrodes, the redox electrolyte and the carbon cloth, of about 40 Wh/L to about 180 Wh/L. In those embodiments, the supercapacitor has a gravimetric energy density, as normalized by the mass and volume of the electrodes, the redox electrolyte and the carbon cloth, of at least about 40 Wh/L. In those embodiments, the supercapacitor has a gravimetric energy density, as normalized by the mass and volume of the electrodes, the redox electrolyte and the carbon cloth, of at most about 180 Wh/L. In those embodiments, the supercapacitor has a gravimetric energy density, as normalized by the mass and volume of the electrodes, the redox electrolyte and the carbon cloth, of about 40 Wh/L to about 50 Wh/L, about 40 Wh/L to about 60 Wh/L, about 40 Wh/L to about 70 Wh/L, about 40 Wh/L to about 80 Wh/L, about 40 Wh/L to about 90 Wh/L, about 40 Wh/L to about 100 Wh/L, about 40 Wh/L to about 120 Wh/L, about 40 Wh/L to about 140 Wh/L, about 40 Wh/L to about 160 Wh/L, about 40 Wh/L to about 180 Wh/L, about 50 Wh/L to about 60 Wh/L, about 50 Wh/L to about 70 Wh/L, about 50 Wh/L to about 80 Wh/L, about 50 Wh/L to about 90 Wh/L, about 50 Wh/L to about 100 Wh/L, about 50 Wh/L to about 120 Wh/L, about 50 Wh/L to about 140 Wh/L, about 50 Wh/L to about 160 Wh/L, about 50 Wh/L to about 180 Wh/L, about 60 Wh/L to about 70 Wh/L, about 60 Wh/L to about 80 Wh/L, about 60 Wh/L to about 90 Wh/L, about 60 Wh/L to about 100 Wh/L, about 60 Wh/L to about 120 Wh/L, about 60 Wh/L to about 140 Wh/L, about 60 Wh/L to about 160 Wh/L, about 60 Wh/L to about 180 Wh/L, about 70 Wh/L to about 80 Wh/L, about 70 Wh/L to about 90 Wh/L, about 70 Wh/L to about 100 Wh/L, about 70 Wh/L to about 120 Wh/L, about 70 Wh/L to about 140 Wh/L, about 70 Wh/L to about 160 Wh/L, about 70 Wh/L to about 180 Wh/L, about 80 Wh/L to about 90 Wh/L, about 80 Wh/L to about 100 Wh/L, about 80 Wh/L to about 120 Wh/L, about 80 Wh/L to about 140 Wh/L, about 80 Wh/L to about 160 Wh/L, about 80 Wh/L to about 180 Wh/L, about 90 Wh/L to about 100 Wh/L, about 90 Wh/L to about 120 Wh/L, about 90 Wh/L to about 140 Wh/L, about 90 Wh/L to about 160 Wh/L, about 90 Wh/L to about 180 Wh/L, about 100 Wh/L to about 120 Wh/L, about 100 Wh/L to about 140 Wh/L, about 100 Wh/L to about 160 Wh/L, about 100 Wh/L to about 180 Wh/L, about 120 Wh/L to about 140 Wh/L, about 120 Wh/L to about 160 Wh/L, about 120 Wh/L to about 180 Wh/L, about 140 Wh/L to about 160 Wh/L, about 140 Wh/L to about 180 Wh/L, or about 160 Wh/L to about 180 Wh/L.

A fourth aspect disclosed herein is a supercapacitor comprising three electrodes, wherein each electrode comprises an activated carbon electrode, a current collector, and an electrolyte. In some embodiments, the current collector is metallic. In some embodiments, the current collector is ferritic. In some embodiments, the current collector comprises stainless steel, crucible steel, carbon steel, spring steel, alloy steel, maraging steel, weathering steel, tool steel, or any combination thereof.

In some embodiments, the electrolyte is disposed between the electrodes. In some embodiments, the electrolyte comprises an acid. In some embodiments, the electrolyte comprises a solvent. In some embodiments, the electrolyte comprises an acid and a solvent. In some embodiments, the acid is a strong acid. In some embodiments, the strong acid comprises perchloric acid, hydroiodic acid, hydrobromic acid, hydrochloric acid, sulfuric acid, p-toluenesulfonic acid methanesulfonic acid, or any combination thereof. In some embodiments, the solvent comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof.

In some embodiments, the electrolyte is a gel electrolyte, wherein the gel electrolyte comprises a quinone. In those embodiments, the concentration of the quinone is about 0.25 millimolar to about 1 millimolar. In those embodiments, the concentration of the quinone is at least about 0.25 millimolar. In those embodiments, the concentration of the quinone is at most about 1 millimolar. In those embodiments, the concentration of the quinone is about 0.25 millimolar to about 0.375 millimolar, about 0.25 millimolar to about 0.5 millimolar, about 0.25 millimolar to about 0.625 millimolar, about 0.25 millimolar to about 0.75 millimolar, about 0.25 millimolar to about 1 millimolar, about 0.375 millimolar to about 0.5 millimolar, about 0.375 millimolar to about 0.625 millimolar, about 0.375 millimolar to about 0.75 millimolar, about 0.375 millimolar to about 1 millimolar, about 0.5 millimolar to about 0.625 millimolar, about 0.5 millimolar to about 0.75 millimolar, about 0.5 millimolar to about 1 millimolar, about 0.625 millimolar to about 0.75 millimolar, about 0.625 millimolar to about 1 millimolar, or about 0.75 millimolar to about 1 millimolar.

In those embodiments, the supercapacitor has a working potential of about 0.2 V to about 1.2 V. In those embodiments, the supercapacitor has a working potential of at least about 0.2 V. In those embodiments, the supercapacitor has a working potential of at most about 1.2 V. In those embodiments, the supercapacitor has a working potential of about 0.2 V to about 0.3 V, about 0.2 V to about 0.4 V, about 0.2 V to about 0.6 V, about 0.2 V to about 0.8 V, about 0.2 V to about 1 V, about 0.2 V to about 1.2 V, about 0.3 V to about 0.4 V, about 0.3 V to about 0.6 V, about 0.3 V to about 0.8 V, about 0.3 V to about 1 V, about 0.3 V to about 1.2 V, about 0.4 V to about 0.6 V, about 0.4 V to about 0.8 V, about 0.4 V to about 1 V, about 0.4 V to about 1.2 V, about 0.6 V to about 0.8 V, about 0.6 V to about 1 V, about 0.6 V to about 1.2 V, about 0.8 V to about 1 V, about 0.8 V to about 1.2 V, or about 1 V to about 1.2 V.

In those embodiments, the supercapacitor has a gravimetric capacitance, in a current density of about 10 A/g, of about 1,000 F/g to about 8,000 F/g. In those embodiments, the supercapacitor has a gravimetric capacitance, in a current density of about 10 A/g, of at least about 1,000 F/g. In those embodiments, the supercapacitor has a gravimetric capacitance, in a current density of about 10 A/g, of at most about 8,000 F/g. In those embodiments, the supercapacitor has a gravimetric capacitance, in a current density of about 10 A/g, of about 7,000 F/g to about 8,000 F/g, about 7,000 F/g to about 1,000 F/g, about 7,000 F/g to about 1,250 F/g, about 7,000 F/g to about 1,500 F/g, about 7,000 F/g to about 2,000 F/g, about 7,000 F/g to about 2,250 F/g, about 7,000 F/g to about 2,500 F/g, about 7,000 F/g to about 2,800 F/g, about 8,000 F/g to about 1,000 F/g, about 8,000 F/g to about 1,250 F/g, about 8,000 F/g to about 1,500 F/g, about 8,000 F/g to about 2,000 F/g, about 8,000 F/g to about 2,250 F/g, about 8,000 F/g to about 2,500 F/g, about 8,000 F/g to about 2,800 F/g, about 1,000 F/g to about 1,250 F/g, about 1,000 F/g to about 1,500 F/g, about 1,000 F/g to about 2,000 F/g, about 1,000 F/g to about 2,250 F/g, about 1,000 F/g to about 2,500 F/g, about 1,000 F/g to about 2,800 F/g, about 1,250 F/g to about 1,500 F/g, about 1,250 F/g to about 2,000 F/g, about 1,250 F/g to about 2,250 F/g, about 1,250 F/g to about 2,500 F/g, about 1,250 F/g to about 2,800 F/g, about 1,500 F/g to about 2,000 F/g, about 1,500 F/g to about 2,250 F/g, about 1,500 F/g to about 2,500 F/g, about 1,500 F/g to about 2,800 F/g, about 2,000 F/g to about 2,250 F/g, about 2,000 F/g to about 2,500 F/g, about 2,000 F/g to about 2,800 F/g, about 2,250 F/g to about 2,500 F/g, about 2,250 F/g to about 2,800 F/g, or about 2,500 F/g to about 2,800 F/g.

A fifth aspect provided herein is a method of fabricating a functionalized carbon electrode comprising the steps of functionalizing a carbon substrate, preparing the functionalized carbon substrate, formulating a polymerization fluid, and synthesizing a nanotube on the functionalized carbon substrate.

In some embodiments, the functionalized carbon electrode is a polyaniline functionalized carbon electrode. In some embodiments, the nanotube is a polyaniline nanotube.

In some embodiments the step of functionalizing a carbon substrate comprises forming an functionalization solution, heating the functionalization solution, cooling the functionalization solution, displacing a piece of carbon substrate into the functionalization solution, and rinsing a piece of functionalized carbon substrate. In some embodiments the substrate is rinsed in water.

In some embodiments, the functionalization solution comprises a strong acid comprising perchloric acid, hydroiodic acid, hydrobromic acid, hydrochloric acid, sulfuric acid, p-toluenesulfonic acid, methanesulfonic acid, and nitric acid, chloric acid, or any combination thereof.

In some embodiments, the functionalization solution comprises a first strong acid and a second strong acid wherein the first strong acid comprises perchloric acid, hydroiodic acid, hydrobromic acid, hydrochloric acid, sulfuric acid, p-toluenesulfonic acid, methanesulfonic acid, nitric acid chloric acid, or any combination thereof. In some embodiments, the second strong acid comprises perchloric acid, hydroiodic acid, hydrobromic acid, hydrochloric acid, sulfuric acid, p-toluenesulfonic acid, methanesulfonic acid, nitric acid chloric acid, or any combination thereof.

In some embodiments, the functionalization solution comprises a volume percentage of the first strong acid of about 15% to about 60%. In some embodiments, the functionalization solution comprises a volume percentage of the first strong acid of at least about 15%. In some embodiments, the functionalization solution comprises a volume percentage of the first strong acid of at most about 60%. In some embodiments, the functionalization solution comprises a volume percentage of the first strong acid of about 15% to about 20%, about 15% to about 25%, about 15% to about 30%, about 15% to about 35%, about 15% to about 40%, about 15% to about 45%, about 15% to about 50%, about 15% to about 55%, about 15% to about 60%, about 20% to about 25%, about 20% to about 30%, about 20% to about 35%, about 20% to about 40%, about 20% to about 45%, about 20% to about 50%, about 20% to about 55%, about 20% to about 60%, about 25% to about 30%, about 25% to about 35%, about 25% to about 40%, about 25% to about 45%, about 25% to about 50%, about 25% to about 55%, about 25% to about 60%, about 30% to about 35%, about 30% to about 40%, about 30% to about 45%, about 30% to about 50%, about 30% to about 55%, about 30% to about 60%, about 35% to about 40%, about 35% to about 45%, about 35% to about 50%, about 35% to about 55%, about 35% to about 60%, about 40% to about 45%, about 40% to about 50%, about 40% to about 55%, about 40% to about 60%, about 45% to about 50%, about 45% to about 55%, about 45% to about 60%, about 50% to about 55%, about 50% to about 60%, or about 55% to about 60%.

In some embodiments, the functionalization solution is heated to a temperature of about 30° C. to about 120° C. In some embodiments, the functionalization solution is heated to a temperature of at least about 30° C. In some embodiments, the functionalization solution is heated to a temperature of at most about 120° C. In some embodiments, the functionalization solution is heated to a temperature of about 30° C. to about 40° C., about 30° C. to about 50° C., about 30° C. to about 60° C., about 30° C. to about 70° C., about 30° C. to about 80° C., about 30° C. to about 90° C., about 30° C. to about 100° C., about 30° C. to about 110° C., about 30° C. to about 120° C., about 40° C. to about 50° C., about 40° C. to about 60° C., about 40° C. to about 70° C., about 40° C. to about 80° C., about 40° C. to about 90° C., about 40° C. to about 100° C., about 40° C. to about 110° C., about 40° C. to about 120° C., about 50° C. to about 60° C., about 50° C. to about 70° C., about 50° C. to about 80° C., about 50° C. to about 90° C., about 50° C. to about 100° C., about 50° C. to about 110° C., about 50° C. to about 120° C., about 60° C. to about 70° C., about 60° C. to about 80° C., about 60° C. to about 90° C., about 60° C. to about 100° C., about 60° C. to about 110° C., about 60° C. to about 120° C., about 70° C. to about 80° C., about 70° C. to about 90° C., about 70° C. to about 100° C., about 70° C. to about 110° C., about 70° C. to about 120° C., about 80° C. to about 90° C., about 80° C. to about 100° C., about 80° C. to about 110° C., about 80° C. to about 120° C., about 90° C. to about 100° C., about 90° C. to about 110° C., about 90° C. to about 120° C., about 100° C. to about 110° C., about 100° C. to about 120° C., or about 110° C. to about 120° C.

In some embodiments, the functionalization solution is heated for a period of about 60 minutes to about 240 minutes. In some embodiments, the functionalization solution is heated for a period of at least about 60 minutes. In some embodiments, the functionalization solution is heated for a period of at most about 240 minutes. In some embodiments, the functionalization solution is heated for a period of about 60 minutes to about 80 minutes, about 60 minutes to about 100 minutes, about 60 minutes to about 120 minutes, about 60 minutes to about 140 minutes, about 60 minutes to about 160 minutes, about 60 minutes to about 180 minutes, about 60 minutes to about 200 minutes, about 60 minutes to about 220 minutes, about 60 minutes to about 240 minutes, about 80 minutes to about 100 minutes, about 80 minutes to about 120 minutes, about 80 minutes to about 140 minutes, about 80 minutes to about 160 minutes, about 80 minutes to about 180 minutes, about 80 minutes to about 200 minutes, about 80 minutes to about 220 minutes, about 80 minutes to about 240 minutes, about 100 minutes to about 120 minutes, about 100 minutes to about 140 minutes, about 100 minutes to about 160 minutes, about 100 minutes to about 180 minutes, about 100 minutes to about 200 minutes, about 100 minutes to about 220 minutes, about 100 minutes to about 240 minutes, about 120 minutes to about 140 minutes, about 120 minutes to about 160 minutes, about 120 minutes to about 180 minutes, about 120 minutes to about 200 minutes, about 120 minutes to about 220 minutes, about 120 minutes to about 240 minutes, about 140 minutes to about 160 minutes, about 140 minutes to about 180 minutes, about 140 minutes to about 200 minutes, about 140 minutes to about 220 minutes, about 140 minutes to about 240 minutes, about 160 minutes to about 180 minutes, about 160 minutes to about 200 minutes, about 160 minutes to about 220 minutes, about 160 minutes to about 240 minutes, about 180 minutes to about 200 minutes, about 180 minutes to about 220 minutes, about 180 minutes to about 240 minutes, about 200 minutes to about 220 minutes, about 200 minutes to about 240 minutes, or about 220 minutes to about 240 minutes.

In some embodiments, the functionalization solution is cooled to room temperature. In some embodiments, the water is deionized.

In some embodiments, the water is heated to a temperature of about 5° C. to about 40° C. In some embodiments, the water is heated to a temperature of at least about 5° C. In some embodiments, the water is heated to a temperature of at most about 40° C. In some embodiments, the water is heated to a temperature of about 5° C. to about 10° C., about 5° C. to about 15° C., about 5° C. to about 20° C., about 5° C. to about 25° C., about 5° C. to about 30° C., about 5° C. to about 35° C., about 5° C. to about 40° C., about 10° C. to about 15° C., about 10° C. to about 20° C., about 10° C. to about 25° C., about 10° C. to about 30° C., about 10° C. to about 35° C., about 10° C. to about 40° C., about 15° C. to about 20° C., about 15° C. to about 25° C., about 15° C. to about 30° C., about 15° C. to about 35° C., about 15° C. to about 40° C., about 20° C. to about 25° C., about 20° C. to about 30° C., about 20° C. to about 35° C., about 20° C. to about 40° C., about 25° C. to about 30° C., about 25° C. to about 35° C., about 25° C. to about 40° C., about 30° C. to about 35° C., about 30° C. to about 40° C., or about 35° C. to about 40° C.

In some embodiments, the volume of water is about 0.5 liters (L) to about 2 L. In some embodiments, the volume of water is at least about 0.5 L. In some embodiments, the volume of water is at most about 2 L. In some embodiments, the volume of water is about 0.5 L to about 0.625 L, about 0.5 L to about 0.75 L, about 0.5 L to about 0.875 L, about 0.5 L to about 1 L, about 0.5 L to about 1.25 L, about 0.5 L to about 1.5 L, about 0.5 L to about 1.75 L, about 0.5 L to about 2 L, about 0.625 L to about 0.75 L, about 0.625 L to about 0.875 L, about 0.625 L to about 1 L, about 0.625 L to about 1.25 L, about 0.625 L to about 1.5 L, about 0.625 L to about 1.75 L, about 0.625 L to about 2 L, about 0.75 L to about 0.875 L, about 0.75 L to about 1 L, about 0.75 L to about 1.25 L, about 0.75 L to about 1.5 L, about 0.75 L to about 1.75 L, about 0.75 L to about 2 L, about 0.875 L to about 1 L, about 0.875 L to about 1.25 L, about 0.875 L to about 1.5 L, about 0.875 L to about 1.75 L, about 0.875 L to about 2 L, about 1 L to about 1.25 L, about 1 L to about 1.5 L, about 1 L to about 1.75 L, about 1 L to about 2 L, about 1.25 L to about 1.5 L, about 1.25 L to about 1.75 L, about 1.25 L to about 2 L, about 1.5 L to about 1.75 L, about 1.5 L to about 2 L, or about 1.75 L to about 2 L.

In some embodiments, the carbon substrate is comprised of a carbon cloth, carbon fiber, amorphous carbon, glassy carbon, carbon nanofoam, carbon aerogel, or any combination thereof.

In some embodiments, the functionalized carbon substrate is annealed after functionalization.

In some embodiments, the annealing temperature is about 100° C. to about 400° C. In some embodiments, the annealing temperature is at least about 100° C. In some embodiments, the annealing temperature is at most about 400° C. In some embodiments, the annealing temperature is about 100° C. to about 150° C., about 100° C. to about 200° C., about 100° C. to about 250° C., about 100° C. to about 300° C., about 100° C. to about 350° C., about 100° C. to about 400° C., about 150° C. to about 200° C., about 150° C. to about 250° C., about 150° C. to about 300° C., about 150° C. to about 350° C., about 150° C. to about 400° C., about 200° C. to about 250° C., about 200° C. to about 300° C., about 200° C. to about 350° C., about 200° C. to about 400° C., about 250° C. to about 300° C., about 250° C. to about 350° C., about 250° C. to about 400° C., about 300° C. to about 350° C., about 300° C. to about 400° C., or about 350° C. to about 400° C.

In some embodiments, the functionalized carbon substrate is annealed for a period of about 0.5 hours to about 14 hours. In some embodiments, the functionalized carbon substrate is annealed for a period of at least about 0.5 hours. In some embodiments, the functionalized carbon substrate is annealed for a period of at most about 14 hours. In some embodiments, the functionalized carbon substrate is annealed for a period of about 0.5 hours to about 1 hour, about 0.5 hours to about 2 hours, about 0.5 hours to about 5 hours, about 0.5 hours to about 7 hours, about 0.5 hours to about 9 hours, about 0.5 hours to about 11 hours, about 0.5 hours to about 14 hours, about 1 hour to about 2 hours, about 1 hour to about 5 hours, about 1 hour to about 7 hours, about 1 hour to about 9 hours, about 1 hour to about 11 hours, about 1 hour to about 14 hours, about 2 hours to about 5 hours, about 2 hours to about 7 hours, about 2 hours to about 9 hours, about 2 hours to about 11 hours, about 2 hours to about 14 hours, about 5 hours to about 7 hours, about 5 hours to about 9 hours, about 5 hours to about 11 hours, about 5 hours to about 14 hours, about 7 hours to about 9 hours, about 7 hours to about 11 hours, about 7 hours to about 14 hours, about 9 hours to about 11 hours, about 9 hours to about 14 hours, or about 11 hours to about 14 hours.

In some embodiments, the step of preparing the functionalized carbon substrate comprises cutting a piece of functionalized carbon substrate, submerging the piece of functionalized carbon substrate in a solvent solution, sonicating the piece functionalized carbon substrate in the solvent solution, and drying the piece of functionalized carbon substrate.

In some embodiments, the functionalized carbon substrate has a geometric area of about 0.1 square centimeters ($cm^2$) to about 0.5 $cm^2$. In some embodiments, the functionalized carbon substrate has a geometric area of at least about 0.1 $cm^2$. In some embodiments, the functionalized carbon substrate has a geometric area of at most about 0.5 $cm^2$. In some embodiments, the functionalized carbon substrate has a geometric area of about 0.1 $cm^2$ to about 0.2 $cm^2$, about 0.1 $cm^2$ to about 0.3 $cm^2$, about 0.1 $cm^2$ to about 0.4 $cm^2$, about 0.1 $cm^2$ to about 0.5 $cm^2$, about 0.2 $cm^2$ to about 0.3 $cm^2$, about 0.2 $cm^2$ to about 0.4 $cm^2$, about 0.2 $cm^2$ to about 0.5 cm², about 0.3 cm² to about 0.4 cm², about 0.3 cm² to about 0.5 cm², or about 0.4 cm² to about 0.5 cm².

In some embodiments, the solvent solution comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof. In some embodiments, the solvent solution comprises a first solvent and a second solvent. In some embodiments, the first solvent solution comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof. In some embodiments, the second solvent solution comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof.

In some embodiments, the first solvent comprises a volume percentage of the solvent solution of about 25% to about 95%. In some embodiments, the first solvent comprises a volume percentage of the solvent solution of at least about 25%. In some embodiments, the first solvent comprises a volume percentage of the solvent solution of at most about 95%. In some embodiments, the first solvent comprises a volume percentage of the solvent solution of about 25% to about 35%, about 25% to about 45%, about 25% to about 55%, about 25% to about 65%, about 25% to about 75%, about 25% to about 85%, about 25% to about 95%, about 35% to about 45%, about 35% to about 55%, about 35% to about 65%, about 35% to about 75%, about 35% to about 85%, about 35% to about 95%, about 45% to about 55%, about 45% to about 65%, about 45% to about 75%, about 45% to about 85%, about 45% to about 95%, about 55% to about 65%, about 55% to about 75%, about 55% to about 85%, about 55% to about 95%, about 65% to about 75%, about 65% to about 85%, about 65% to about 95%, about 75% to about 85%, about 75% to about 95%, or about 85% to about 95%.

In some embodiments, the period of sonication is about 30 minutes to about 60 minutes. In some embodiments, the period of sonication is at least about 30 minutes. In some embodiments, the period of sonication is at most about 60 minutes. In some embodiments, the period of sonication is about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes, or about 55 minutes to about 60 minutes.

In some embodiments, the drying occurs at a temperature of about 30° C. to about 120° C. In some embodiments, the drying occurs at a temperature of at least about 30° C. In some embodiments, the drying occurs at a temperature of at most about 120° C. In some embodiments, the drying occurs at a temperature of about 30° C. to about 40° C., about 30° C. to about 50° C., about 30° C. to about 60° C., about 30° C. to about 70° C., about 30° C. to about 80° C., about 30° C. to about 90° C., about 30° C. to about 100° C., about 30° C. to about 110° C., about 30° C. to about 120° C., about 40° C. to about 50° C., about 40° C. to about 60° C., about 40° C. to about 70° C., about 40° C. to about 80° C., about 40° C. to about 90° C., about 40° C. to about 100° C., about 40° C. to about 110° C., about 40° C. to about 120° C., about 50° C. to about 60° C., about 50° C. to about 70° C., about 50° C. to about 80° C., about 50° C. to about 90° C., about 50° C. to about 100° C., about 50° C. to about 110° C., about 50° C. to about 120° C., about 60° C. to about 70° C., about 60° C. to about 80° C., about 60° C. to about 90° C., about 60° C. to about 100° C., about 60° C. to about 110° C., about 60° C. to about 120° C., about 70° C. to about 80° C., about 70° C. to about 90° C., about 70° C. to about 100° C., about 70° C. to about 110° C., about 70° C. to about 120° C., about 80° C. to about 90° C., about 80° C. to about 100° C., about 80° C. to about 110° C., about 80° C. to about 120° C., about 90° C. to about 100° C., about 90° C. to about 110° C., about 90° C. to about 120° C., about 100° C. to about 110° C., about 100° C. to about 120° C., or about 110° C. to about 120° C.

In some embodiments, the drying occurs over a period of time of about 3 hours to about 12 hours. In some embodiments, the drying occurs over a period of time of at least about 3 hours. In some embodiments, the drying occurs over a period of time of at most about 12 hours. In some embodiments, the drying occurs over a period of time of about 3 hours to about 4 hours, about 3 hours to about 5 hours, about 3 hours to about 6 hours, about 3 hours to about 7 hours, about 3 hours to about 8 hours, about 3 hours to about 9 hours, about 3 hours to about 10 hours, about 3 hours to about 11 hours, about 3 hours to about 12 hours, about 4 hours to about 5 hours, about 4 hours to about 6 hours, about 4 hours to about 7 hours, about 4 hours to about 8 hours, about 4 hours to about 9 hours, about 4 hours to about 10 hours, about 4 hours to about 11 hours, about 4 hours to about 12 hours, about 5 hours to about 6 hours, about 5 hours to about 7 hours, about 5 hours to about 8 hours, about 5 hours to about 9 hours, about 5 hours to about 10 hours, about 5 hours to about 11 hours, about 5 hours to about 12 hours, about 6 hours to about 7 hours, about 6 hours to about 8 hours, about 6 hours to about 9 hours, about 6 hours to about 10 hours, about 6 hours to about 11 hours, about 6 hours to about 12 hours, about 7 hours to about 8 hours, about 7 hours to about 9 hours, about 7 hours to about 10 hours, about 7 hours to about 11 hours, about 7 hours to about 12 hours, about 8 hours to about 9 hours, about 8 hours to about 10 hours, about 8 hours to about 11 hours, about 8 hours to about 12 hours, about 9 hours to about 10 hours, about 9 hours to about 11 hours, about 9 hours to about 12 hours, about 10 hours to about 11 hours, about 10 hours to about 12 hours, or about 11 hours to about 12 hours.

In some embodiments the step of formulating a polymerization fluid comprises forming a polymerization solution comprising a conducting polymer, an acid, a detergent, water, and an oxidizing agent and stirring the polymerization solution. In some embodiments, the conducting polymer comprises polyaniline, poly(p-phenylene oxide), poly(p-phenylene sulfide), poly(3,4-ethylenedioxythiophene), polypyrrole, polythiophene, poly(3-alkythiophene), poly(3-methylthiophene), poly(3-hexylthiophene), or any combination thereof.

In some embodiments, the conducting polymer is distilled. In some embodiments, the conducting polymer is distilled by steam. In some embodiments, the steam comprises water, petroleum, oil, lipids, petrochemicals, or any combination thereof.

In some embodiments, the mass of the conducting polymer is about 20 milligrams (mg) to about 90 mg. In some embodiments, the mass of the conducting polymer is at least about 20 mg. In some embodiments, the mass of the conducting polymer is at most about 90 mg. In some embodiments, the mass of the conducting polymer is about 20 mg to about 30 mg, about 20 mg to about 40 mg, about 20 mg to about 50 mg, about 20 mg to about 60 mg, about 20 mg to about 70 mg, about 20 mg to about 80 mg, about 20 mg to about 90 mg, about 30 mg to about 40 mg, about 30 mg to about 50 mg, about 30 mg to about 60 mg, about 30 mg to about 70 mg, about 30 mg to about 80 mg, about 30 mg to about 90 mg, about 40 mg to about 50 mg, about 40 mg to about 60 mg, about 40 mg to about 70 mg, about 40 mg to about 80 mg, about 40 mg to about 90 mg, about 50 mg to about 60 mg, about 50 mg to about 70 mg, about 50 mg to about 80 mg, about 50 mg to about 90 mg, about 60 mg to about 70 mg, about 60 mg to about 80 mg, about 60 mg to about 90 mg, about 70 mg to about 80 mg, about 70 mg to about 90 mg, or about 80 mg to about 90 mg.

In some embodiments, the acid is aqueous. In some embodiments, the acid comprises a strong acid. In some embodiments, the strong acid comprises perchloric acid, hydroiodic acid, hydrobromic acid, hydrochloric acid, sulfuric acid, p-toluenesulfonic acid, methanesulfonic acid, nitric acid, chloric acid, or any combination thereof.

In some embodiments, the concentration of the acid is about 0.1 M to about 0.5 M. In some embodiments, the concentration of the acid is at least about 0.1 M. In some embodiments, the concentration of the acid is at most about 0.5 M. In some embodiments, the concentration of the acid is about 0.1 M to about 0.2 M, about 0.1 M to about 0.3 M, about 0.1 M to about 0.4 M, about 0.1 M to about 0.5 M, about 0.2 M to about 0.3 M, about 0.2 M to about 0.4 M, about 0.2 M to about 0.5 M, about 0.3 M to about 0.4 M, about 0.3 M to about 0.5 M, or about 0.4 M to about 0.5 M.

In some embodiments, the volume of the acid is about 0.1 milliliters (ml) to about 0.6 ml. In some embodiments, the volume of the acid is at least about 0.1 ml. In some embodiments, the volume of the acid is at most about 0.6 ml. In some embodiments, the volume of the acid is about 0.1 ml to about 0.2 ml, about 0.1 ml to about 0.3 ml, about 0.1 ml to about 0.4 ml, about 0.1 ml to about 0.5 ml, about 0.1 ml to about 0.6 ml, about 0.2 ml to about 0.3 ml, about 0.2 ml to about 0.4 ml, about 0.2 ml to about 0.5 ml, about 0.2 ml to about 0.6 ml, about 0.3 ml to about 0.4 ml, about 0.3 ml to about 0.5 ml, about 0.3 ml to about 0.6 ml, about 0.4 ml to about 0.5 ml, about 0.4 ml to about 0.6 ml, or about 0.5 ml to about 0.6 ml.

In some embodiments, the detergent comprises, dioctyl sodium sulfosuccinate, perfluorooctanesulfonate, perfluorobutanesulfonate, alkyl-aryl ether phosphates, alkyl ether phosphates, cetrimonium bromide, cetylpyridinium chloride, benzalkonium chloride, benzethonium chloride, dimethyldioctadecylammonium chloride, dioctadecyldimethylammonium bromide, octenidine dihydrochloride, octaethylene glycol monododecyl ether, pentaethylene glycol monododecyl ether, polypropylene glycol alkyl ethers, decyl glucoside, lauryl glucoside, octyl glucoside, polyethylene glycol octylphenyl ethers, polyethylene glycol alkylphenyl ethers, nonoxynol-9, glycerol alkyl esters, glyceryl laurate, polyoxyethylene glycol sorbitan alkyl esters, polysorbate sorbitan alkyl esters, dodecyldimethylamine oxide, poloxamers, polyethoxylated tallow amine, or any combination thereof.

In some embodiments, the mass of the detergent is about 1 mg to about 10 mg. In some embodiments, the mass of the detergent is at least about 1 mg. In some embodiments, the mass of the detergent is at most about 10 mg. In some embodiments, the mass of the detergent is about 1 mg to about 2 mg, about 1 mg to about 3 mg, about 1 mg to about 4 mg, about 1 mg to about 5 mg, about 1 mg to about 6 mg, about 1 mg to about 7 mg, about 1 mg to about 8 mg, about 1 mg to about 9 mg, about 1 mg to about 10 mg, about 2 mg to about 3 mg, about 2 mg to about 4 mg, about 2 mg to about 5 mg, about 2 mg to about 6 mg, about 2 mg to about 7 mg, about 2 mg to about 8 mg, about 2 mg to about 9 mg, about 2 mg to about 10 mg, about 3 mg to about 4 mg, about 3 mg to about 5 mg, about 3 mg to about 6 mg, about 3 mg to about 7 mg, about 3 mg to about 8 mg, about 3 mg to about 9 mg, about 3 mg to about 10 mg, about 4 mg to about 5 mg, about 4 mg to about 6 mg, about 4 mg to about 7 mg, about 4 mg to about 8 mg, about 4 mg to about 9 mg, about 4 mg to about 10 mg, about 5 mg to about 6 mg, about 5 mg to about 7 mg, about 5 mg to about 8 mg, about 5 mg to about 9 mg, about 5 mg to about 10 mg, about 6 mg to about 7 mg, about 6 mg to about 8 mg, about 6 mg to about 9 mg, about 6 mg to about 10 mg, about 7 mg to about 8 mg, about 7 mg to about 9 mg, about 7 mg to about 10 mg, about 8 mg to about 9 mg, about 8 mg to about 10 mg, or about 9 mg to about 10 mg.

In some embodiments, the volume of the water is about 9 ml to about 40 ml. In some embodiments, the volume of the water is at least about 9 ml. In some embodiments, the volume of the water is at most about 40 ml. In some embodiments, the volume of the water is about 9 ml to about 10 ml, about 9 ml to about 15 ml, about 9 ml to about 20 ml, about 9 ml to about 25 ml, about 9 ml to about 30 ml, about 9 ml to about 35 ml, about 9 ml to about 40 ml, about 10 ml to about 15 ml, about 10 ml to about 20 ml, about 10 ml to about 25 ml, about 10 ml to about 30 ml, about 10 ml to about 35 ml, about 10 ml to about 40 ml, about 15 ml to about 20 ml, about 15 ml to about 25 ml, about 15 ml to about 30 ml, about 15 ml to about 35 ml, about 15 ml to about 40 ml, about 20 ml to about 25 ml, about 20 ml to about 30 ml, about 20 ml to about 35 ml, about 20 ml to about 40 ml, about 25 ml to about 30 ml, about 25 ml to about 35 ml, about 25 ml to about 40 ml, about 30 ml to about 35 ml, about 30 ml to about 40 ml, or about 35 ml to about 40 ml.

In some embodiments, the oxidizing agent comprises ammonium persulfate and oxygen, ozone, hydrogen peroxide, fluorine, chlorine, halogens, nitric acid, sulfuric acid, peroxydisulfuric acid, peroxymonosulfuric acid, chlorite, perchlorate, hypochlorite, household bleach, chromic acid, dichromic acid, chromium trioxide, pyridinium chlorochromate, permanganate, sodium perborate, nitrous oxide, potassium nitrate, sodium bismuthate, or any combination thereof. In some embodiments, the oxidizing agent is added in one portion.

In some embodiments, the concentration of the oxidizing agent is about 0.1 M to about 0.5 M. In some embodiments, the concentration of the oxidizing agent is at least about 0.1 M. In some embodiments, the concentration of the oxidizing agent is at most about 0.5 M. In some embodiments, the concentration of the oxidizing agent is about 0.1 M to about 0.2 M, about 0.1 M to about 0.3 M, about 0.1 M to about 0.4 M, about 0.1 M to about 0.5 M, about 0.2 M to about 0.3 M, about 0.2 M to about 0.4 M, about 0.2 M to about 0.5 M, about 0.3 M to about 0.4 M, about 0.3 M to about 0.5 M, or about 0.4 M to about 0.5 M.

In some embodiments, the mass of the oxidizing agent is about 1 mg to about 10 mg. In some embodiments, the mass of the oxidizing agent is at least about 1 mg. In some embodiments, the mass of the oxidizing agent is at most about 10 mg. In some embodiments, the mass of the oxidizing agent is about 1 mg to about 2 mg, about 1 mg to about 3 mg, about 1 mg to about 4 mg, about 1 mg to about 5 mg, about 1 mg to about 6 mg, about 1 mg to about 7 mg, about 1 mg to about 8 mg, about 1 mg to about 9 mg, about 1 mg to about 10 mg, about 2 mg to about 3 mg, about 2 mg to about 4 mg, about 2 mg to about 5 mg, about 2 mg to about 6 mg, about 2 mg to about 7 mg, about 2 mg to about 8 mg, about 2 mg to about 9 mg, about 2 mg to about 10 mg, about 3 mg to about 4 mg, about 3 mg to about 5 mg, about 3 mg to about 6 mg, about 3 mg to about 7 mg, about 3 mg to about 8 mg, about 3 mg to about 9 mg, about 3 mg to about 10 mg, about 4 mg to about 5 mg, about 4 mg to about 6 mg, about 4 mg to about 7 mg, about 4 mg to about 8 mg, about 4 mg to about 9 mg, about 4 mg to about 10 mg, about 5 mg to about 6 mg, about 5 mg to about 7 mg, about 5 mg to about 8 mg, about 5 mg to about 9 mg, about 5 mg to about 10 mg, about 6 mg to about 7 mg, about 6 mg to about 8 mg, about 6 mg to about 9 mg, about 6 mg to about 10 mg, about 7 mg to about 8 mg, about 7 mg to about 9 mg, about 7 mg to about 10 mg, about 8 mg to about 9 mg, about 8 mg to about 10 mg, or about 9 mg to about 10 mg.

In some embodiments, the polymerization solution is stirred at room temperature.

In some embodiments, the polymerization solution is stirred for a period of time of about 10 minutes to about 40 minutes. In some embodiments, the polymerization solution is stirred for a period of time of at least about 10 minutes. In some embodiments, the polymerization solution is stirred for a period of time of at most about 40 minutes. In some embodiments, the polymerization solution is stirred for a period of time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 15 minutes to about 20 minutes, about 15 minutes to about 25 minutes, about 15 minutes to about 30 minutes, about 15 minutes to about 35 minutes, about 15 minutes to about 40 minutes, about 20 minutes to about 25 minutes, about 20 minutes to about 30 minutes, about 20 minutes to about 35 minutes, about 20 minutes to about 40 minutes, about 25 minutes to about 30 minutes, about 25 minutes to about 35 minutes, about 25 minutes to about 40 minutes, about 30 minutes to about 35 minutes, about 30 minutes to about 40 minutes, or about 35 minutes to about 40 minutes.

In some embodiments, the polymerization solution is stirred before the addition of the oxidizing agent. In some embodiments, the polymerization solution is stirred by a magnetic stirrer.

In some embodiments, the step of synthesizing a nanotube on the functionalized carbon substrate comprises stirring the polymerization fluid, immersing the functionalized carbon substrate in the polymerization fluid, storing the functionalized carbon substrate in the polymerization fluid, removing a functionalized carbon substrate from the polymerization fluid, washing the functionalized carbon substrate with water, and drying the functionalized carbon substrate. In some embodiments washing the functionalized carbon substrate with water removes excess polymerization fluid. In some embodiments, the functionalized carbon substrate is a polyaniline functionalized carbon substrate.

In some embodiments, polymerization fluid is stirred violently. In some embodiments, polymerization fluid is stirred non-violently. In some embodiments, the functionalized carbon substrate and the polymerization fluid are stored without agitation. In some embodiments, the functionalized carbon substrate and the polymerization fluid are stored with agitation.

In some embodiments, the polymerization fluid is stirred for a period of time of about 15 seconds to about 60 seconds. In some embodiments, the polymerization fluid is stirred for a period of time of at least about 15 seconds. In some embodiments, the polymerization fluid is stirred for a period of time of at most about 60 seconds. In some embodiments, the polymerization fluid is stirred for a period of time of about 15 seconds to about 20 seconds, about 15 seconds to about 25 seconds, about 15 seconds to about 30 seconds, about 15 seconds to about 35 seconds, about 15 seconds to about 40 seconds, about 15 seconds to about 45 seconds, about 15 seconds to about 50 seconds, about 15 seconds to about 55 seconds, about 15 seconds to about 60 seconds, about 20 seconds to about 25 seconds, about 20 seconds to about 30 seconds, about 20 seconds to about 35 seconds, about 20 seconds to about 40 seconds, about 20 seconds to about 45 seconds, about 20 seconds to about 50 seconds, about 20 seconds to about 55 seconds, about 20 seconds to about 60 seconds, about 25 seconds to about 30 seconds, about 25 seconds to about 35 seconds, about 25 seconds to about 40 seconds, about 25 seconds to about 45 seconds, about 25 seconds to about 50 seconds, about 25 seconds to about 55 seconds, about 25 seconds to about 60 seconds, about 30 seconds to about 35 seconds, about 30 seconds to about 40 seconds, about 30 seconds to about 45 seconds, about 30 seconds to about 50 seconds, about 30 seconds to about 55 seconds, about 30 seconds to about 60 seconds, about 35 seconds to about 40 seconds, about 35 seconds to about 45 seconds, about 35 seconds to about 50 seconds, about 35 seconds to about 55 seconds, about 35 seconds to about 60 seconds, about 40 seconds to about 45 seconds, about 40 seconds to about 50 seconds, about 40 seconds to about 55 seconds, about 40 seconds to about 60 seconds, about 45 seconds to about 50 seconds, about 45 seconds to about 55 seconds, about 45 seconds to about 60 seconds, about 50 seconds to about 55 seconds, about 50 seconds to about 60 seconds, or about 55 seconds to about 60 seconds.

In some embodiments, the functionalized carbon substrate is stored in the polymerization fluid at a temperature of about 10° C. to about 50° C. In some embodiments, the functionalized carbon substrate is stored in the polymerization fluid at a temperature of at least about 10° C. In some embodiments, the functionalized carbon substrate is stored in the polymerization fluid at a temperature of at most about 50° C. In some embodiments, the functionalized carbon substrate is stored in the polymerization fluid at a temperature of about 10° C. to about 15° C., about 10° C. to about 20° C., about 10° C. to about 25° C., about 10° C. to about 30° C., about 10° C. to about 35° C., about 10° C. to about 40° C., about 10° C. to about 45° C., about 10° C. to about 50° C., about 15° C. to about 20° C., about 15° C. to about 25° C., about 15° C. to about 30° C., about 15° C. to about 35° C., about 15° C. to about 40° C., about 15° C. to about 45° C., about 15° C. to about 50° C., about 20° C. to about 25° C., about 20° C. to about 30° C., about 20° C. to about 35° C., about 20° C. to about 40° C., about 20° C. to about 45° C., about 20° C. to about 50° C., about 25° C. to about 30° C., about 25° C. to about 35° C., about 25° C. to about 40° C., about 25° C. to about 45° C., about 25° C. to about 50° C., about 30° C. to about 35° C., about 30° C. to about 40° C., about 30° C. to about 45° C., about 30° C. to about 50° C., about 35° C. to about 40° C., about 35° C. to about 45° C., about 35° C. to about 50° C., about 40° C. to about 45° C., about 40° C. to about 50° C., or about 45° C. to about 50° C.

In some embodiments, the functionalized carbon substrate is stored in the polymerization fluid for a period of time of about 8 hours to about 70 hours. In some embodiments, the functionalized carbon substrate is stored in the polymerization fluid for a period of time of at least about 8 hours. In some embodiments, the functionalized carbon substrate is stored in the polymerization fluid for a period of time of at most about 70 hours. In some embodiments, the functionalized carbon substrate is stored in the polymerization fluid for a period of time of about 8 hours to about 10 hours, about 8 hours to about 20 hours, about 8 hours to about 30 hours, about 8 hours to about 40 hours, about 8 hours to about 50 hours, about 8 hours to about 60 hours, about 8 hours to about 70 hours, about 10 hours to about 20 hours, about 10 hours to about 30 hours, about 10 hours to about 40 hours, about 10 hours to about 50 hours, about 10 hours to about 60 hours, about 10 hours to about 70 hours, about 20 hours to about 30 hours, about 20 hours to about 40 hours, about 20 hours to about 50 hours, about 20 hours to about 60 hours, about 20 hours to about 70 hours, about 30 hours to about 40 hours, about 30 hours to about 50 hours, about 30 hours to about 60 hours, about 30 hours to about 70 hours, about 40 hours to about 50 hours, about 40 hours to about 60 hours, about 40 hours to about 70 hours, about 50 hours to about 60 hours, about 50 hours to about 70 hours, or about 60 hours to about 70 hours.

In some embodiments, the functionalized carbon substrate is dried at a temperature of about 30 hours to about 120 hours. In some embodiments, the functionalized carbon substrate is dried at a temperature of at least about 30 hours. In some embodiments, the functionalized carbon substrate is dried at a temperature of at most about 120 hours. In some embodiments, the functionalized carbon substrate is dried at a temperature of about 30 hours to about 40 hours, about 30 hours to about 50 hours, about 30 hours to about 60 hours, about 30 hours to about 70 hours, about 30 hours to about 80 hours, about 30 hours to about 90 hours, about 30 hours to about 100 hours, about 30 hours to about 110 hours, about 30 hours to about 120 hours, about 40 hours to about 50 hours, about 40 hours to about 60 hours, about 40 hours to about 70 hours, about 40 hours to about 80 hours, about 40 hours to about 90 hours, about 40 hours to about 100 hours, about 40 hours to about 110 hours, about 40 hours to about 120 hours, about 50 hours to about 60 hours, about 50 hours to about 70 hours, about 50 hours to about 80 hours, about 50 hours to about 90 hours, about 50 hours to about 100 hours, about 50 hours to about 110 hours, about 50 hours to about 120 hours, about 60 hours to about 70 hours, about 60 hours to about 80 hours, about 60 hours to about 90 hours, about 60 hours to about 100 hours, about 60 hours to about 110 hours, about 60 hours to about 120 hours, about 70 hours to about 80 hours, about 70 hours to about 90 hours, about 70 hours to about 100 hours, about 70 hours to about 110 hours, about 70 hours to about 120 hours, about 80 hours to about 90 hours, about 80 hours to about 100 hours, about 80 hours to about 110 hours, about 80 hours to about 120 hours, about 90 hours to about 100 hours, about 90 hours to about 110 hours, about 90 hours to about 120 hours, about 100 hours to about 110 hours, about 100 hours to about 120 hours, or about 110 hours to about 120 hours.

Other goals and advantages of the methods and devices taught herein will be further appreciated and understood when considered in conjunction with the following description and accompanying drawings. While the following description may contain specific details describing particular embodiments of the methods and devices taught herein, this should not be construed as limitations to the scope of the methods and devices taught herein but rather as an exemplification of preferable embodiments. For each aspect of the methods and devices taught herein, many variations are possible as suggested herein that are known to those of ordinary skill in the art. A variety of changes and modifications may be made within the scope of the methods and devices taught herein without departing from the spirit thereof.

BRIEF DESCRIPTION OF THE DRAWINGS

The novel features of the methods and devices taught herein are set forth with particularity in the appended claims. A better understanding of the features and advantages of the present methods and devices taught herein will be obtained by reference to the following detailed description that sets forth illustrative embodiments, in which the principles of the methods and devices taught herein are utilized, and the accompanying drawings or figures (also "FIG." and "FIG.s" herein), of which:

DETAILED DESCRIPTION

Figure 1A:
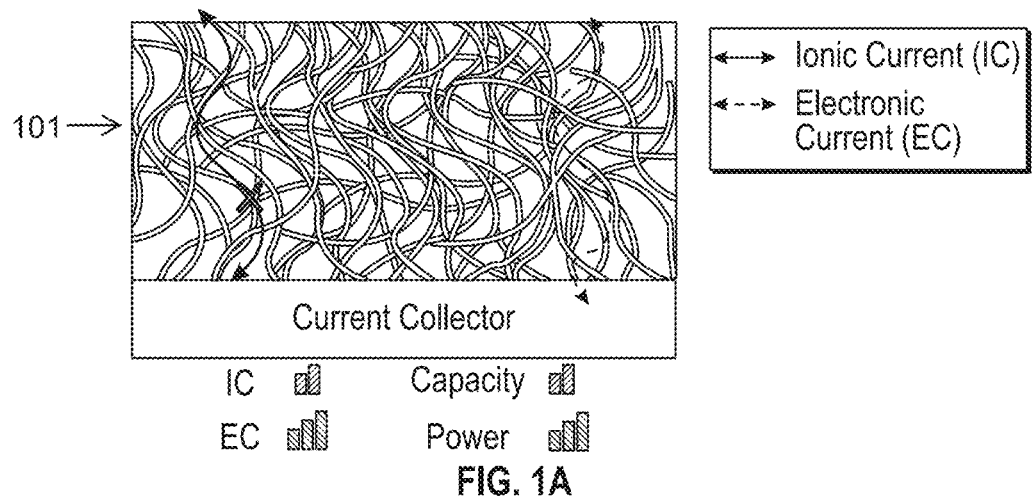
FIG. 1A illustratively depicts electron and ion transfer pathways in a nanofiber morphology of polyaniline, in accordance with some embodiments.

The market for flexible electronics such as solar cell arrays, flexible displays, and wearable electronics is rapidly growing and contributing to the design of future electronics, due to their portability, ruggedness, bendability, and rollability. The recent rapid progress in the production of flexible electronic devices over large areas, at the fraction of the cost of traditional semiconductors, has led to the development of various energy storage and power storage devices, including a wide array of flexible semiconductors of varying sizes, shapes, and mechanical properties.

As such, there are growing demands for flexible, solid-state energy storage devices that are compatible with next-generation printed and flexible electronics. To this effect, the active layer and interfaces between flexible components must be redesigned to replace the rigid components of traditional supercapacitors (SCs). As such, improving the energy density of SCs is necessary and will contribute to the technological advancement of energy storage devices.

Reducing the size, increasing the flexibility, and achieving a high energy density, integrated with the intrinsic high power density and cyclability of supercapacitors constitutes a major step forward toward more sustainable and efficient energy storage systems.

Therefore, a current unmet need exists for a battery device that is capable of recharging in seconds, that provides power over long periods of time, can be repeatedly bent without capability loss, and is as miniaturizable as other corresponding electronics components.

Provided herein are supercapacitor devices and methods for fabrication thereof. The supercapacitor devices may be electrochemical devices. The supercapacitor devices may be configured for high energy and power density. The supercapacitor devices may include an electrode composed of a rectangular-tube PANI that is chemically synthesized on a functionalized carbon cloth (FCC) substrate, and immobilized on a current collector. The supercapacitor devices may be arranged as symmetric, asymmetric, or 3D capacitors devices which contain an electrode immobilized on a current collector. The supercapacitor devices of the disclosure may comprise interconnected devices.

The present disclosure additionally provides systems and methods for growing polyaniline nanotubes on carbon cloth. The processing may include the manufacture (or synthesis) of functionalized carbon cloth and/or the manufacture (or synthesis) of polyaniline nanotubes and nanostructures. Some embodiments provide methods, devices, and systems for the manufacture (or synthesis) of functionalized carbon cloth and/or for the manufacture (or synthesis) of polyaniline nanotubes and nanostructures and/or for the manufacture (or synthesis) of electrolytes and/or for the manufacture (or synthesis) of supercapacitors. Various aspects of the disclosure described herein may be applied to any of the particular applications set forth below or in any other type of manufacturing, synthesis, or processing setting. Other manufacturing, synthesis, or processing of materials may equally benefit from features described herein. For example, the methods, devices, and systems herein may be advantageously applied to manufacture (or synthesis) of various forms of functionalized carbon. The methods and devices taught herein may be applied as a stand-alone method, device, or system, or as part of an integrated manufacturing or materials (e.g., chemicals) processing system. It shall be understood that different aspects of the methods and devices taught herein may be appreciated individually, collectively, or in combination with each other.

The present disclosure further provides an exemplary energy storage device fabricated from rectangular-tube polyaniline (PANI) that is chemically synthesized. The rectangular-tube PANI, as an active material, is synthesized on a functionalized carbon cloth (FCC) as a substrate, and the obtained composite is immobilized on a stainless steel mesh as a current collector. The present disclosure additionally presents a technique for the direct synthesis of PANI nanotubes, with rectangular pores, on chemically activated CC.

The supercapacitors described herein may play an important role in one or more applications or areas, such as, but not limited to, portable electronics (e.g., cellphones, computers, cameras, etc.), medical devices (e.g., life-sustaining and life-enhancing medical devices, including pacemakers, defibrillators, hearing aids, pain management devices, drug pumps), electric vehicles (e.g., batteries with long lifetime are needed to improve the electric vehicle industry), space (e.g., the batteries are used in space to power space systems including rovers, landers, spacesuits, and electronic equipment), military batteries (e.g., the military uses special batteries for powering a large number of electronics and equipment; reduced mass/volume of the batteries described herein are highly preferred), electric aircraft (e.g., an aircraft that runs on electric motors rather than internal combustion engines, with electricity coming from solar cells or batteries), grid scale energy storage (e.g., batteries are used to store electrical energy during times when production, from power plants, exceeds consumption and the stored energy are used at times when consumption exceeds production), renewable energy (e.g., since the sun does not shine at night and the wind does not blow at all times, batteries in off-the-grid power systems are capable of storing excess electricity from renewable energy sources for use during hours after sunset and when the wind is not blowing; high power batteries may harvest energy from solar cells with higher efficiency than current state-of-the-art batteries), power tools (e.g., the batteries described herein may enable fast-charging cordless power tools such as drills, screwdrivers, saws, wrenches, and grinders; current batteries have a long recharging time), or any combination thereof.

Supercapacitors

Supercapacitors are high-power energy storage devices with a much higher capacitance than normal capacitors. Supercapacitors (SCs) have recently attracted considerable attention as high power density energy storage resources, and have been increasingly employed energy storage resources in portable electronic devices, regenerative braking systems, voltage stabilization devices, hybrid buses, medical devices, and hybrid electric vehicles.

In some embodiments, supercapacitors or electrochemical capacitors are comprised of two or more electrodes separated by an ion-permeable membrane (separator) and an electrolyte ionically connecting the electrodes, whereas ions in the electrolyte form electric double layers of opposite polarity to the electrode's polarity when the electrodes are polarized by an applied voltage.

In some embodiments, an electrode in an electrochemical cell comprised of a substrate and an active material referred to as either an anode, whereas electrons leave the active material within cell and oxidation occurs, or a cathode, whereas the electrons enter the active material within cell and reduction occurs. Each electrode may become either the anode or the cathode depending on the direction of current through the cell. In some embodiments, the supercapacitors may be symmetric or asymmetric, wherein the electrodes are identical or dissimilar, respectively. In some embodiments, the supercapacitors are configured with two or more electrodes.

Supercapacitors store energy via three main mechanisms (i) electric double-layer capacitance (EDLC), (ii) Faradaic capacitance, and (iii) capacitance directly from redox active electrolytes. Via the first two mechanisms, only solid-phase electrode materials contribute to charge storage, while the other cell components, including electrodes and electrolyte, are electrochemically inert. The addition of a redox active species to the electrolyte enhances the cell's capacitance through electrochemical reactions at the electrode/electrolyte interface.

In some embodiments, the devices herein (e.g., supercapacitors and/or microsupercapacitors) may be configured in different structures. In some embodiments, the devices may be configured in stacked structures (e.g., comprising stacked electrodes), planar structures (e.g., comprising interdigitated electrodes), spirally wound structures, or any combination thereof. In some embodiments, the devices may be configured in a sandwich structure or an interdigitated structure.

Electrodes

Materials commonly employed in supercapacitor electrodes include transition-metal oxides, conducting polymers, and high-surface carbons. Unfortunately, however, conventional supercapacitors based on these materials may exhibit low energy densities, and are limited by the mass loading of the electrode's active materials.

In some embodiments, faradaic materials are employed as electrodes because they store charge both on the surface and in the bulk, as opposed to EDLC materials, which only store charge through ion adsorption on the electrode's surface.

In some embodiments, high-surface-area electrodes are carbonaceous and comprise carbon cloth, carbon fiber, amorphous carbon, glassy carbon, carbon nanofoam, carbon aerogel, or activated carbon (AC).

In some embodiments, AC refers to carbon that has been treated to increase its surface area. In some embodiments, the crystalline density of AC is about 0.5 $g/cm^3$.

The conducting polymer polyaniline serves as an ideal charge storage material due to its low-cost, ease of synthesis, controllable electrical conductivity, large specific capacitance, and environmental stability.

Among the vast majority of supercapacitive component materials, polyaniline (PANI), and its different morphologies, have been used as an active material because of its intrinsic high oxidation-reduction (redox) active-specific capacitance, flexibility, and ability to convert between multiple redox states accompanied by rapid doping and dedoping of counter ions during charge and discharge processes.

In some embodiments, polyaniline (PANI) is one example of a semi-flexible rod conducting polymer which is ease to synthesize, is environmentally stable, cheap, and exhibits a high electrical conductivity and specific pseudocapacitance. Additionally, PANI may be readily converted between multiple redox states accompanied by rapid doping and dedoping of counter ions during charge and discharge processes and, as such, electron transfer in PANI is accomplished through a conjugated double bond, passing of an electric current in a coherent wrap. Finally, in some embodiments, PANI exhibits an intrinsic high oxidation-reduction (redox) active-specific capacitance and flexibility. Therefore, developing PANI-based hybrid electrodes has been an attractive topic in the hope of improving its cycling stability.

Despite being a superior energy storage material, bulk PANI, in some embodiments, suffers from poor mechanical properties and mediocre cycling stability, whereas the large volume changes associated with doping and dedoping of the counter ions destroy the polymer backbone over cycling thus dimishing capacity and limiting the potential commercial applications of PANI pseudocapacitors. As electron transfer in PANI occurs through a conjugated double bond, however, passing an electric current in a coherent wrap may be easier than electron transfer between two independent parts.

In some embodiments, the structure and geometry of PANI is altered at the nanoscale to relax its internal strain by allowing the small surface features free space to flex. In some embodiments, the PANI is functionalized, wherein new functions, features, capabilities, or properties of a material are added by changing its surface chemistry and morphology.

In some embodiments, the morphology of a faradaic electrode's materials has a significant impact on the electrochemical performance. Some electrode structures facilitate electron transfer in the active materials and, therefore, increase the conductivity and capacity of their respective devices. Nanostructuring of electrode materials represents an effective strategy towards altering the morphology of, and significantly improving the performance of, supercapacitor electrodes by increasing the interfacial area between the electrode and the electrolyte and by minimizing the ion diffusion pathway within the active materials. In some embodiments, electrode nanostructuring additionally minimizes the ion diffusion pathway within the active material.

In some embodiments, PANI has a crystalline density of about 1.3 $g/cm^3$.

In some embodiments, the chemical and electrochemical properties of an electrode are enhanced through the addition of surface functional groups which increase charge storage capacity via the pseudocapacitive effect. In some embodiments, functionalization alters the features, capabilities, or properties of a material by changing its surface chemistry and morphology. Functionalization synthesizes several forms of surface nanostructures such as nanospheres, nanodiscs, nanowire, nanofibers, nanotubes, nanoplates, and nanoflowers. Among these, nanotube structures with small diameters allow for better accommodation of volume changes, and direct one-dimensional electronic pathway from a substrate, to allow for efficient electron transport and, therefore, provide an increased electrical conductivity and capacity. Furthermore, the combined electrolyte-exposed nanotube external and internal surface areas enable high charge storage capacities, and provide strain relief by increasing the free space available for surface flexing. This approach addresses the stability issues of silicon anodes in lithium ion batteries, which exhibit large volume changes during cycling.

Figure 1B:
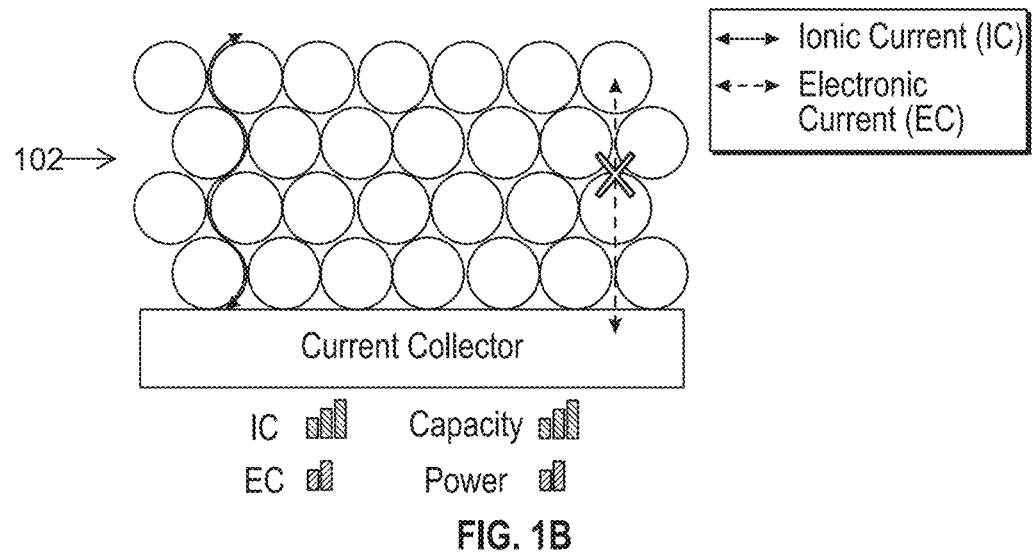
FIG. 1B illustratively depicts electron and ion transfer pathways in a nanosphere morphology of polyaniline (PANI), in accordance with some embodiments.
Figure 1C:
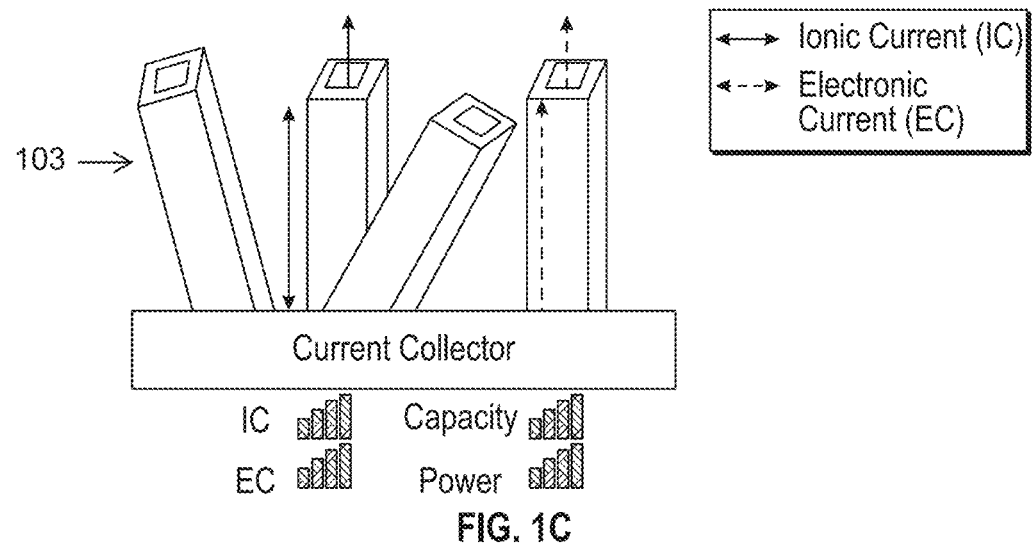
FIG. 1C illustratively depicts electron and ion transfer pathways in a nanotube morphology of polyaniline, in accordance with some embodiments.

In designing supercapacitor electrodes, special efforts may be made to provide a high energy density and high power density, including the optimization of the preparation conditions to facilitate ionic and electronic transport within the electrodes, as illustrated in FIGS. 1A-C. As such, the design of high-performance hybrid supercapacitors requires high-energy-high-power hybrid supercapacitor electrodes.

FIGS. 1A-C schematically illustrate high-energy-high-power hybrid supercapacitor electrode designs, with nanofiber 101, nanosphere, 102 and nanotube morphologies 103, respectively, whereas the electrode with a nanotube morphology of PANI schematically displayed in FIG. 1C is capable of improved facilitation of both the ionic current 102 (IC) and the electronic current (EC), and thus may be capable of forming a supercapacitor with a high energy and a high power.

In some embodiments, electrodes with nanostructured morphologies exhibit an increased performance, whereas per FIGS. 1A-C, the porous structure of these electrodes increases the exposure area between the active material and the electrolyte, and thus increase the discharge area compared to a solid electrode surface. Particularly, electrodes with nanotube morphologies allow for increased charge storage capacity because both the external and internal surfaces of a nanotube are exposed to an electrolyte.

Substrates

In some embodiments, carbon cloth (CC) is used as a cell substrate. In some embodiments carbon cloth comprises a woven assembly of multiple carbon fibers. In some embodiments, carbon fiber and graphite fiber are fibers composed mostly of carbon atoms. Additionally, the good electrical conductivity and flexibility of carbon cloth enables devices with low internal resistance (by providing short pathways for electron transport) and mechanical flexibility.

In some embodiments, CC is an excellent three-dimensional conductive skeleton that supports a high electrolytic-accessible surface area, provides a direct path for electron transfer, improves conductivity of its composites, and relieves the degradation accompanied by volume changes during cycling. Further, CC acts as an ideal substrate for flexible energy storage system because of its mechanical flexibility, porous structure, high electrical conductivity, short electron transport pathway, low internal resistance, high areal loading, and its ability to be easily packaged.

In some embodiments, the chemical activation of carbon cloth is enhanced through hybridization, by synthesizing conductive polymer nanostructures on the surface of the electrode. In some embodiments, the chemical and electrochemical properties of carbon cloth are modified to enhance the properties of its composite hybrid, whereas the chemical activation of CC, via the addition of functional groups onto the surface, enhances the charge storage capacity via the pseudocapacitive effect. Additionally, the functional groups on the surface of the functionalized carbon cloth allow for a stronger connection to the PANI, thus facilitating the passage of electrons from the polymer to the substrate. In some embodiments, chemical activation of a CC aids in situ polymerization by converting its naturally hydrophobic surface into a hydrophilic surface capable of increased interaction with a, typically aqueous, polymerization or monomer feed solution. In some embodiments, the in situ polymerization of a conductive polymer ensures direct electrical contact with CC, thus eliminating the need for, and the extra weight of, binders and conductive additives.

Figure 6A:
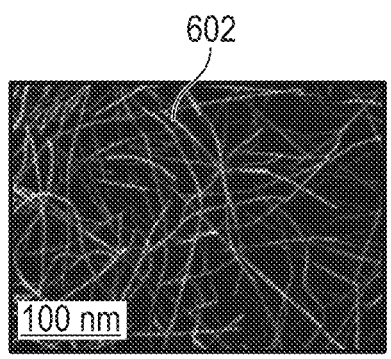
FIG. 6A displays an exemplary FESEM image of the surface structure of a CC, in accordance with some embodiments.
Figure 6B:
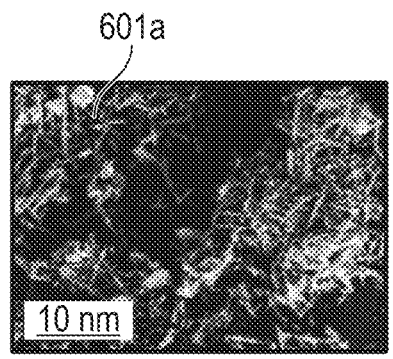
FIG. 6B displays an exemplary FESEM image of a 16-hour polymerized PANI-CC in high magnification, in accordance with some embodiments.
Figure 6C:
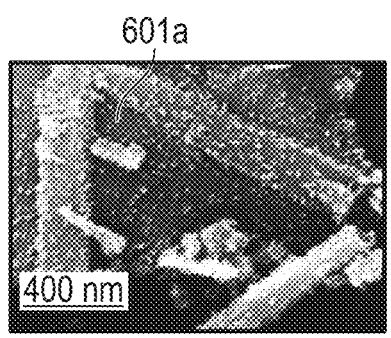
FIG. 6C displays an exemplary FESEM image of a 16-hour polymerized PANI-CC in low magnification, in accordance with some embodiments.

An exemplary image of the surface structure of a CC 602 displays, per FIG. 6A, a morphology comprising fibrous structures. The optimal 3D structure of CC enables high areal loading of PANI, which is an important parameter for commercially viable electrodes.

In some embodiments, carbon cloth has a crystalline density of about 1.6 g/cm$^3$.

Electrolytes

The energy storage devices described herein may comprise an electrolyte. Electrolytes herein may include, for example but not limited to, aqueous, organic, and ionic liquid-based electrolytes, which may be in the form of a liquid, solid, or a gel. In some embodiments, an electrolyte is a solution with a uniform dispersion of cations and anions formed from an electrically conductive solute dissolved in a polar solvent.

Although electrolytes are neutral in charge, applying an electrical potential (voltage) to the solution draws the cations of the solution to the electrode with an abundance of electrons, and the anions to the electrode with an electron deficit. As such, the movement of anions and cations in opposite directions within the solution forms an energy current. Electrolytes described herein may comprise, for example, aqueous, organic, and/or ionic liquid-based electrolytes. The electrolyte may be a liquid, a solid, or a gel. An ionic liquid may be hybridized with another solid component such as, for example, polymer or silica (e.g., fumed silica), to form a gel-like electrolyte (also "ionogel" herein). An aqueous electrolyte may be hybridized with, for example, a polymer, to form a gel-like electrolyte (also "hydrogel" and "hydrogel-polymer" herein). In some cases, a hydrogel electrolyte solidifies during device fabrication, which binds the cell's components together to improve the mechanical and electrical properties of an electrode. An organic electrolyte may be hybridized with, for example, a polymer, to form a gel-like electrolyte. In some embodiments, the electrolyte may also include a lithium salt (e.g., $LiPF_6$, $LiBF_4$, or $LiClO_4$). For example, the electrolyte may include a lithium salt (e.g., $LiPF_6$, $LiBF_4$, or $LiClO_4$) in an organic solution (e.g., ethylene carbonate (EC), dimethyl carbonate (DMC), or diethyl carbonate (DEC). The electrolyte may comprise one or more additional components (e.g., one or more additives) to form an electrolyte composition. In one example, a soft pack polymer LIB electrolyte comprises one or more of EC, ethyl methyl carbonate (EMC), DEC, $LiPF_6$, and other additives. In another example, a high capacity LIB electrolyte may comprise one or more of EC, DEC, propylene carbonate (PC), $LiPF_6$, and other additives.

Quinone electrolyte additives have been employed for their ability to store 2 $e^-$/2 $H^+$ per quinone unit to enhance capacities in double-layer supercapacitors. During charge and discharge operations, quinone additives undergo redox processes at the electrodes. In some embodiments, quinone electrolytes are particularly excellent redox-active electrolytes because of their excellent electrochemical reversibility during charge and discharge, small size, high mobility, and an acidic pH compatible with the current family of acid-doped polymers.

Supercapacitor Device Design

In some embodiments, energy storage devices with ultra-high energy densities are designed by selecting an electrode material in combination with an electrolyte to attain synergistic interactions among the device's components. Faradaic energy storage materials in current three-electrode devices require aqueous electrolytes for their operation which are limited to about 1.0 V due to the decomposition of water at 1.23 V. Although symmetric devices exhibit a max theoretical voltage window of 1.0 V, asymmetric devices attain the voltage window of aqueous electrolytes by extending their operating voltage beyond the thermodynamic decomposition voltage of water.

In some embodiments, a supercapacitor device that comprises PANI, which is capable of being converted between multiple redox states, as an electrochemically active material and a 1,4-naphthoquinone (NQ) redox couple electrolyte, forms a tunable double redox shuttle, whereas NQ provides pseudocapacitance through direct redox reactions on the electrode surfaces, catalyzes the regeneration of the oxidized form of PANI, and operates as a redox shuttle for the reversible oxidation/reduction of polyaniline, to considerably enhance the overall performance of the device.

The 3D nature of polyaniline rectangular tubes supported on a functionalized carbon cloth offers efficient electron and ion transport pathways and provides sufficient space for the addition of NQ, thus forming a second redox system, and thus a tunable redox shuttle in the electrolyte that enhances electron-transfer processes on the surface of the electrode. Further, the addition of NQ not only increases the capacitance of polyaniline electrodes, but also improves the capacitance of EDLC supercapacitor materials, such as activated carbons.

As such, the use of NQ, through an electrocatalytic mechanism as a redox additive, enables multiple charge transfer processes, provides Faradaic capacitance with direct redox reactions on the electrode surfaces, serves as the basis for a regenerative pathway towards long-term utilization of the electrode active materials, and enables a supercapacitor device with a much higher energy density. In some embodiments, NQ has a crystalline density of about 1.4 g/cm$^3$.

Figure 2:
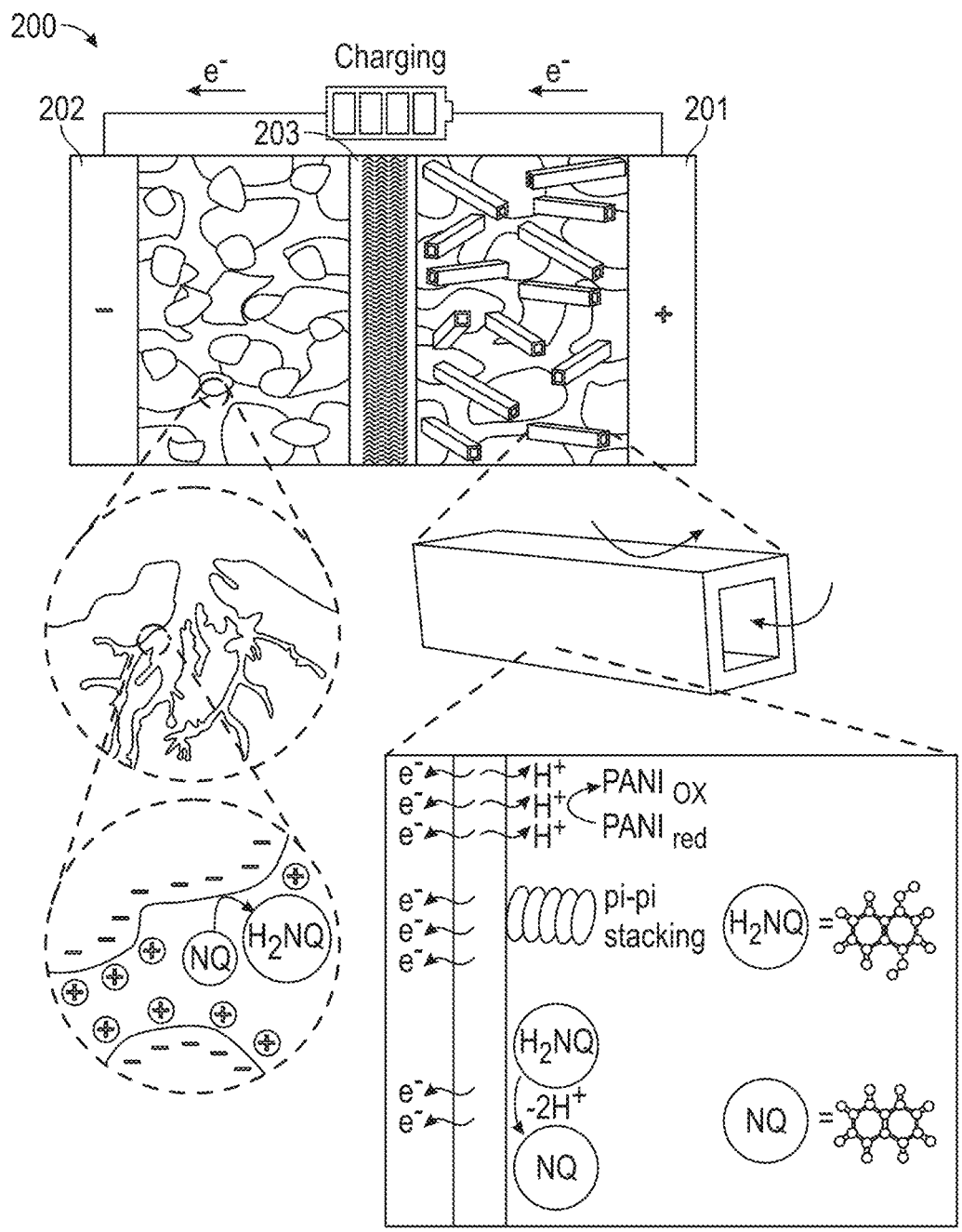
FIG. 2 illustratively depicts an exemplary asymmetric device, in accordance with some embodiments.

FIG. 2 shows the composition of an exemplary supercapacitor 200, whereas the positive electrode 201 and the negative electrode 202 are separated by an ion-and-molecule-permeable membrane 203 that is soaked in an NQ electrolyte comprising sulfuric acid ($H_2SO_4$) and acetic acid (AcOH).

In some embodiments, the NQ comprises a polyvinyl alcohol (PVA) gel electrolyte in 1 M $H_2SO_4$ with 30% acetic acid (AcOH). In some embodiments a polyvinyl alcohol (PVA) gel electrolyte is formed by dissolving 1 g of PVA in 10 mL of deionized water and AcOH, vigorously stirring for 30 minutes, adding a 0.56 mL stoke of $H_2SO_4$ and adding 1.53 mg of NQ.

Figure 4:
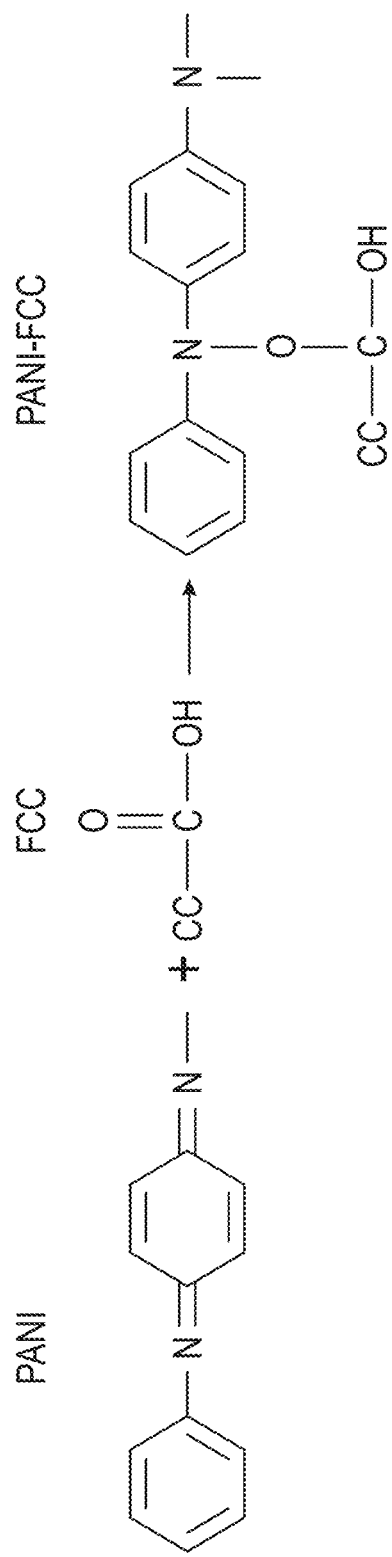
FIG. 4 illustratively depicts an example of the bonds that change through the connection between PANI and functionalized carbon cloth (FCC), in accordance with some embodiments.

The NQ-promoted regeneration of polyaniline (PANI), which is capable of being reused in multiple redox reactions, plays an important role in a supercapacitor device. FIG. 4 displays the chemical process of converting a functionalized carbon cloth into a PANI functionalized carbon cloth, wherein per FIG. 2 and the equations below, $PANI_{ox}$ is electrochemically reduced to $PANI_{red}$ on the electrode surface, and NQ in the electrolyte oxidizes back the reduced form of the PANI via an EC' regenerative mechanism that may then re-undergo electron transfer reactions on the surface.

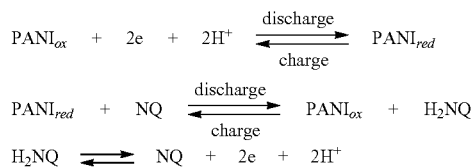

As such, the Faradaic capacitance of the device increases considerably due to the multiple reuse of the appropriate form (depending on the charge and discharge process) of polyaniline as a starting electroactive material. In addition to its electrocatalytic regenerative mechanism, NQ may undergo redox reactions on the substrate's surfaces. The combinatorial effect of NQ as both a tunable redox shuttle and a redox additive increases the performance of the supercapacitor, since energy is stored both on the polyaniline surfaces using a pseudo-capacitive mechanism and in the electrode-electrolyte interface via the redox reaction. There are several advantages as a result of the electrocatalytic reaction, which provides in situ regeneration of the electrode active materials. First, since Q=mnF, regeneration of the starting active materials increases the value of m, thus providing an additional charge in the cell. Additionally, because catalytic regeneration of the active material attains a higher current without increasing the initial mass of the active materials, reducing the mass of inactive components increases the specific energy and capacitance. Further, because additional mass is not required to increase capacitance, the system's equivalent series resistance (ESR) remains low. Moreover, because the regenerated active materials are firmly immobilized on the substrate surfaces, the ESR of the system does not increase. Also, since current is a function of the surface concentration of the active material ($C_{AM}$), the electrocatalytic regeneration of the electrode active material via an EC' mechanism remarkably increases the $C_{AM}$. Finally, the electrocatalytic reaction eliminates the requirement to diffuse the electroactive materials from the bulk of the solution to the electrode surface.

Methods of Fabricating Electrodes

Figure 3:
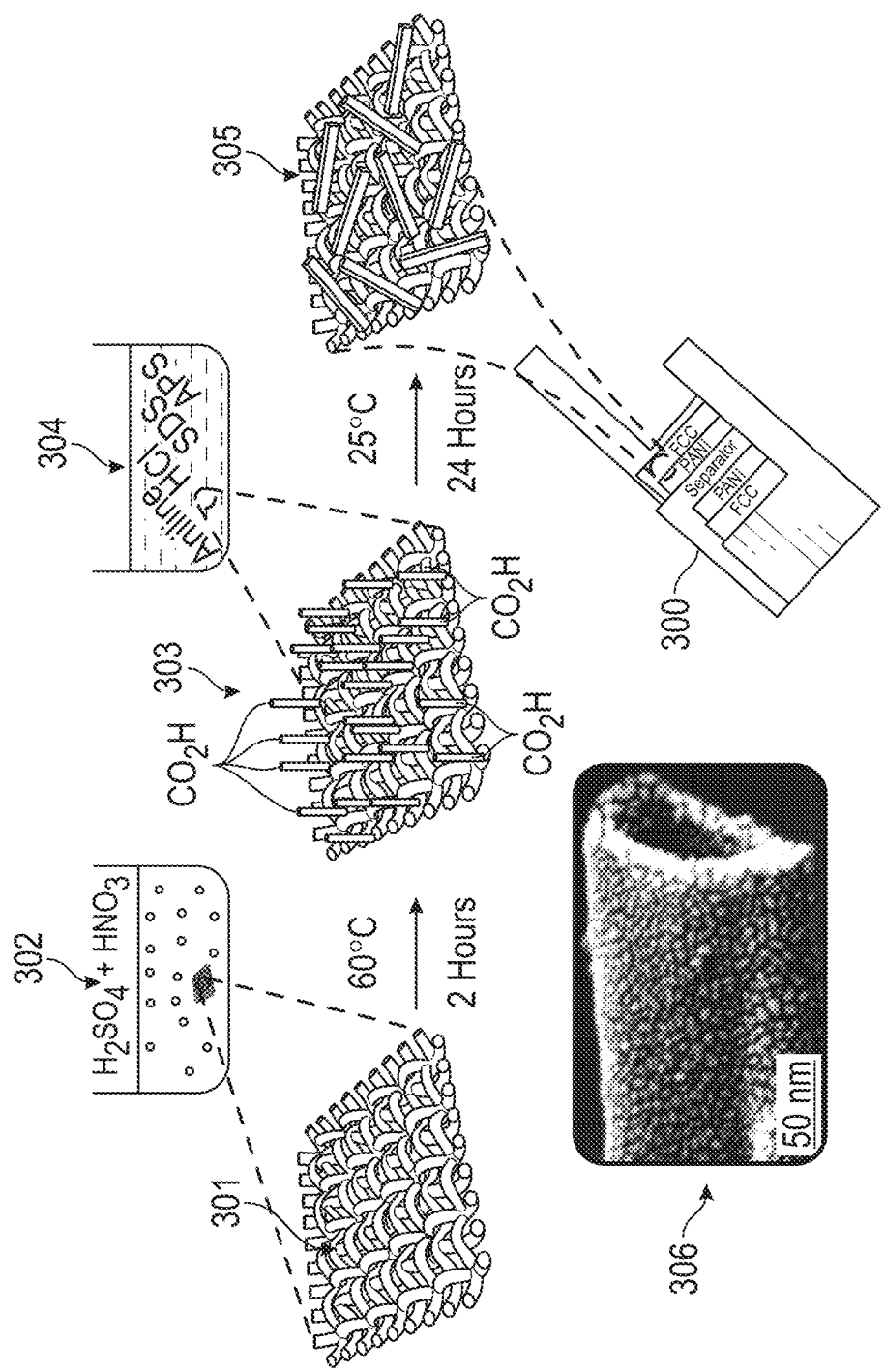
FIG. 3 illustratively depicts an exemplary process of functionalizing carbon cloth, in accordance with some embodiments.

An exemplary process of fabricating a supercapacitor device 300 comprising fabricating a polyaniline functionalized electrode and packaging the electrode is shown in FIG. 3.

In exemplary embodiments, a method of fabricating a polyaniline functionalized electrode 305 comprises functionalizing a carbon substrate 301 to form a functionalized carbon substrate 303, preparing the functionalized carbon substrate 303, formulating a polymerization fluid 304, and synthesizing a polyaniline nanotube 306 on the functionalized carbon substrate.

In exemplary embodiments, the step of functionalizing a carbon substrate 301 to form a functionalized carbon substrate 303 comprises forming a functionalization solution 302, heating the functionalization solution 302, cooling the functionalization solution 302, displacing a piece of the carbon substrate 301 into the functionalization solution 302, and rinsing a piece of functionalized carbon substrate 303.

In an exemplary embodiment, the functionalization solution 302 comprises nitric acid ($HNO_3$) and sulfuric acid ($H_2SO_4$), wherein the volumetric percentage of nitric acid in the functionalization solution 302 is about 15% to about 60%. In an example, the functionalization solution 302 comprises a volumetric percentage of nitric acid of about 33%.

In an exemplary embodiment, the functionalization solution 302 is heated at a suitable temperature, such as, at about 30° C. to about 120° C. In an example, the functionalization solution 302 is heated at a temperature of about 60° C. In an exemplary embodiment, the carbon substrate 301 is immersed in the functionalization solution 302 for a suitable period of time, such as, about 60 minutes to about 240 minutes. In an example, carbon substrate 301 is immersed in the functionalization solution 302 for a period of time of about 120 minutes.

In exemplary embodiments, the step of preparing the functionalized carbon substrate 303 comprises cutting a piece of the functionalized carbon substrate 303, submerging the piece of functionalized carbon substrate 303 in a polymerization fluid 304, sonicating the piece of functionalized carbon substrate 303 in the polymerization fluid 304, and drying the piece of functionalized carbon substrate 303.

In an exemplary embodiment, the functionalized carbon substrate 303 has a suitable geometric surface area, such as about 0.1 cm$^2$ to about 0.5 cm$^2$. In an example, the functionalized carbon substrate 303 has a suitable geometric surface area of about 0.25 cm$^2$.

In some embodiments, the polyaniline functionalized carbon substrate 305 is then annealed in a furnace, in an air atmosphere, at 200° C. In an exemplary embodiment, the polyaniline functionalized carbon substrate 305 is annealed for a suitable period of time of about 0.5 hours to about 14 hours. In an example, the polyaniline functionalized carbon substrate 305 is annealed for a period of time of about 4 hours.

In an exemplary embodiment, the polymerization fluid 304 comprises acetone and ethanol. In an exemplary embodiment, the polymerization fluid 304 comprises a suitable volume percentage of acetone, such as, about 25% to about 100%. In an example, the volumetric percentage of acetone in the polymerization fluid 304 is about 50%.

In an exemplary embodiment, the functionalized carbon substrate 303 is sonicated for a suitable period of time, such as, about 15 minutes to about 60 minutes. In an example, the functionalized carbon substrate 303 is sonicated for a period of time of about 30 minutes.

In an exemplary embodiment, the functionalized carbon substrate 303 is dried at a suitable temperature, such as, at about 20° C. to about 120° C. In an example, functionalized carbon substrate 303 is dried at a temperature of about 60° C.

In an exemplary embodiment, the functionalized carbon substrate 303 is dried for a suitable period of time of about 3 hours to about 12 hours. In an example, the functionalized carbon substrate 303 is dried for a period of time of about 6 hours.

In exemplary embodiments, the step of formulating a polymerization fluid 304 comprises mixing polyaniline, an acid, a detergent, water, and an oxidizing agent; and stirring the polymerization solution 304. In an exemplary embodiment, the acid comprises hydrochloric acid (HCl), the detergent comprises sodium dodecyl sulfate (SDS), and the oxidizing agent comprises ammonium persulfate (APS).

In an exemplary embodiment, the polymerization fluid 304 comprises a suitable mass of polyaniline of about 20 mg to about 90 mg. In an example, the mass of polyaniline in the polymerization fluid 304 is about 45 mg.

In an exemplary embodiment, the polymerization fluid 304 comprises a suitable concentration of hydrochloric acid (HCl) of about 0.1 M to about 0.5 M. In an example, the concentration of HCl in the polymerization fluid 304 is about 0.25 M. In an exemplary embodiment, the polymerization fluid 304 comprises a suitable volume of HCl of about 0.1 ml to about 0.6 ml. In an example, the volume of HCl in the polymerization fluid 304 is about 0.3 ml.

In an exemplary embodiment, the polymerization fluid 304 comprises a suitable mass of SDS of about 1 mg to about 10 mg. In an example, the concentration of SDS in the polymerization fluid 304 is about 5 mg.

In some embodiments the water comprises deionized water. In an exemplary embodiment, the polymerization fluid 304 comprises a suitable volume of water of about 9 ml to about 40 ml. In an example, the volume of water in the polymerization fluid 304 is about 18 ml.

In an exemplary embodiment, the polymerization fluid 304 comprises a suitable concentration of APS of about 0.1 M to about 0.5 M. In an example, the concentration of APS in the polymerization fluid 304 is about 0.24 M. In an exemplary embodiment, the polymerization fluid 304 comprises a suitable volume of APS of about 1 ml to about 4 ml. In an example, the concentration of APS in the polymerization fluid 304 is about 2 ml.

In an exemplary embodiment, the polymerization fluid 304 is stirred for a suitable amount of time of about 10 minutes to about 40 minutes. In an example, the polymerization fluid 304 may be stirred for a period of about 20 minutes.

In exemplary embodiments, the step of synthesizing a polyaniline nanotube 306 on the functionalized carbon substrate 303 comprises agitating the polymerization fluid 304, immersing the functionalized carbon substrate 303 in the polymerization fluid 304, storing the functionalized carbon substrate 303 in the polymerization fluid 304, removing a polyaniline functionalized carbon substrate 305 from the polymerization fluid 304, washing the polyaniline functionalized carbon substrate 305, and drying the polyaniline functionalized carbon substrate 305.

In an exemplary embodiment, the polymerization fluid 304 is agitated for a suitable amount of time of about 15 seconds to about 60 seconds. In an example, the polymerization fluid 304 may be agitated for a period of about 30 seconds.

In an exemplary embodiment, the functionalized carbon substrate 303 is stored in the polymerization fluid 304 at a suitable temperature of about 10° C. to about 50° C. In an example, the functionalized carbon substrate 303 is stored in the polymerization fluid 304 at a temperature of about 25° C.

In an exemplary embodiment, the functionalized carbon substrate 303 is stored in the polymerization fluid 304 for a suitable polymerization time of about 8 hours to 70 hours. In an example, the functionalized carbon substrate 303 is stored in the polymerization fluid 304 for a polymerization time of about 24 hours.

In an exemplary embodiment, the polyaniline functionalized carbon substrate 305 is dried at a suitable temperature of about 30° C. to about 120° C. In an example, the polyaniline functionalized carbon substrate 305 is dried at a temperature of about 60° C.

In some embodiments, the polyaniline functionalized carbon substrate 305 is used directly as SC electrodes without the need for binders or conductive additives typically used in conventional devices.

Finally, in an exemplary embodiment, the polyaniline functionalized carbon substrate 305 is packaged into a symmetric supercapacitor device 300 whereas a separator, soaked in an electrolyte, is sandwiched between the PANI faces of two polyaniline functionalized carbon substrates 305.

The PANI functionalized cloths as electrodes, along with a stainless steel current collector and an electrolyte form symmetric (PANI-FCC//PANI-FCC or PANI-CC//PANI-CC) and asymmetric (PANI-FCC//AC) supercapacitor devices.

Characterization and Measurements

The structure and morphology of the different electrode materials may be examined using field-emission scanning electron microscopy (Philips and JEOL-JSM-6700). The structural changes before and after functionalization of CC in the strong acid mixture may be characterized using an x-ray powder diffraction (Philips X'pert diffractometer with Co Kα radiation [λ=0.178 nanometers] generated at 40 kV and 40 mA with a step size of $0.02° \text{ s}^{-1}$). A spectrophotometer (Tensor 27 Bruker) may be used for performing Fourier transform infrared (FTIR) spectroscopy.

The exemplary devices are tested for their electrochemical performance using cyclic voltammetry (CV), galvanostatic charge-discharge (CD) curves, and electrochemical impedance spectroscopy (EIS) experiments. A Biologic potentiostat (SP-300) may be used to acquire cyclic voltammetry and electrochemical impedance spectroscopy data for the different devices. A battery tester (Solartron) equipped with a Cell Test software may be used for the galvanostatic CD studies.

In some embodiments, the processes described herein employ a magnetic stirrer, which comprises a laboratory device, whereas an emitted rotating magnetic field quickly spins a magnetized stir bar immersed in a liquid for quick, consistent mixing.

All the chemicals used herein are used directly as purchased, without further purification. Aniline is distilled by water steam before use.

Effect of SDS on Surface Morphology and Performance

In some embodiments, the anionic surfactant, sodium dodecyl sulfate (SDS), plays an important role as a soft template in doping, in the polymerization process upon the morphology of the synthesized PANI, and with the electrochemical properties and capacitance of the device. The SDS doping of the PANI structure generates a belt-like structure, the rolling up of which takes place subsequently, wherein further polymerization results in the formation of PANI with a rectangular-tube morphology. In some embodiments, the low concentration of HCl triggers PANI polymerization in the medium with low acidity, which slows the reaction processes and may allow for the formation of nanostructures.

Figure 5A:
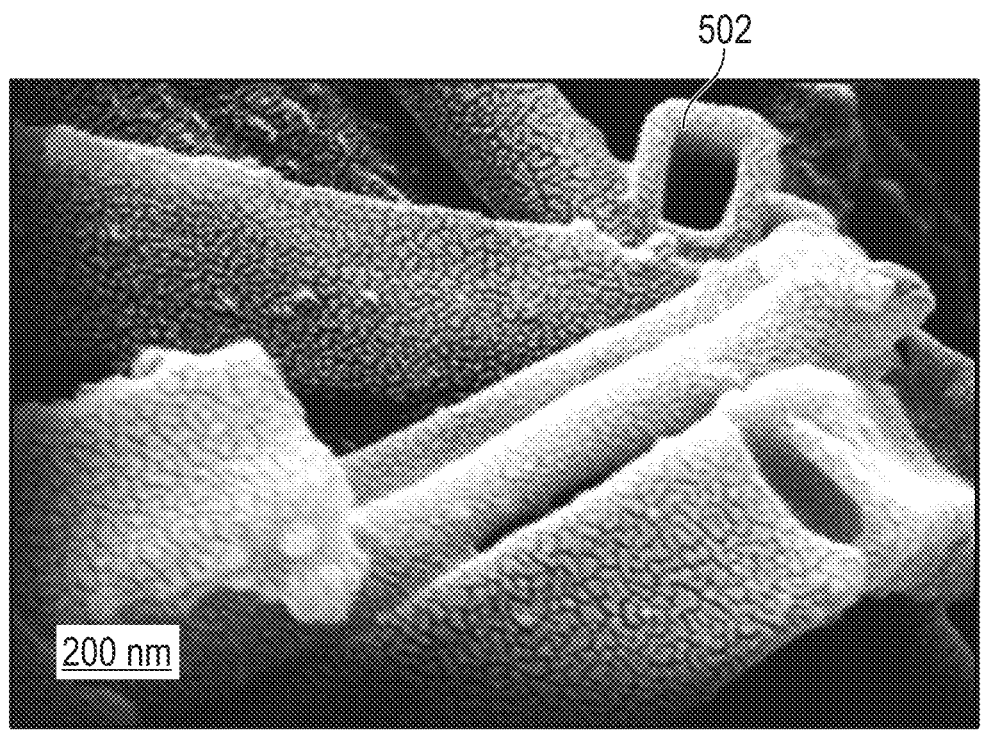
FIG. 5A displays exemplary field emission scanning electron microscope (FESEM) images of PANI synthesized on carbon cloth (CC) in the presence of sodium dodecyl sulfate (SDS), in accordance with some embodiments.
Figure 5B:
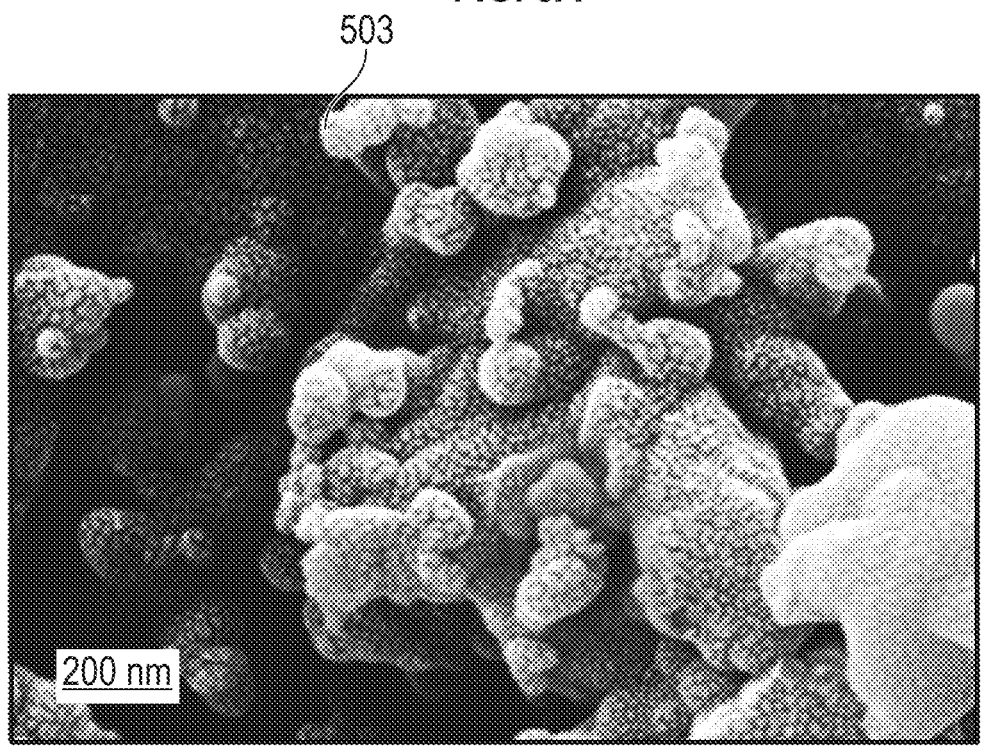
FIG. 5B displays exemplary FESEM images of PANI synthesized on CC in the presence of SDS, in accordance with some embodiments.

In an example, FIG. 5A shows that the morphology of PANI synthesized on a CC in the presence of SDS, is formed of rectangular nanotubes 502 with PANI nanoparticles on their surfaces, wherein FIG. 5B shows that the morphology of PANI synthesized on the CC in the absence of SDS is comprised of irregular bulky nodules 503. Therefore, the PANI produced in the presence of SDS has rectangular shape with nanostructures on its surface.

In an exemplary embodiment, the length of a rectangular nanotube 502 synthesized on a CC in the presence of SDS is about 1 micrometers to 200 micrometers. In an example, the length of a rectangular nanotube 502 synthesized on a CC in the presence of SDS is about 1 micrometers.

In an exemplary embodiment, the outer diameter of a rectangular nanotube 502 synthesized on a CC in the presence of SDS is about 100 nanometers to 1,000 nanometers. In an example, the outer width of a rectangular nanotube 502 synthesized on a CC in the presence of SDS is about 350 nanometers.

In an exemplary embodiment, the inner diameter of a rectangular nanotube 502 synthesized on a CC in the presence of SDS is about 50 nanometers to 800 nanometers. In an example, the inner width of a rectangular nanotube 502 synthesized on a CC in the presence of SDS is about 250 nanometers.

In an exemplary embodiment, a nanostructure on the surface of a rectangular nanotube 502 synthesized on a CC in the presence of SDS is a nanorod. In an exemplary embodiment, the nanorod on the surface of the rectangular nanotube 502 has a length of about 4 micrometers to 50 micrometers. In an example, the nanorod on the surface of the rectangular nanotube 502 has a length of about 9 micrometers.

In an exemplary embodiment, the nanorod on the surface of a rectangular nanotube 502 synthesized on a CC in the presence of SDS has a width of about 20 nanometers to 120 nanometers. In an example, the nanorod on the surface of a rectangular nanotube 502 synthesized on a CC in the presence of SDS has a width of about 50 nanometers.

Figure 7:
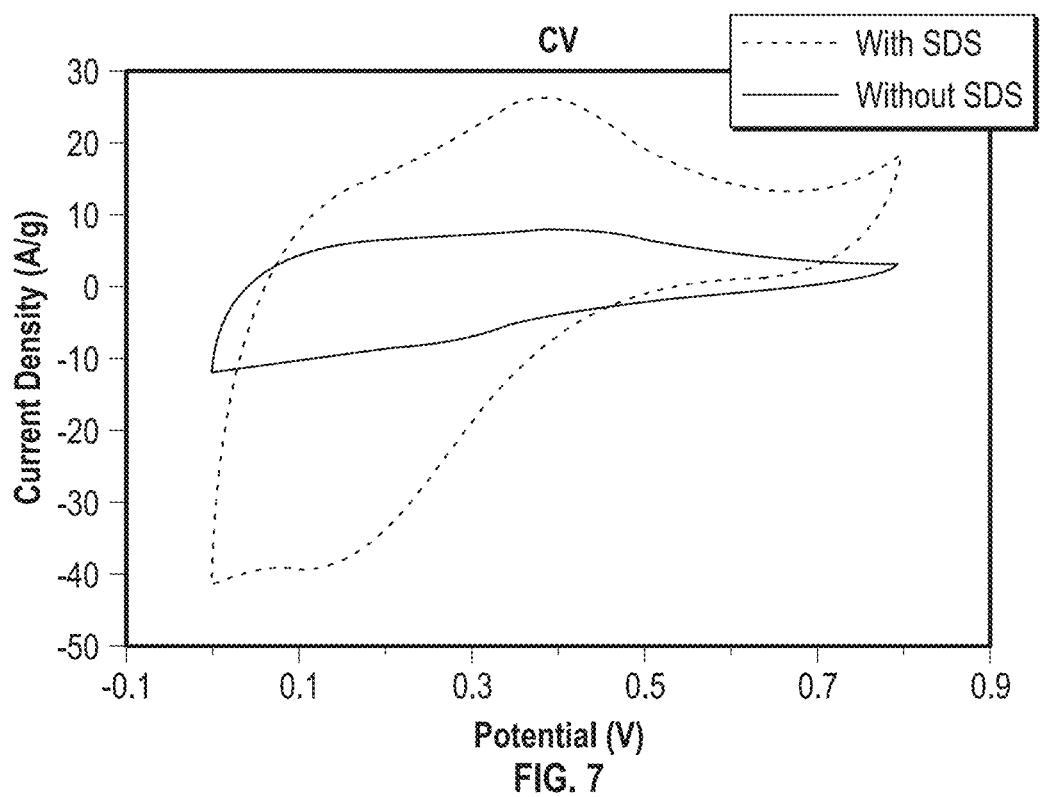
FIG. 7 displays exemplary cyclic voltammetry (CV) graphs of exemplary CC and PANI-CC devices, in accordance with some embodiments.
Figure 8:
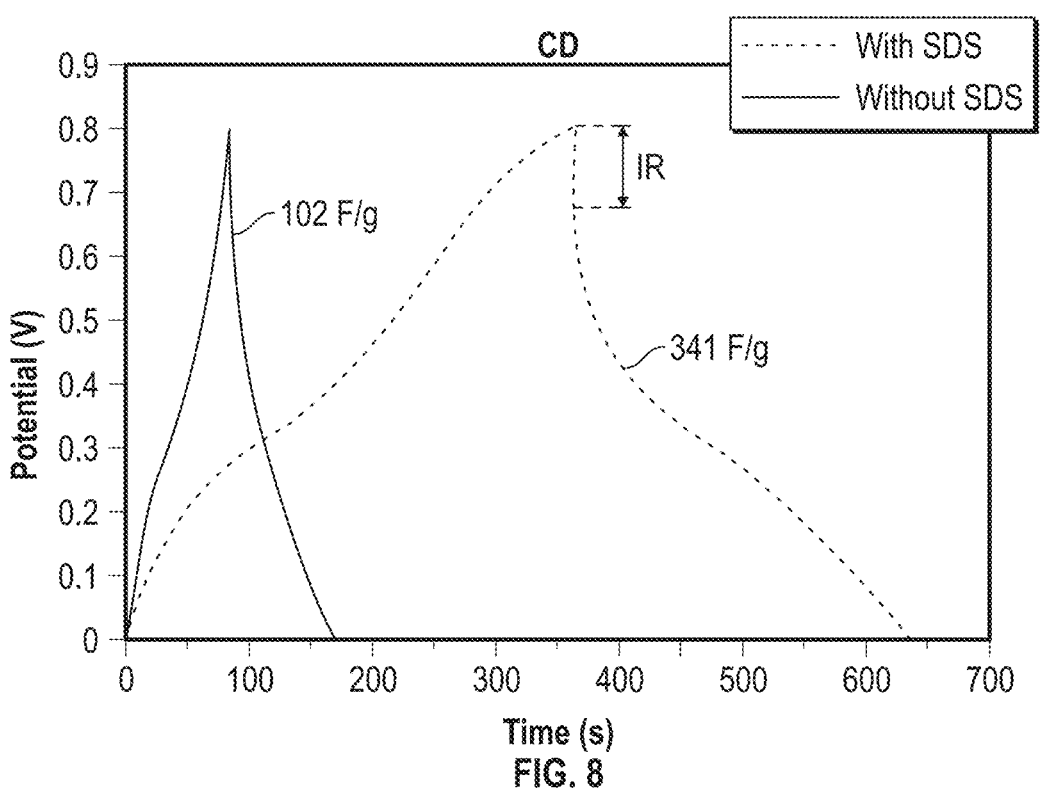
FIG. 8 displays exemplary galvanostatic charge-discharge curves of an exemplary symmetric PANI-CC device, in accordance with some embodiments.

The regular hollow nanotube morphology increases electron transfer in the PANI structure synthesized in the presence of SDS. The rectangular hollow nanotube morphology of the synthesized PANI, and the nanoparticle morphology on its surface, enhances the electrochemical performance of an electrode. Per the cyclic voltammograms of the exemplary CC and PANI-CC devices in FIG. 7, the redox peaks at 0.4 V and at 0.2 V represent the reduction and oxidation, respectively, of PANI. The CV curve of PANI-CC displays its pseudocapacitive behavior and confirms the electric double-layer capacitance (EDLC) of CC in the exemplary device, and shows that the pseudocapacitance caused by PANI is dominant. The exemplary CD curves show two plateaus in the CD steps which correspond with the redox peaks of PANI in the exemplary CV curves. It is seen that the exemplary device, containing PANI synthesized in the presence SDS, exhibits a higher capacitance and rate capability per the areas under the exemplary CV curves, and the discharge times in FIGS. 7 and 8, respectively. As such, a PANI-FCC exhibits a significantly high charge/discharge current density and displays obvious redox peaks that are assigned to the redox additive.

Effect of Polymerization Time on Surface Morphology and Performance

Examples of surface morphologies exhibited by PANI synthesized on CC over different polymerization times (16, 20, 24, 28, and 32 hours) are shown in FIGS. 6A-H. A 16-hour polymerized PANI-CC 601a, per FIG. 6C in low magnification, displays a morphology of hollow rectangularly cross-sectioned PANI nanotubes on the surface of a CC, with outer diameters of about 200-500 nanometers, inner diameters of about 100-400 nm, and lengths of several micrometers. Additionally, the 16-hour polymerized PANI-CC 601a, per FIG. 6B in high magnification, displays a morphology of nanorods disorderly aligned in hierarchical structures on the surfaces of the PANI nanotubes, whose lengths and diameters range from about 100-200 nanometers and about 40-60 nanometers, respectively.

Figure 6D:
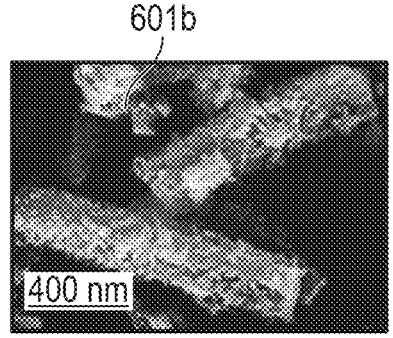
FIG. 6D displays an exemplary FESEM image of a 20-hour polymerized PANI-CC, in accordance with some embodiments.

An image of an exemplary 20-hour polymerized PANI-CC 601b, as shown in FIG. 6D, exhibits a morphology of larger nanotubes, whose surfaces contain a greater size and quantity of nanorods.

Figure 6E:
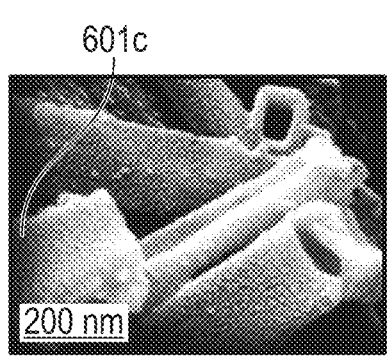
FIG. 6E displays an exemplary FESEM image of a 24-hour polymerized PANI-CC in low magnification, in accordance with some embodiments.
Figure 6F:
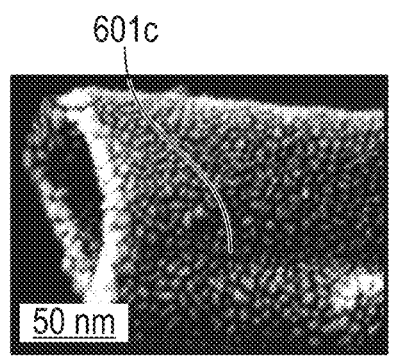
FIG. 6F displays an exemplary FESEM image of a 24-hour polymerized PANI-CC in high magnification, in accordance with some embodiments.

An image of an exemplary 24-hour polymerized PANI-CC 601c, as shown in FIGS. 6E and 6F at low and high magnifications, respectively, exhibits a morphology of poriferous nanotubes, whose surfaces contain a uniform array of nanostructures that are 8-10 nanometers in size.

Figure 6G:
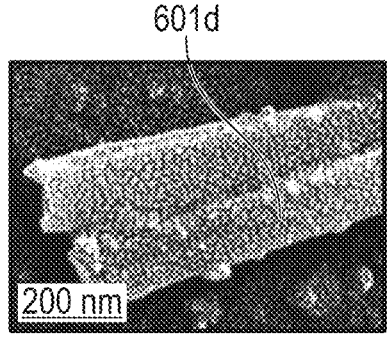
FIG. 6G displays an exemplary FESEM image of a 28-hour polymerized PANI-CC, in accordance with some embodiments.
Figure 6H:
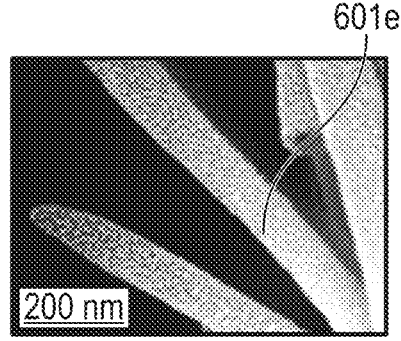
FIG. 6H displays an exemplary FESEM image of a 32-hour polymerized PANI-CC, in accordance with some embodiments.

An image of an exemplary 28-hour polymerized PANI-CC 601d and a 32-hour polymerized PANI-CC 601e, per FIGS. 6G and 6H, respectively, display that as the polymerization time increases, the nanostructures on the rectangular tubes may aggregate as they grow.

Figure 9:
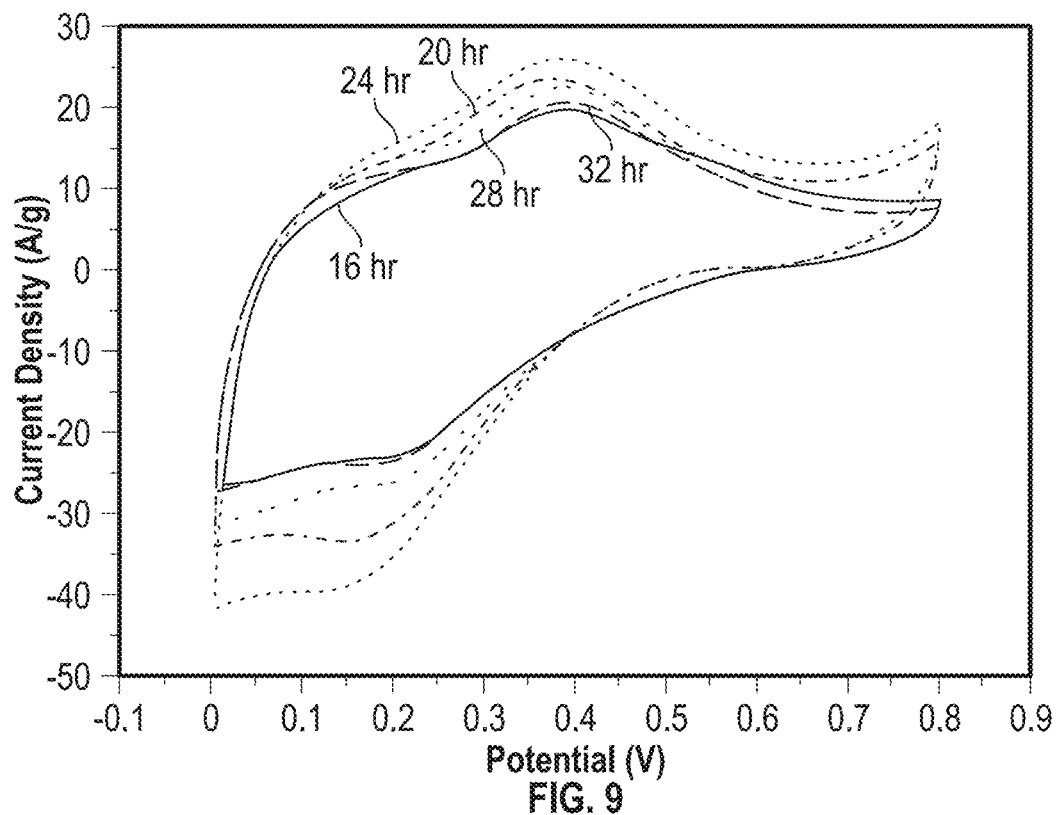
FIG. 9 displays exemplary CV curves of exemplary PANI-CC symmetric devices with different polymerization times, in accordance with some embodiments.
Figure 10:
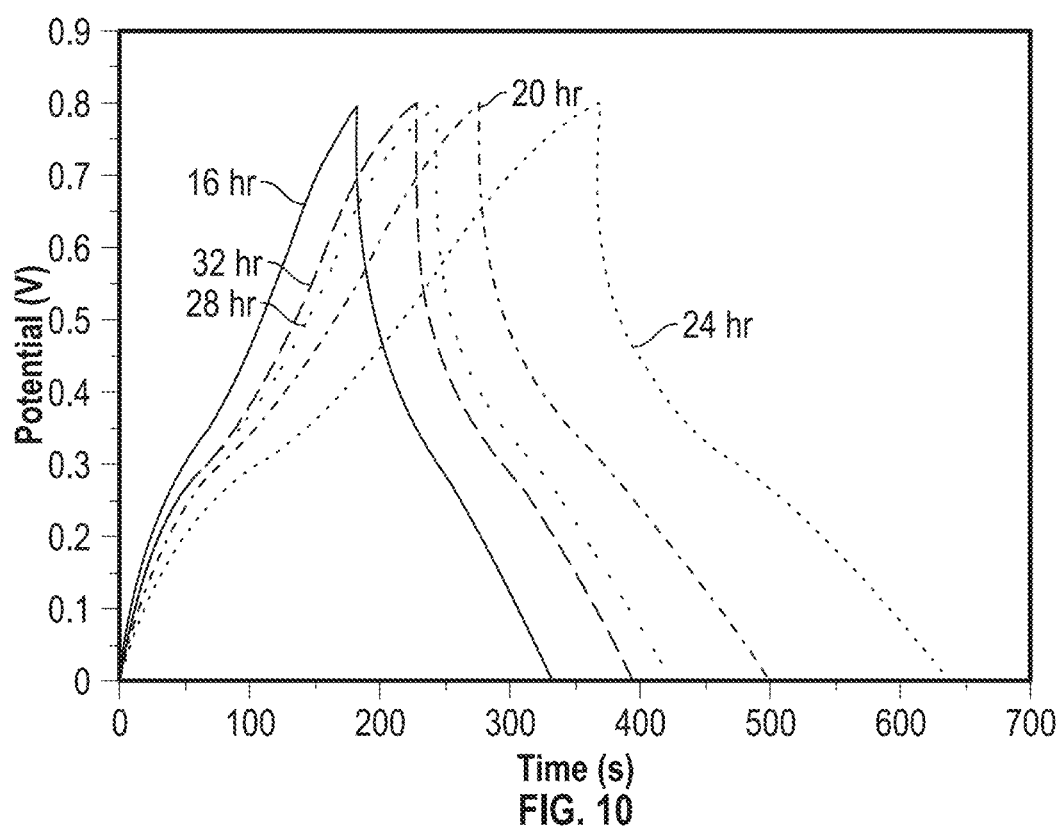
FIG. 10 displays exemplary galvanostatic charge-discharge curves of exemplary PANI-CC symmetric devices with different polymerization times, in accordance with some embodiments.

FIGS. 9 and 10 display example CV and CD curves for the 16, 20, 24, 28, and 32-hour polymerized PANI-CCs in a symmetric PANI-CC device, whereas the exemplary device comprising two 24-hour polymerized PANI-CCs exhibits the highest capacitance, of about 341 F/g, and the greatest discharge time.

The increased capacitance of an exemplary device comprising a 24-hour polymerized PANI-CC may be due to the fact that its rough surface, with multiple smaller nanostructures whose diameters are between 8 nanometers and 10 nanometers, exhibits a greater surface area and a reduced diffusion length.

Functionalization Characterization

Figure 11:
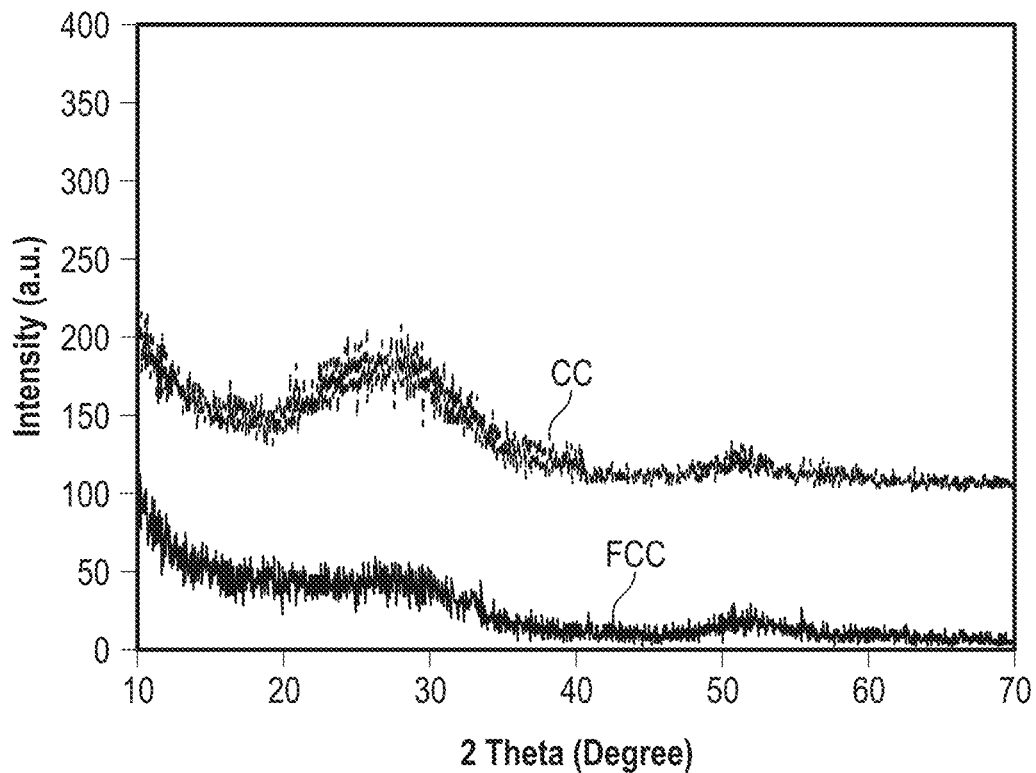
FIG. 11 displays exemplary powder x-ray diffraction (XRD) patterns of exemplary carbon cloth and functionalized carbon cloth, in accordance with some embodiments.

Exemplary XRD patterns for CC and FCC are displayed in FIG. 11, whereas XRD patterns of pristine CC exhibit two main characteristic diffraction peaks at 20° to 35° and 50° to 55° that are attributed to the (002) and (101) planes of the hexagonal CC structure. It is seen that CC's broad intensity peaks at 20° to 35° C. may greatly reduce due to the destruction of the CC's ordered crystalline structure, and due to the increased bond strength between C=N and COO— groups as their double bond is converted to a single bond during the functionalization process. The initial broad peak may be related to the —OH group of carboxylic acid functional group on the FCC, and the peak shift between the CC and the FCC may be explained by the stretching vibrations of C=C in the quinonoid and benzenoid rings, and the interaction of positive PANI C—N band with the negative carboxylic acid.

Figure 12:
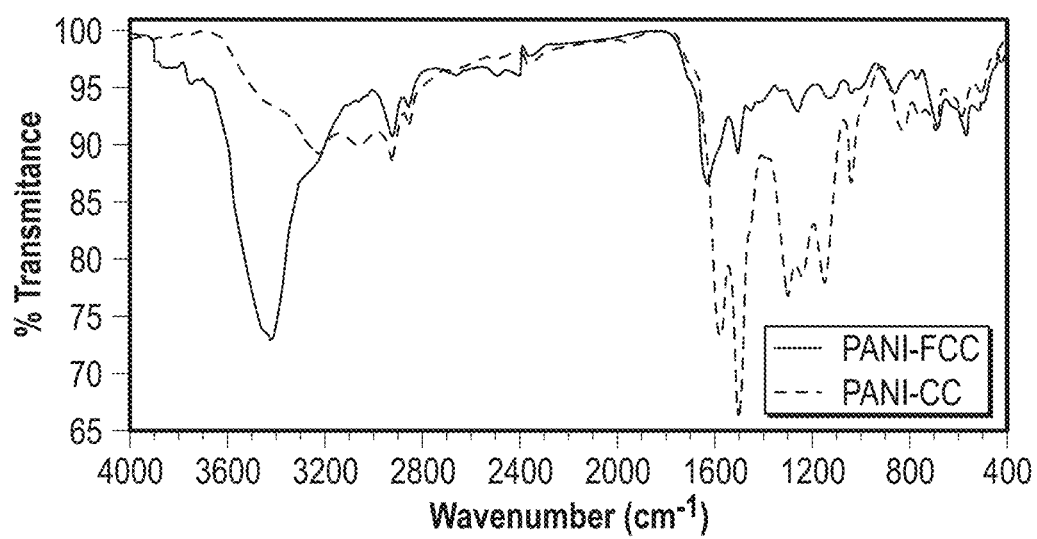
FIG. 12 displays exemplary Fourier transform infrared (FTIR) spectroscopy spectrum measurements of exemplary PANI-FCC and PANI-CC electrodes, in accordance with some embodiments.

Per FIG. 12, an example of Fourier transform infrared (FTIR) spectrums of CC and PANI-FCC displays a strong and uniform connection between PANI and FCC, and thus provides evidence for a decreased equivalent series resistance and an increased conductance. As shown, after activation of an exemplary CC, a broad peak appears between the range of 3,300 cm$^{-1}$ to 3,650 cm$^{-1}$, which may indicate the presence of exchangeable protons, typically from carboxylic acid, alcohol, and amine functional groups, on the FCC. The characteristic peaks of PANI may be modified by functionalizing the CC, whereas the bonds at 1,576 cm$^{-1}$ and 1,503 cm$^{-1}$ corresponding to the stretching vibrations of C=C in the quinonoid and benzenoid rings, respectively, shifted slightly to 1,580 cm$^{-1}$ and 1,507 cm$^{-1}$. Additionally, the peak at 1,301 cm$^{-1}$, associated with C—N stretching vibrations, experienced a large shift to 1,261 cm$^{-1}$ revealing a strong interaction of the positive PANI C—N band with the negative carboxylic acid. Finally, the band at 1,240 cm$^{-1}$, associated with C—N stretching vibrations of the exemplary device completely disappeared, which may indicate the formation of a covalent connection between the C=N and the COO— groups. Thus, FT-IR spectroscopy provides strong evidence for excellent connections between PANI and the FCC, and a decreased ESR, and thus an increased device conductance, which enables good power density at high rate charge-discharges, and improves the cycle life of a supercapacitor device.

Calculations

Capacitance is the ability of a body to store an electrical charge. Although any object may be electrically charged and exhibit capacitance, a body with a large capacitance holds more electric charge at a given voltage, than a body with a low capacitance. In some embodiments, capacitance is measured in Farads per gram (F/g).

The specific capacitance of the devices may be calculated through CD measurements using the following equation where $C_{sp}$ is the specific capacitance, I is the discharge current density (A), $\Delta t$ is the discharge duration (s), m is the mass loading (g), and $\Delta V$ is the potential range (V).

$$C_{sp} = \frac{I \Delta t}{m \Delta V}$$

The specific capacitance of a device with a non-linear CD curve, may be calculated using the following equation where $C_{sp}$ is the specific capacitance, I is the discharge current density (A), $\Delta t$ is the discharge duration (s), and V is the potential range (V).

$$C_{sp} = \frac{2I \int V dt}{V^2}$$

To achieve the highest working potential range, the mass ratio of the negative electrode to the positive electrode is determined according to the charge balance theory ($q^+ = q^-$).

The voltammetric charges (Q) may be calculated based on the following equations where $C_{single}$ is the specific capacitance (F/g) of each electrode measured in a three-electrode setup (calculated from cyclic voltammograms at a scan rate of 10 mV s-1), $\Delta V$ is the potential window (V), and m is the mass of the electrode (g).

$$Q = C_{single} \times \Delta V \times m$$

To maintain a charge balance between the two electrodes, the mass ratio between the positive (m+) and negative (m−) electrodes needs to follow:

$$\frac{m_+}{m_-} = \frac{c_- \times \Delta V_-}{c_+ \times \Delta V_+}$$

Energy density (ED) may be derived from the galvanostatic discharge curves using the following equation where Csp is specific capacitance (F/g), and $\Delta V$ is the potential range (V).

$$ED = \frac{C_{sp} \Delta V^2}{2}$$

The power density of the electrode is calculated from the following equation where ED is the energy density in Wh/kg, and $\Delta t$ is the discharge time.

$$PD = \frac{ED}{\Delta t}$$

Areal capacitance is the capacitance of a body per unit area. In some embodiments, areal capacitance is measured in Farads per cubic centimeter (F/cm$^2$)

Current density is the electric current per cross section area, defined as a vector whose magnitude is the electric current per cross-sectional area at a given point in space. In some embodiments, current density is measured in Amps per gram (A/g).

Energy density is a measure of the amount of energy that is stored per unit mass. In some embodiments, energy density is measured in Watt hours per kilogram (Wh/kg).

Power density is a measure of the amount of power that is stored per unit mass. In some embodiments, power density is measured in kilowatts per kilogram (kW/kg).

Device Performance Characteristics

Electrochemical performance characteristics of an exemplary PANI-FCC device are shown in FIGS. 13A-H. As seen per the CV graph in FIG. 13A, pristine CC exhibits a small rectangular curve with a very low capacitance. The FCC displays a rectangular CV shape, with a higher EDLC charge storage capability, possibly due to the fact that functionalizing the carbon cloth increases its wettability, and thus facilitates the adsorption and desorption of charge. Additionally, the exemplary PANI-FCC device exhibits a more rectangularly shaped CV, and thus a higher capacitive performance, than the CV curve of the exemplary PANI-CC device, per FIG. 13C. This performance improvement is most likely related to the exemplary PANI-FCC's increased charge storage in its double-layer mechanism, the wettability of the FCC, and the absorption and desorption of charge. Additionally, it is clear that the redox peaks of the PANI that are responsible for the pseudocapacitance of the device are covered by a capacitive portion resulting from FCC, and that the redox peaks of PANI, which are responsible for the pseudocapacitance of the device, are considerably diminished by the electrical double-layer capacitance of the FCC.

Figure 13A:
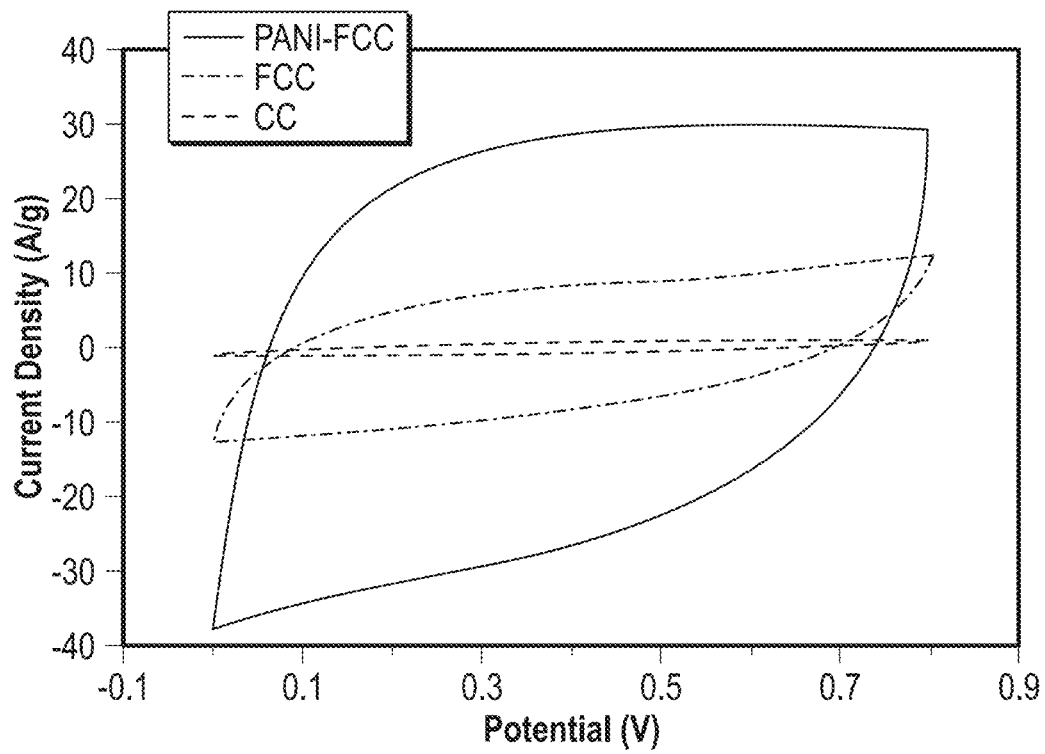
FIG. 13A displays exemplary CV curves of an exemplary PANI-FCC symmetric supercapacitor at a scan rate of 100 mV/s, in accordance with some embodiments.
Figure 13B:
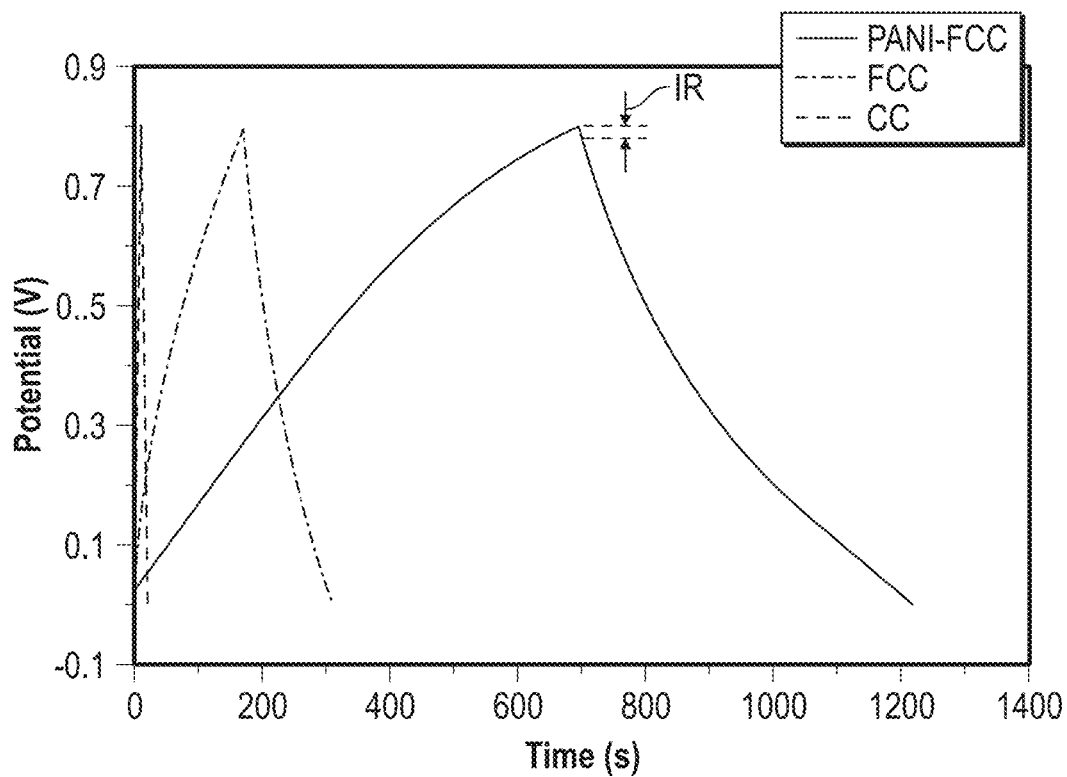
FIG. 13B displays exemplary charge-discharge (CD) curves of an exemplary PANI-FCC symmetric supercapacitor at a current density of 1 A/g, in accordance with some embodiments.

As seen in FIG. 13B, an exemplary PANI-FCC device exhibits a more symmetrically shaped CD curve, and thus a higher capacitive performance, than the PANI-CC, whose CD curve is shown in FIG. 13A. Additionally, FIG. 13B displays that the infrared (IR) drop in the discharge step of the exemplary PANI-FCC device is much smaller than the infrared (IR) drop in the discharge step of the exemplary FCC and CC devices, most likely due to the increased wettability of the carbon substrate and the stronger connection between the PANI and the FCC. As functionalization of the CC may form some carboxylic acid groups with a negative charge, an electrostatic interaction may occur between the carboxylic acid groups and the anilinium ions while the FCC is immersed in the polymerization fluid. Thus, the connection between PANI and the FCC is stronger than the connection between the PANI and the CC, and more PANI is precipitated on FCC. This improvement in the capacity is most likely due to the increased interaction between PANIs and the functional groups present on the FCC substrate.

Considering the peak current densities, per FIG. 13A, and the exemplary capacitance values in FIG. 13B, the capacitance exhibited by the exemplary PANI-FCC device is about 667 F/g at a 1 A/g current density, whereas the capacitance of the exemplary PANI-CC device is about 341 F/g under the same condition. As acid treatment of the CC imposes negatively charged carboxylic group functionalities on the CC's surfaces, the immersion of the FCC into the polymerization fluid may create an electrostatic interaction between the carboxylic acid groups and the positively charged anilinium ions, which may lead to a stronger conjugation product. As such, the improvement in supercapacitive performance of the exemplary PANI-FCC device may be due to the combined effects of the better interaction between PANI and the functional groups present on the FCC substrate (i.e. the faster electron exchange between PANI and FCC), as well as the redox activity of the functional groups themselves.

Figure 13C:
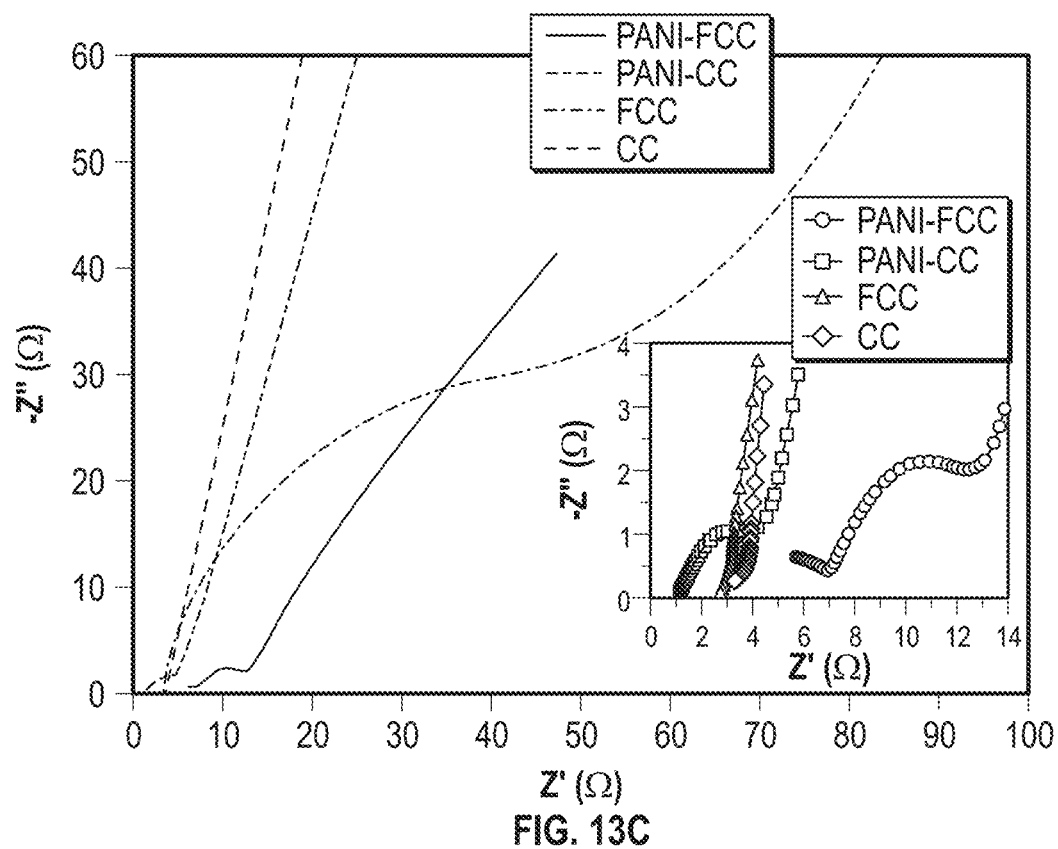
FIG. 13C displays an exemplary Nyquist plot of CC, FCC, PANI-CC and PANI-FCC, in accordance with some embodiments.
Figure 13D:
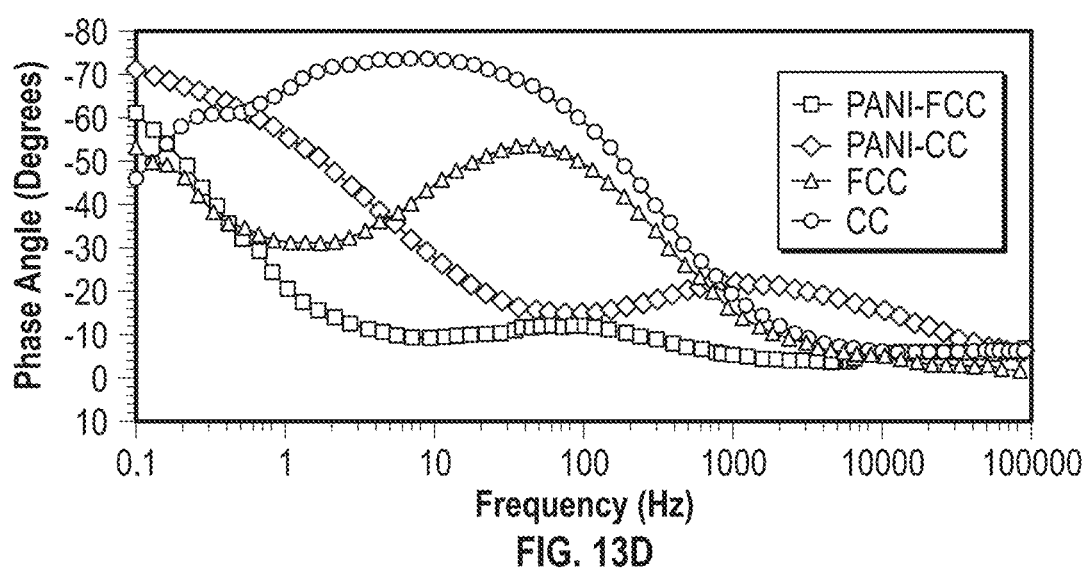
FIG. 13D displays an exemplary Bode plot of CC, FCC, PANI-CC and PANI-FCC, in accordance with some embodiments.

Nyquist and Bode plots are shown in FIGS. 13C and 13D, respectively, for exemplary CC, FCC, PANI-CC, and PANI-FCC devices operated under an open circuit potential. Per FIG. 13C, the exemplary PANI-FCC device displays a lower equivalent series resistance, as evaluated from the x-intercept, than the exemplary PANI-CC, which confirms the low IR drop measurements shown in FIG. 13B. The Bode plot, per FIG. 13D, of the exemplary PANI-CC device also displays a larger phase angle, confirming the lower device resistance, as observed in the Nyquist plot in FIG. 13C.

Figure 13E:
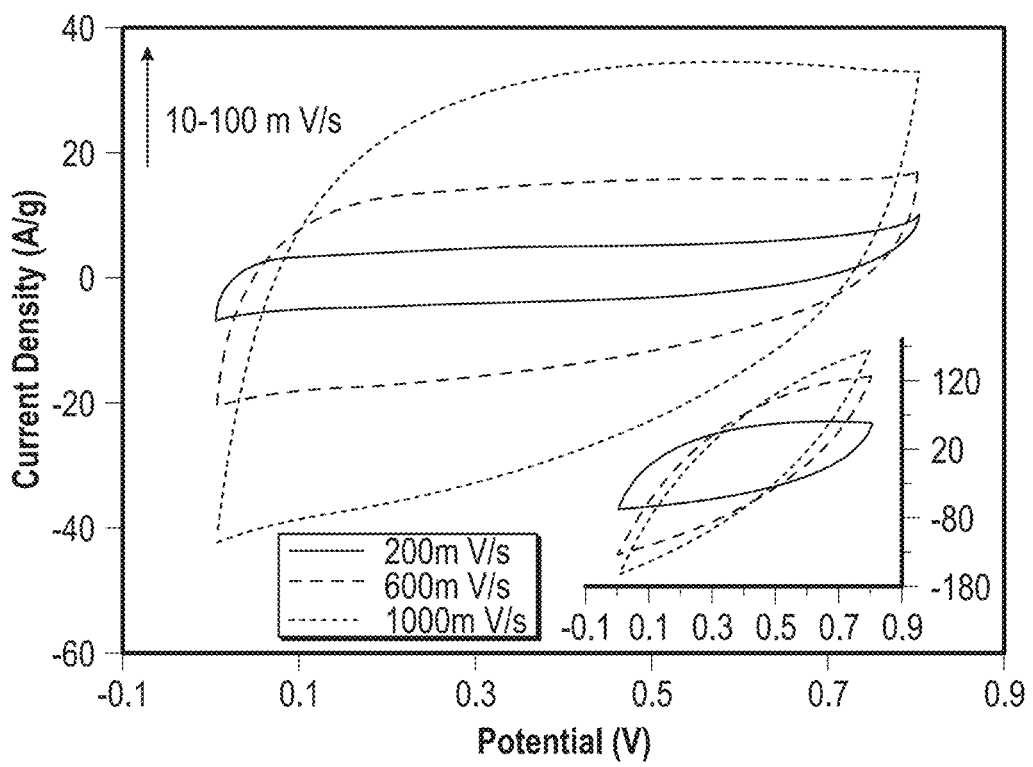
FIG. 13E displays exemplary CV curves of an exemplary PANI-FCC symmetric supercapacitor under scan rates from 20 mV/s to 1000 mV/s, in accordance with some embodiments.
Figure 13F:
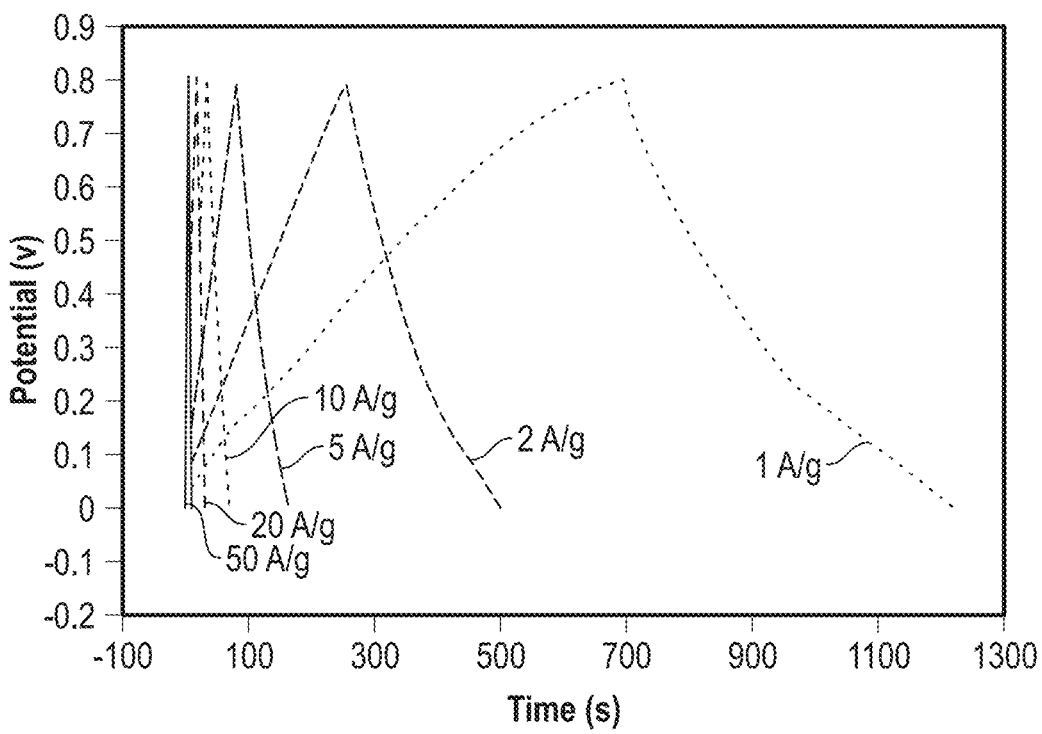
FIG. 13F displays exemplary CD profiles of an exemplary PANI-FCC symmetric supercapacitor at various current densities ranging from 1 to 50 A/g, in accordance with some embodiments.

Additionally, the scan rate measurements displayed in FIG. 13E from 10 mV/s to 1,000 mV/s, show that the exemplary PANI-FCC device retained a similar CV curve shape at a high scan rate of 200 mV/s, indicating a good rate capability, that is confirmed by the CD plots in FIG. 13F. The large pore volumes which may be filled with a redox active electrolyte allow for charge storage through both adsorption and redox capacitance. As expected, the electrolyte species readily inserted and de-inserted into and out of the electrode surfaces and throughout the pores of the exemplary PANI-FCC device at low scan rates, resulting in the expected rectangular response curve. As the scan rate increases, the interaction between the electrolyte species and the electrode surfaces is theoretically limited by kinetic and mass transport parameters.

In such a case, a large proportion of the substrate surfaces have little dynamic interaction with the electrolyte, possibly resulting in the non-rectangular and tilted CV curve. The similar CD example plots at different current densities (1-50 A/g), as shown in FIG. 13F serve as an additional indication of the exemplary device's good rate capability.

Figure 13G:
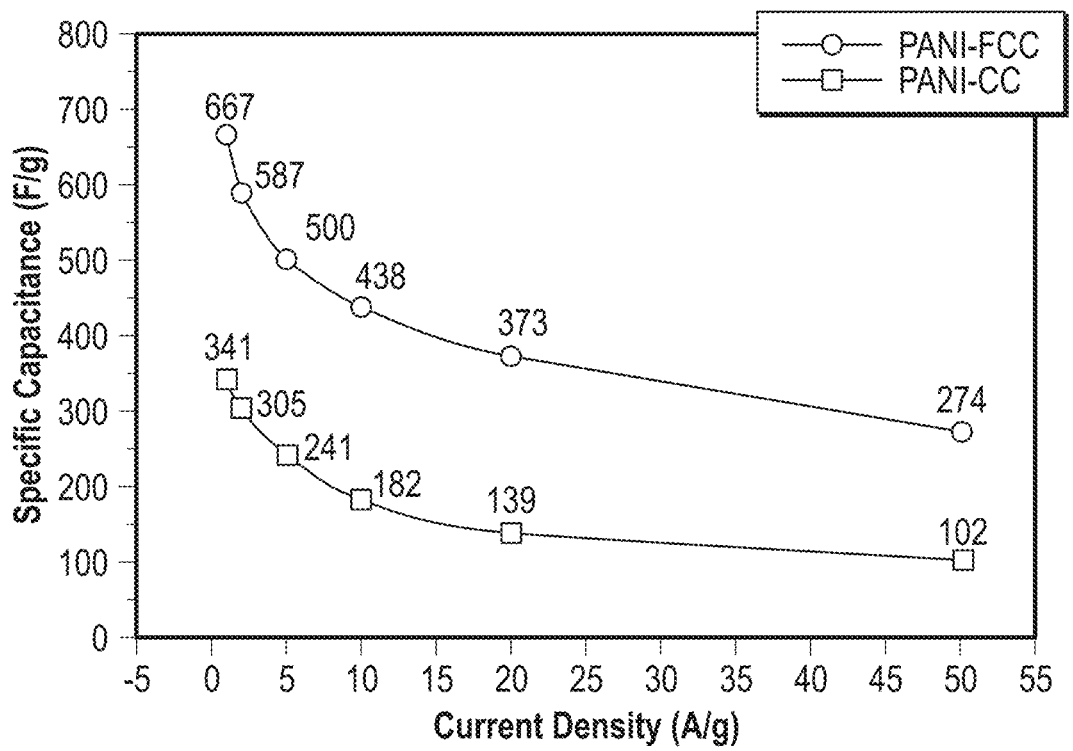
FIG. 13G displays exemplary calculated capacitances as a function of current density of exemplary PANI-FCC and PANI-CC devices, in accordance with some embodiments.
Figure 13H:
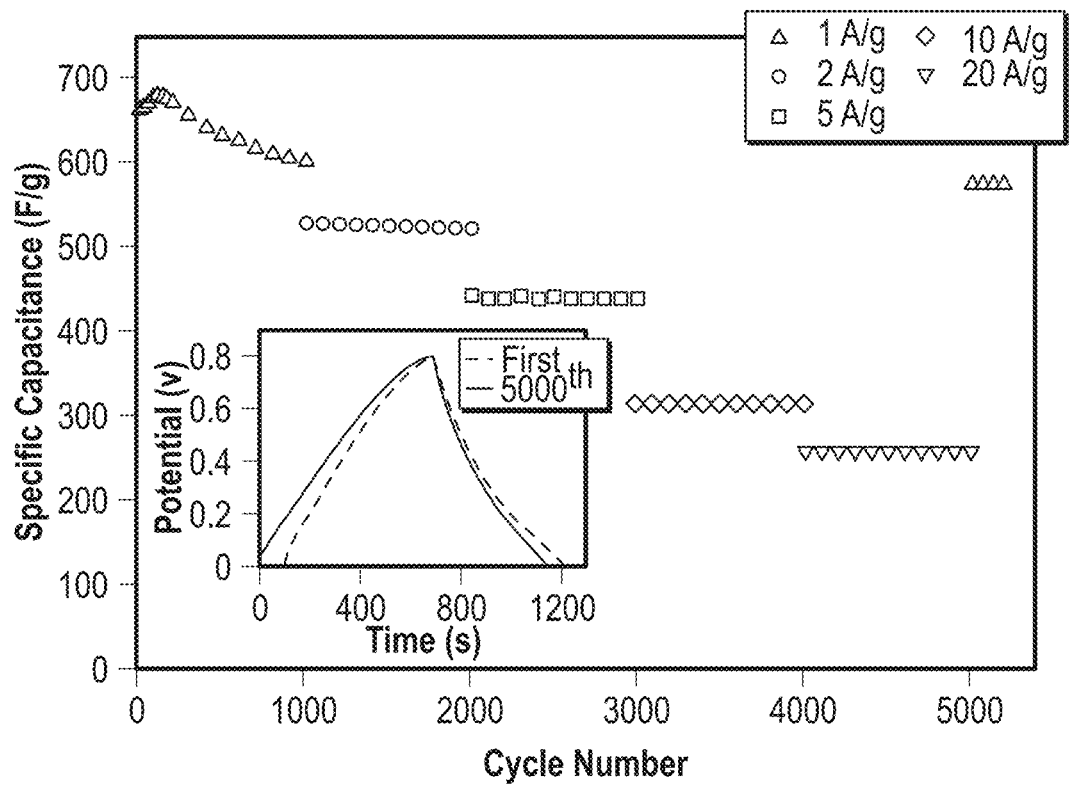
FIG. 13H displays the exemplary cyclability of an exemplary PANI-FCC device at current densities of 1 to 20 A/g-1 over 5000 cycles, in accordance with some embodiments.

The exemplary PANI-FCC device also maintained its electrochemical performance, even when operated at high CD rates. FIG. 13G shows the specific capacitances as a function of the current density of the exemplary PANI-FCC device, compared with the exemplary PANI-CC device. The rate capability of the exemplary symmetric device tested at different current densities from 1 to 50 A/g shows an excellent specific capacitance of 274 F/g at a current density of 50 A/g. The specific capacitance of the exemplary PANI-FCC device (upper curve) at 20 A/g and 50 A/g is as much as about 56% and about 41% of that at 1 A/g, respectively. These results demonstrate the good rate capability of the exemplary PANI-FCC device under high current densities, which is important for practical high rate SC applications.

The capacitance retention over the long-term charge/discharge cycles is indispensable for practical SC materials. The capacitance of the exemplary PANI-FCC device is measured during CD cycling at a range of current densities (1, 2, 5, 10, and 20 A/g) over 5,000 cycles, per FIG. 13H, whereas the capacitance of the exemplary device in a current density of 1 A/g increases during the first 200 cycles, and whereas the capacitance of the exemplary device decreases during the period from 1,000 to 5,000 cycles. After 200 cycles at a current density of 1 A/g, the specific capacitance of the exemplary device decreases, and at the end of the 1,000th cycle, the exemplary device provides about 91% of its initial specific capacitance of 667 F/g. Finally, the exemplary device exhibits a capacitance retention of about 87% over 5,000 cycles, indicating very good cyclability. The inset in FIG. 13H additionally displays the 1st and 5,000th cycles of the exemplary PANI-FCC electrode at 1 A/g.

Figure 14:
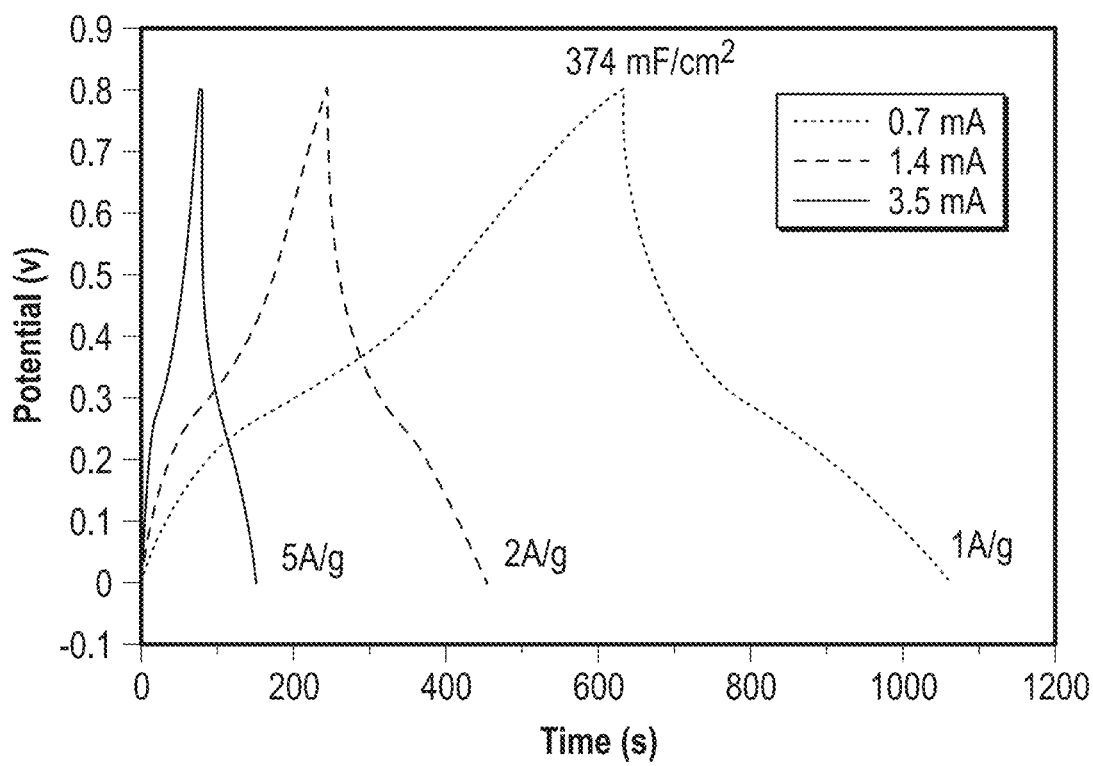
FIG. 14 displays exemplary CD curves of an exemplary PANI-FCC device at different currents, in accordance with some embodiments.

Per FIG. 14, examples of CD curves are shown for an exemplary PANI-FCC device in different currents to calculate its areal capacitance. The areal capacitance of exemplary stack is about 374 mF/cm$^2$ in 7 mA/cm$^2$ (equivalent to 1 A/g current).

Figure 15A:
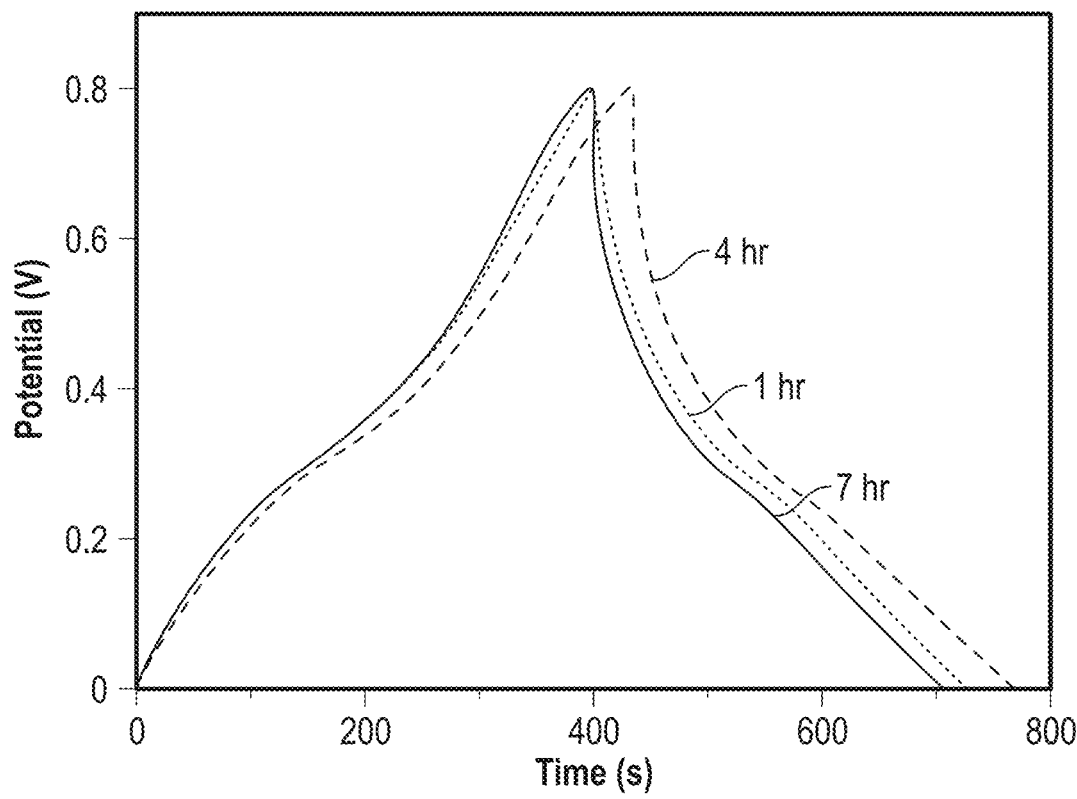
FIG. 15A displays exemplary CD curves of an exemplary carbon cloth.
Figure 15B:
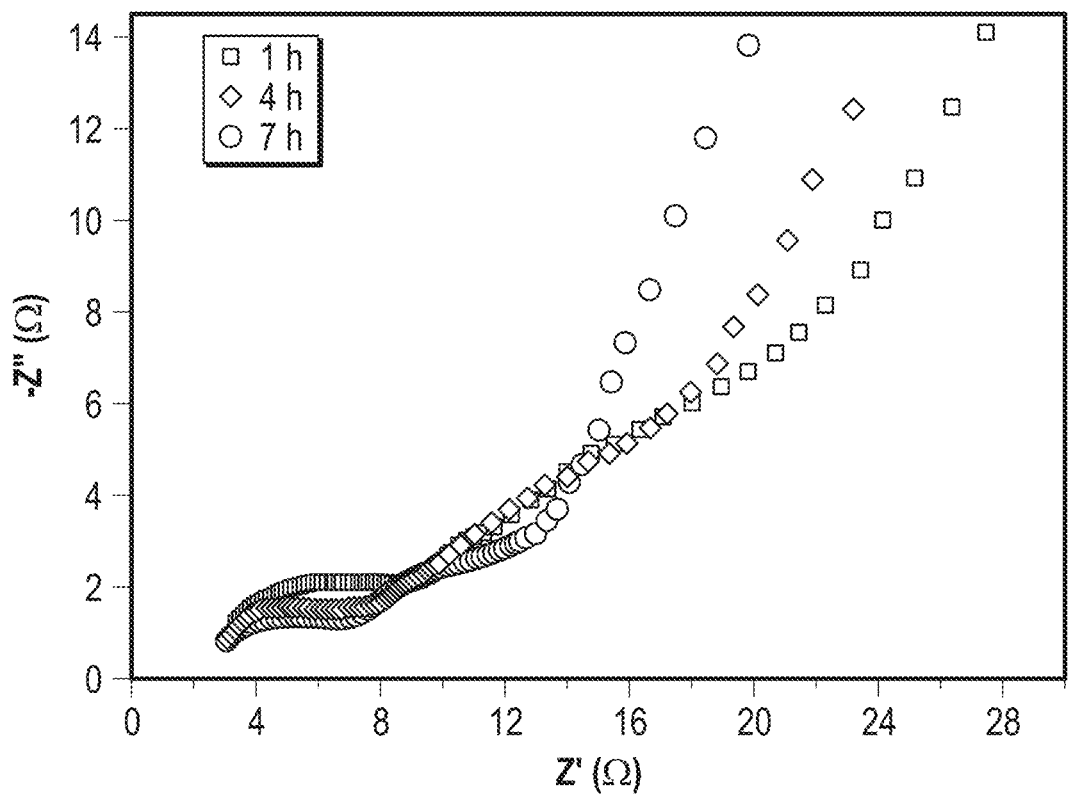
FIG. 15B displays exemplary Nyquist plots of a PANI-FCC electrodes of various annealing times.

After functionalization, an exemplary FCC is annealed in a furnace in an air atmosphere at 200° C. for 1 hour, 4 hours, or 7 hours, the exemplary PANI-(unannealed)FCC device displays a much higher discharge time than the exemplary PANI-(annealed)FCC device. As shown in FIG. 15A, increasing the annealing time increases the discharge time of the exemplary PANI-FCC device, without effecting its capacitance, most likely due to the fact that annealing reduces the number, and thus the pseudocapacitance, of the functional groups present on the CC. Additionally, FIG. 15B depicts that increasing the annealing time decreases the semicircle in the high frequency region, indicating a reduction the charge transfer resistance, most likely due to the fact that as the functional groups on the FCC decrease during annealing, the FCC conductivity increases. As such, annealing the exemplary FCC device reduces the functional pseudocapacitance, increases conductivity, and decreases the exemplary device's resistance. The period of annealing does not seem to affect the capacitance of the exemplary devices.

Figure 16A:
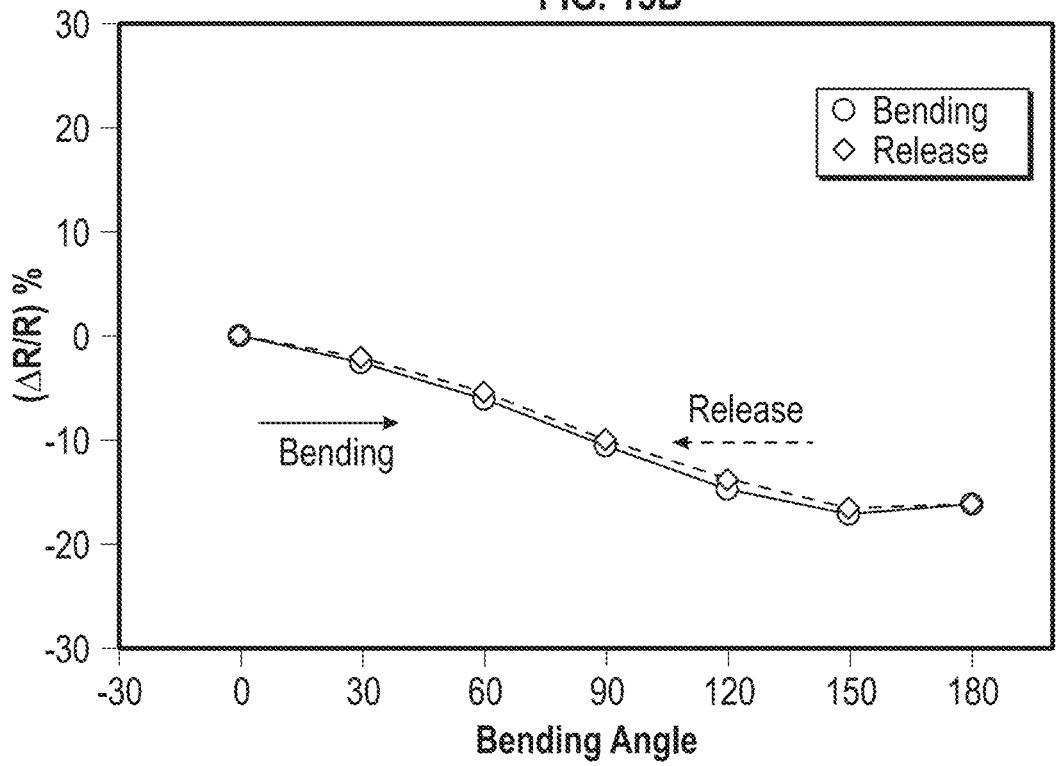
FIG. 16A displays an exemplary relationship between the resistance and the bending angle of an exemplary PANI-FCC device.

The performance of an exemplary device under a constant mechanical stress displays its ability to act as a flexible energy storage device. FIG. 16A shows the resistance of the exemplary PANI-FCC device decreases under mechanical stress from a flat condition at 0° to a bent condition at 180°.

Figure 16B:
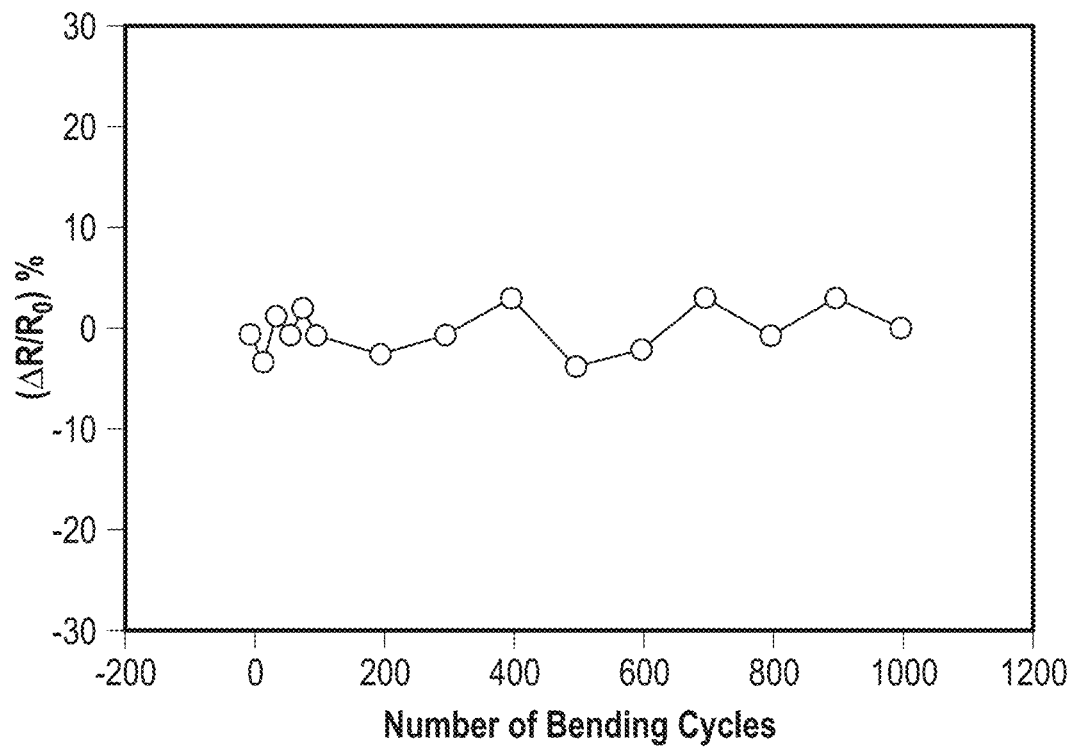
FIG. 16B displays an exemplary relationship between the resistance and the number of bending cycles of an exemplary PANI-FCC device, in accordance with some embodiments.
Figure 16C:
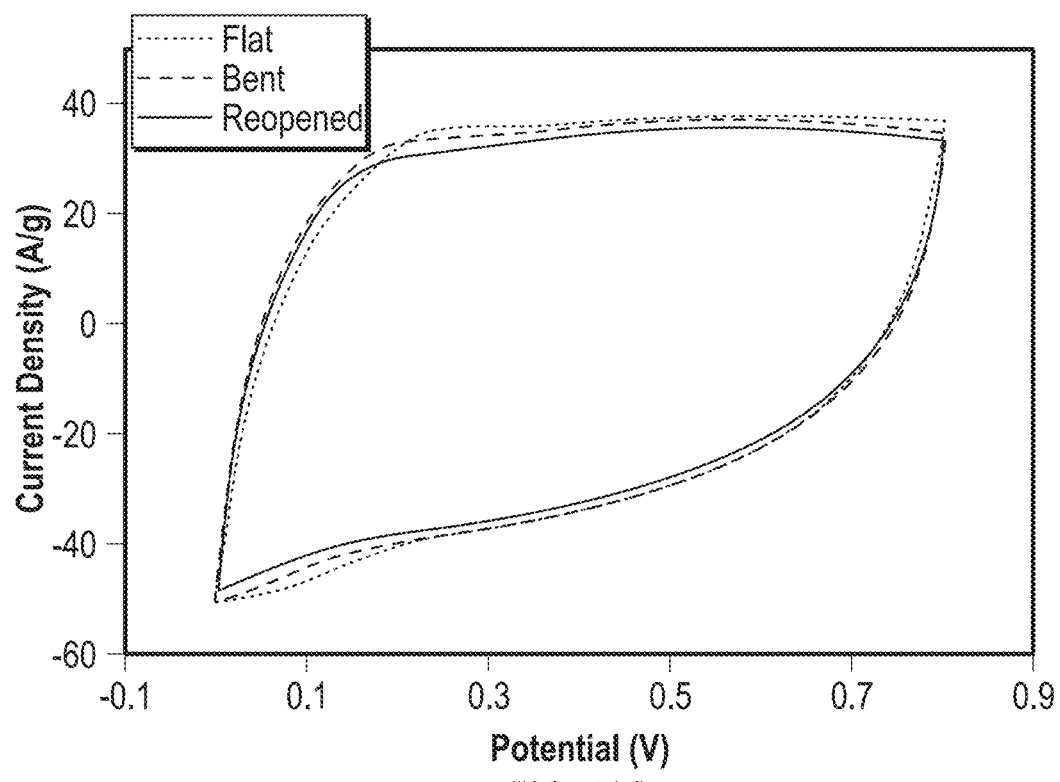
FIG. 16C displays exemplary CV curves of an exemplary bent, flat, and reopened PANI-FCC device, in accordance with some embodiments.

Additionally, FIG. 16B displays that the device's resistance, per this example, is maintained within about 4%, as it is bent from its flat to its folded condition over 1,000 cycles. The as-prepared exemplary device exhibits a high flexibility and may be bent 180° without a loss in performance. Additionally, per FIG. 16C, the exemplary PANI-FCC device maintains its rectangularly shaped CV curve and capacitance in its folded condition. This excellent performance durability of the exemplary device may be attributed to the high mechanical flexibility of the electrodes and the strong connections between FCC and PANI, and proves that such a device is suitable for flexible use.

Figure 17A:
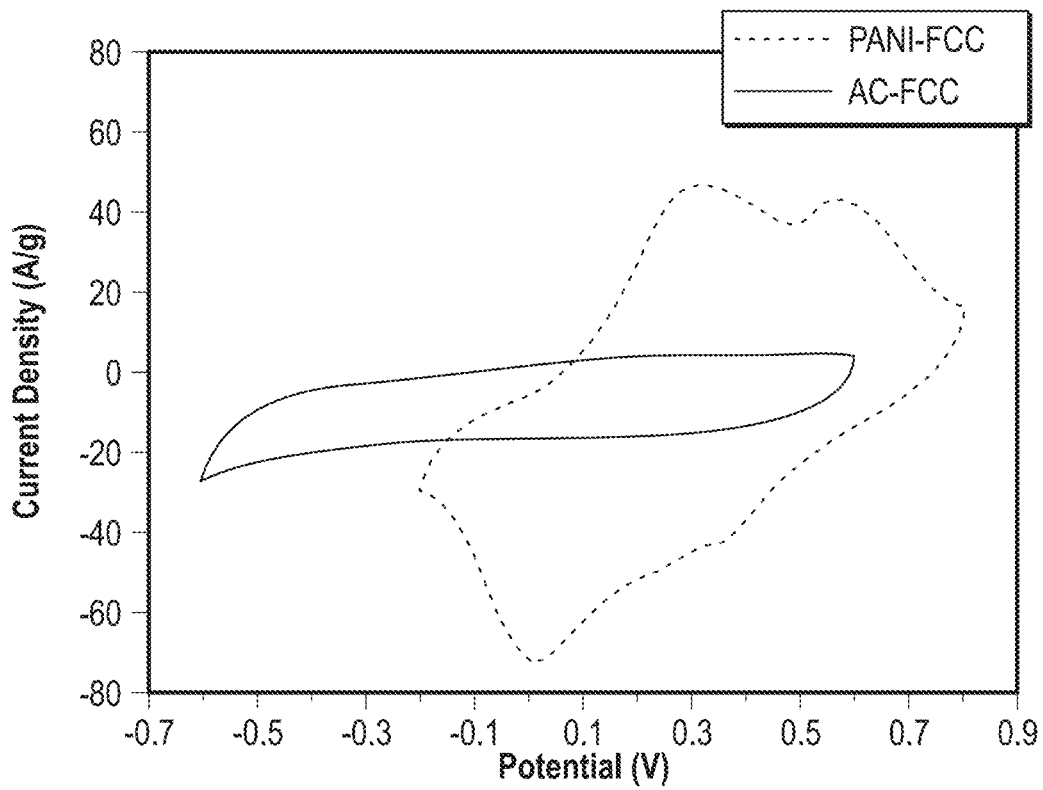
FIG. 17A displays exemplary CV curves of exemplary three-electrode PANI-FCC and AC-FCC devices at 20 mV/s, in accordance with some embodiments.
Figure 17B:
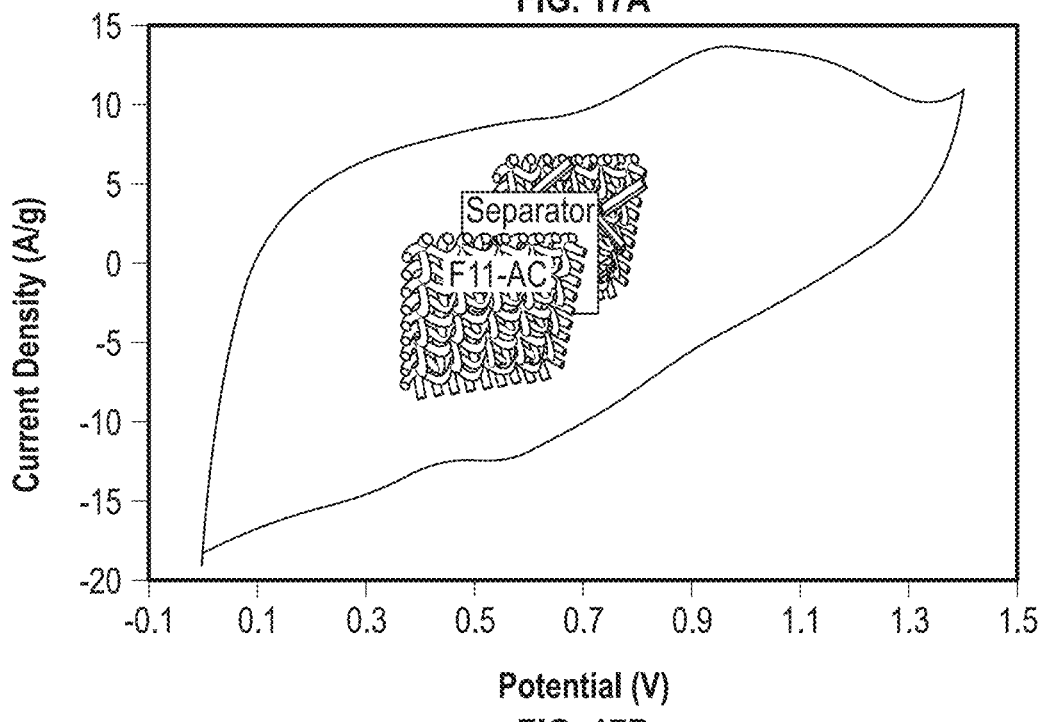
FIG. 17B displays an exemplary CV curve of an exemplary PANI-FCC asymmetric device at 50 mV/s, in accordance with some embodiments.
Figure 17C:
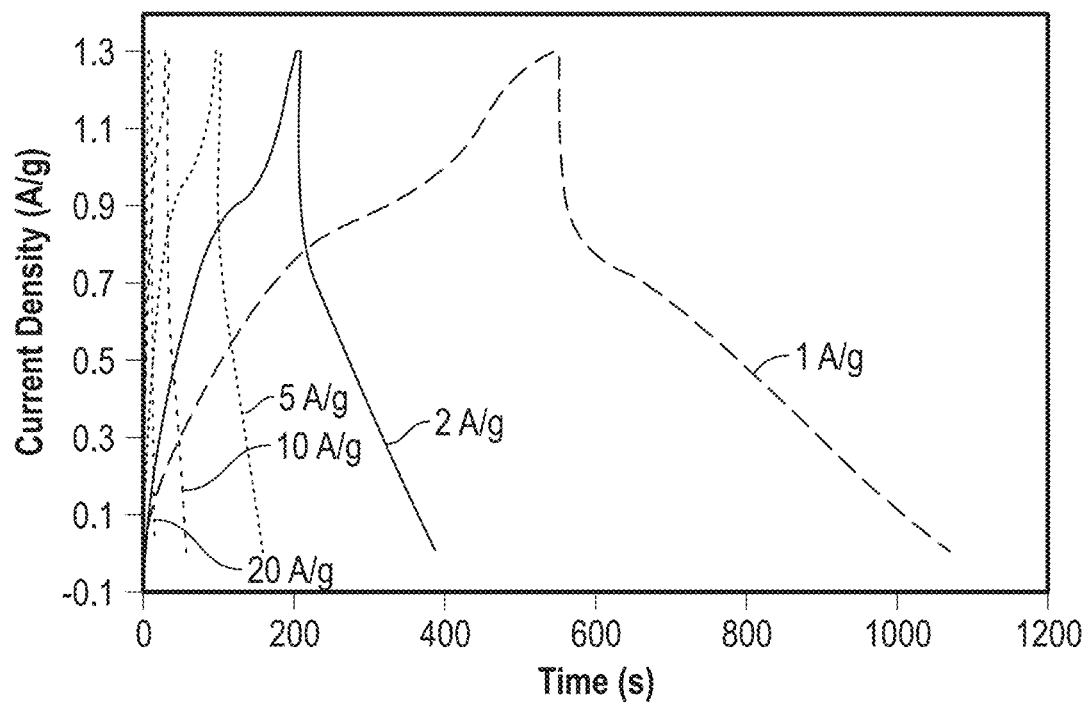
FIG. 17C displays exemplary CD curves of an exemplary asymmetric SC at various current densities, in accordance with some embodiments.

FIGS. 17A-D display the electrochemical performance of an exemplary asymmetric device comprising a PANI-FCC positive electrode, an activated carbon negative electrode, and a 1 M $H_2SO_4$ electrolyte. Per the example measurement shown in FIG. 17A, the AC electrode has a predefined voltage potential window of 1.2 V (−0.6 to 0.6 V) which is limited by the water redox range of $H_2$ evolution. FIGS. 17B and 17C show the CV and CD of the above exemplary device at 50 mV/s and 1 A/g, respectively, whereas the potential window for the asymmetric device is extended to the aqueous electrolyte oxidation wall of 1.3 V, beyond the capabilities of the AC electrode.

Figure 17D:
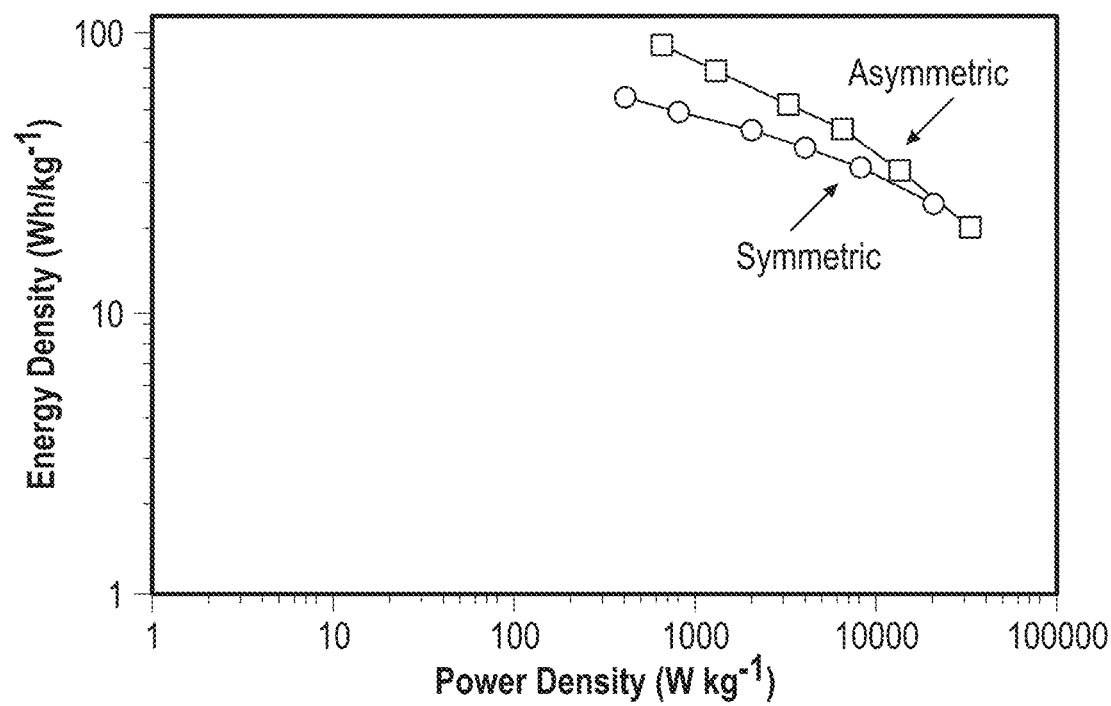
FIG. 17D displays exemplary Ragone plots of exemplary symmetric and asymmetric devices under various current densities, in accordance with some embodiments.

Power density and energy density are the two main parameters used to evaluate a supercapacitor device's performance. FIG. 17D depicts a Ragone plot which compares the energy densities and the power densities of the exemplary PANI-FCC symmetric and asymmetric devices over a range of current densities from 1 A/g to 50 A/g. Per FIG. 17D, the maximum energy density of the exemplary symmetric device is about 59 Wh/Kg, which decreased to about 24 Wh/kg as the power density increased from about 0.4 kW/kg to about 20 kW/kg. The energy and power density of the exemplary asymmetric device increased to about 91 Wh/kg and 33 W/kg, respectively.

Figure 23A:
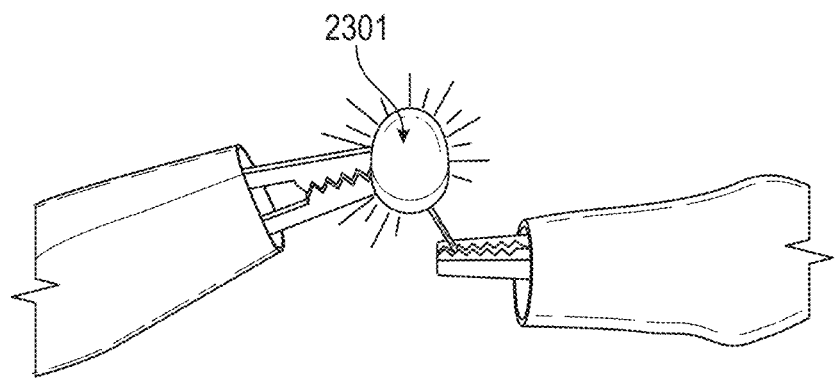
FIG. 23A illustratively displays an exemplary red LED powered by two exemplary asymmetric devices in series, in accordance with some embodiments.
Figure 23B:
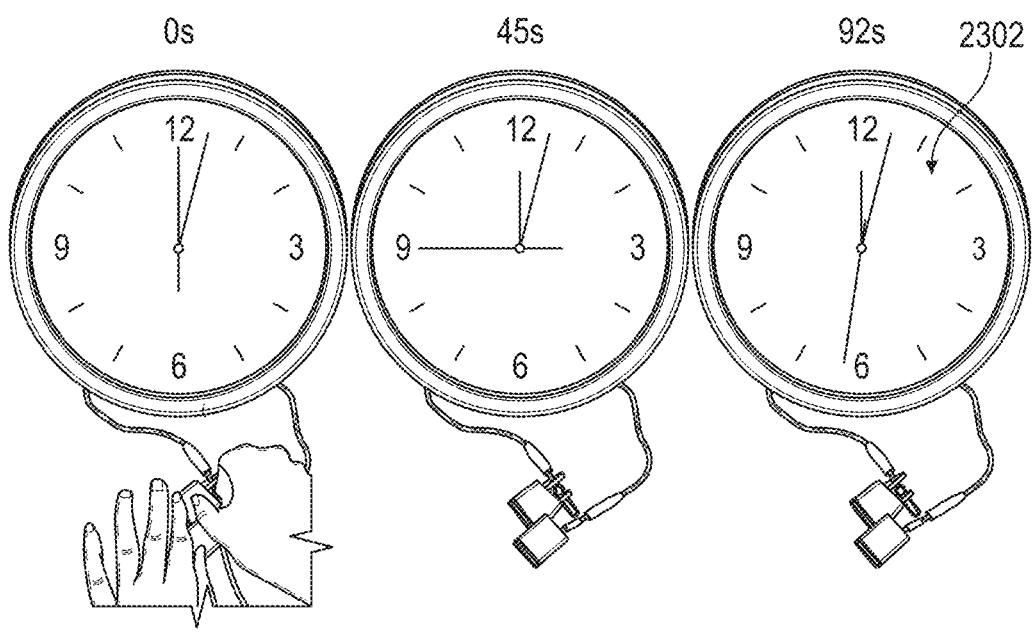
FIG. 23B illustratively displays an exemplary a clock powered by two exemplary asymmetric devices in series, in accordance with some embodiments.

FIGS. 23A and 23B display exemplary device applications, whereas two asymmetric PANI-FCC//AC devices connected in series, successfully powered a 5 mm diameter red LED 2101 indicator for about 47 minutes, and a clock 2102 for 1 h and 17 min, respectively.

Figure 18A:
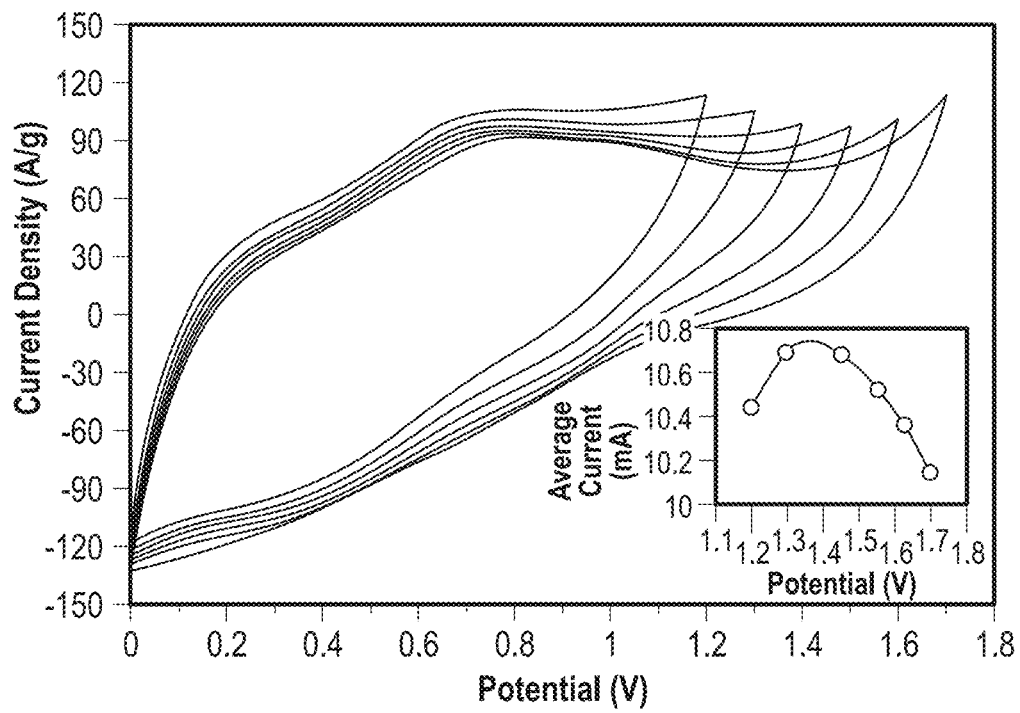
FIG. 18A displays exemplary CV curves of an exemplary PANI-FCC asymmetric device at different potential windows, in accordance with some embodiments.
Figure 18B:
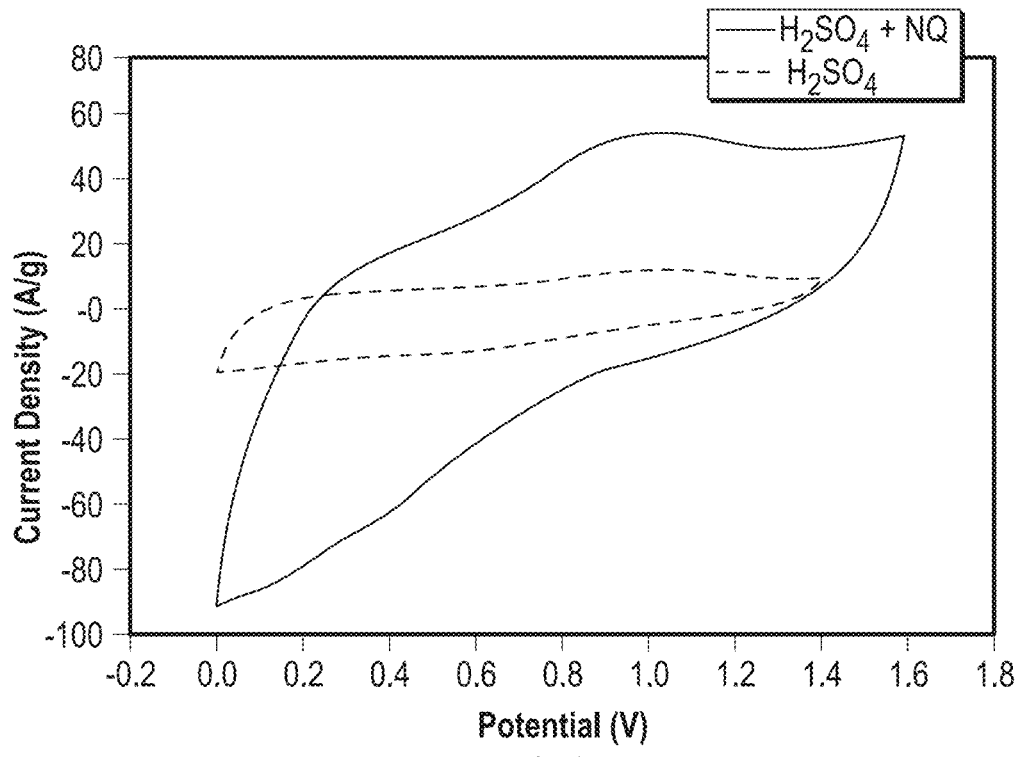
FIG. 18B displays exemplary CV curves of an exemplary PANI-FCC asymmetric device at 50 mV/s and in $H_2SO_4$ and NQ gel electrolytes, in accordance with some embodiments.
Figure 18C:
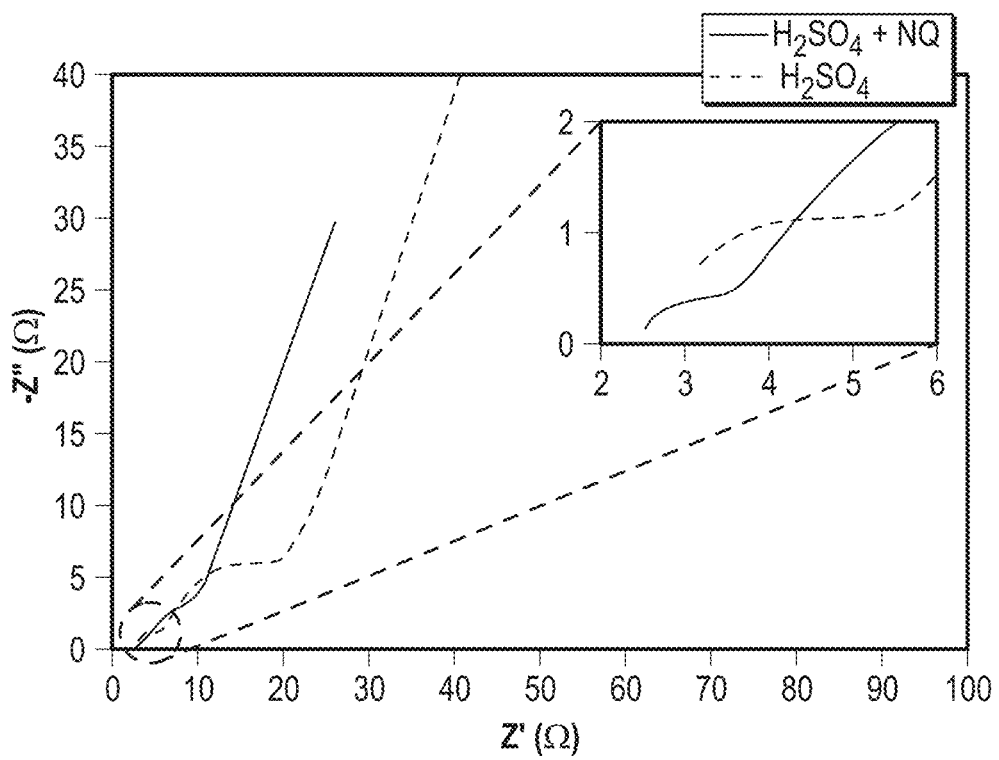
FIG. 18C displays exemplary Nyquist plot of an exemplary PANI//AC device, in accordance with some embodiments.

NQ is an effective redox-active electrolyte which is capable of providing additional redox reactions. In one embodiment, the electrochemical performance of an exemplary PANI//AC asymmetric supercapacitor device with a 1 M $H_2SO_4$+10 millimolar NQ mixed gel electrolyte is shown in FIGS. 18A-F, whereas the addition of NQ extends the measured potential window. The CV curves of the exemplary asymmetric PANI//AC device with an NQ electrolyte at different voltage windows and at 100 mV/s are shown in FIG. 18A, whereas the potential windows are seen to extended to 1.7 V. The relationship between the potential window and the capacitance of the exemplary device is seen in the inset of FIG. 18A, whereas a 1.4 V potential window allows for the highest capacitance. FIG. 18B shows that the implementation of the $H_2SO_4$+NQ mixed electrolyte in the exemplary device increases the integrated area of cyclic voltammetry compared with $H_2SO_4$ electrolyte. The Nyquist plots of the PANI//AC devices in the mixed and uniform electrolytes, per FIG. 18C, also proves that the exemplary PANI//AC device in the mixed electrolyte exhibits a lower equivalent series resistance of 2.5Ω than in the uniform electrolyte (3.1Ω) due to the high electrical conductivity of the electrolyte. As the exemplary PANI//AC device in the mixed electrolyte additionally exhibits a smaller semicircle in the high frequency region, per the inset graph than the PANI//AC device in the $H_2SO_4$ electrolyte, the mixed electrode device exhibits a higher capacitance. Additionally, as the equivalent series resistance of the exemplary PANI//AC device in the $H_2SO_4$+NQ electrolyte, per the measurements in FIG. 18C, is lower than the calculated equivalent series resistance of the exemplary PANI//AC device without NQ, the lower charge transfer resistance of the NQ may improve the capacitance of the device through increased electron transfer. The appearance of a plateau in the discharge curve of the exemplary mixed electrolyte device, at different current densities per FIG. 18D, confirms the contribution of NQ towards increasing the discharge time to about 2,000 seconds in a current density of 2 A/g. As calculated per the values in FIG. 18D, the addition of 10 millimolar 1,4-naphthoquinon (NQ) into the 1 M $H_2SO_4$ produces a mixed electrolyte and an exemplary device which exhibits a specific capacity of about 3,200 F/g, in a current density of 1 A/g, and an energy density of about 827 Wh/kg, performing more than 8 times better than the exemplary device in the absence of NQ.

Figure 18D:
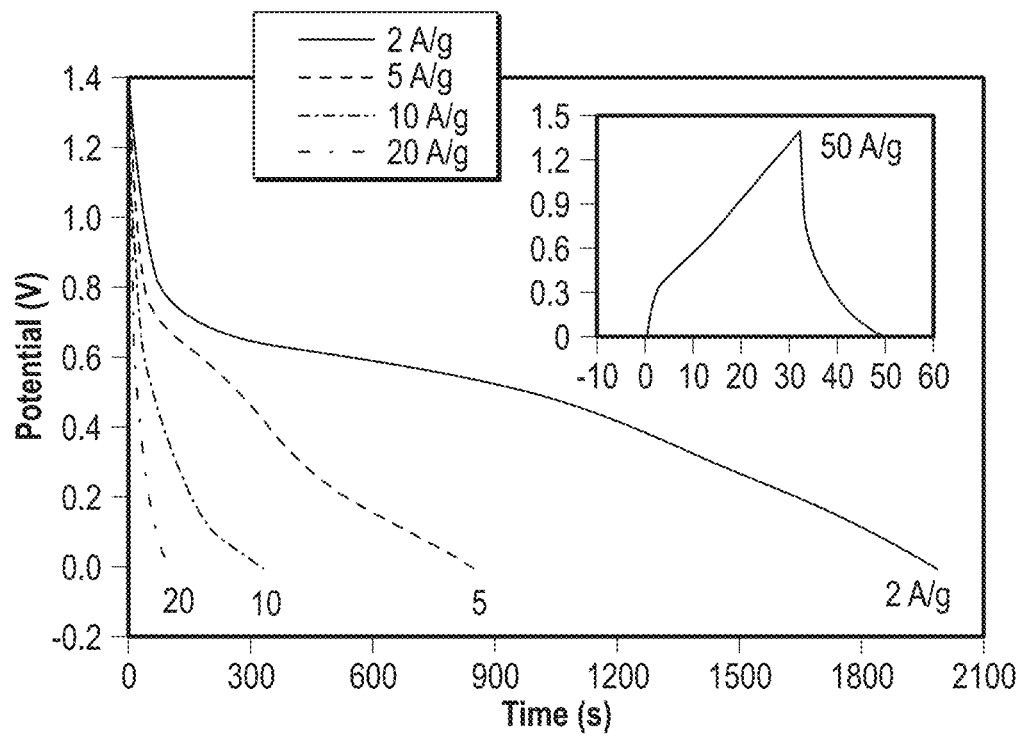
FIG. 18D displays exemplary discharge curves of an exemplary PANI-FCC asymmetric device at different current densities from 2 to 50 A/g, in accordance with some embodiments.
Figure 18E:
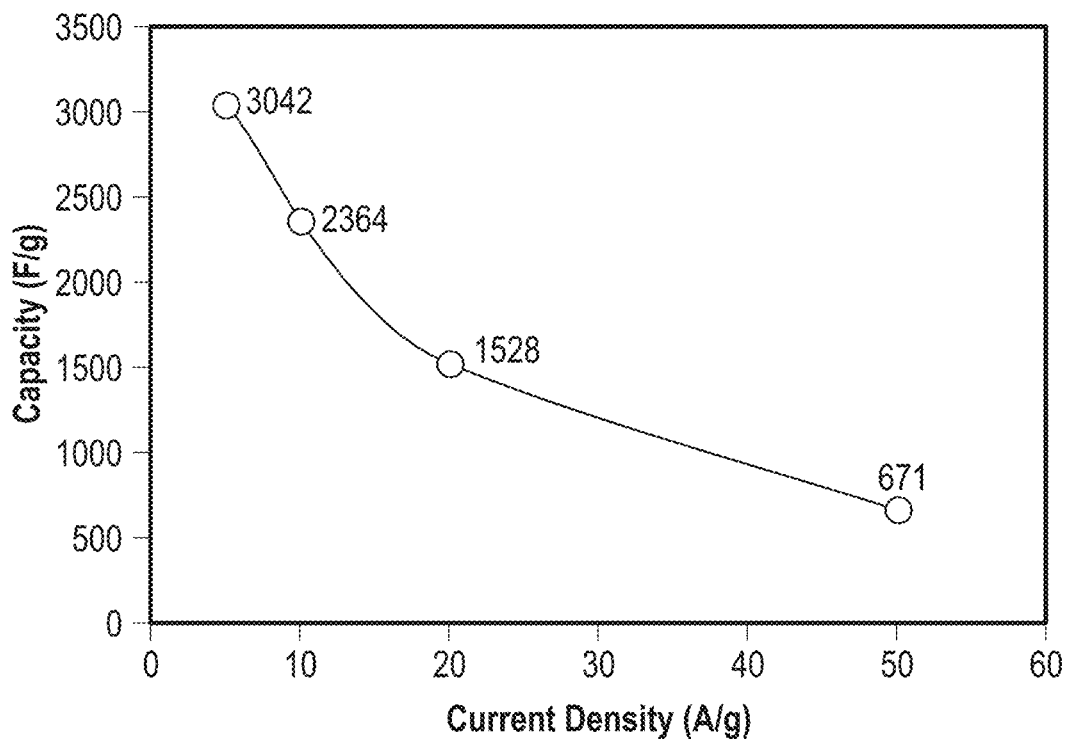
FIG. 18E displays the calculated capacitance as a function of current density for an exemplary PANI//AC device from 5 to 50 A/g, in accordance with some embodiments.
Figure 18F:
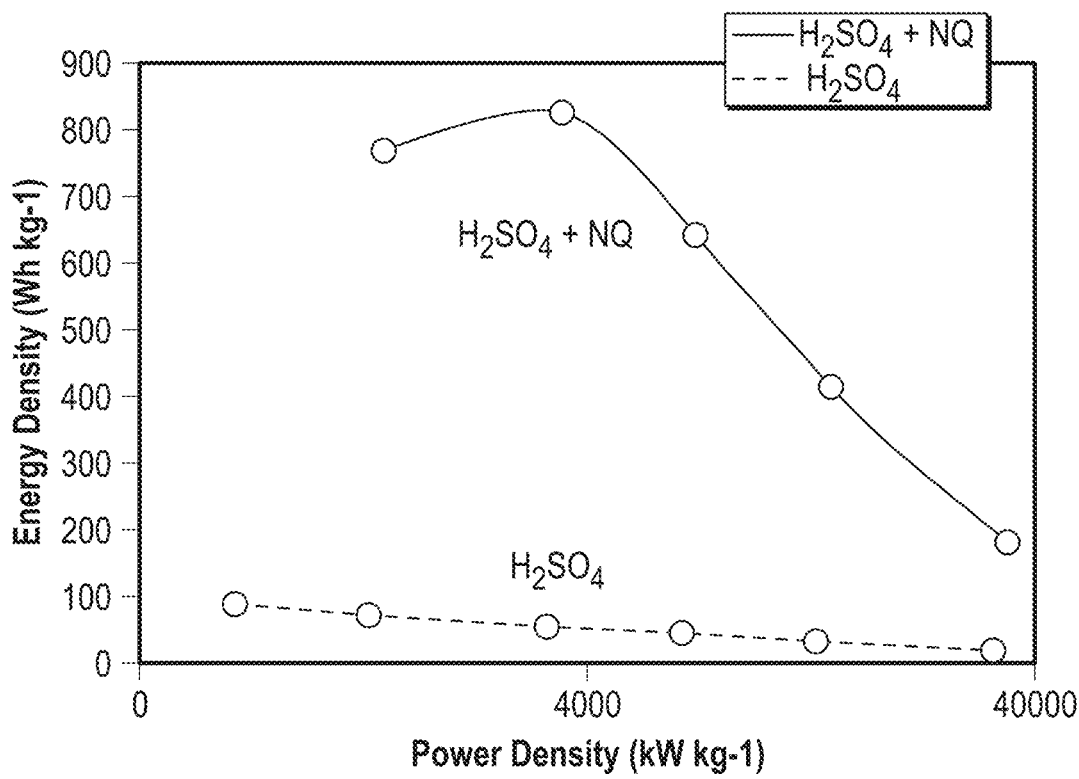
FIG. 18F displays an exemplary Ragone plot of exemplary symmetric and asymmetric devices, in accordance with some embodiments.

The inset of FIG. 18D, and FIG. 18E display the CD curve of the exemplary mixed electrode device at a current density of 50 A/g, and the calculated capacitance as a function of current density, respectively, which highlight the high rate capability, and capacity of about 671 F/g. Finally, FIG. 18F shows the Ragone plots of an exemplary device, with and without the presence of NQ in the electrolyte, to highlight the 8 fold positive effect of NQ on energy density.

Figure 19A:
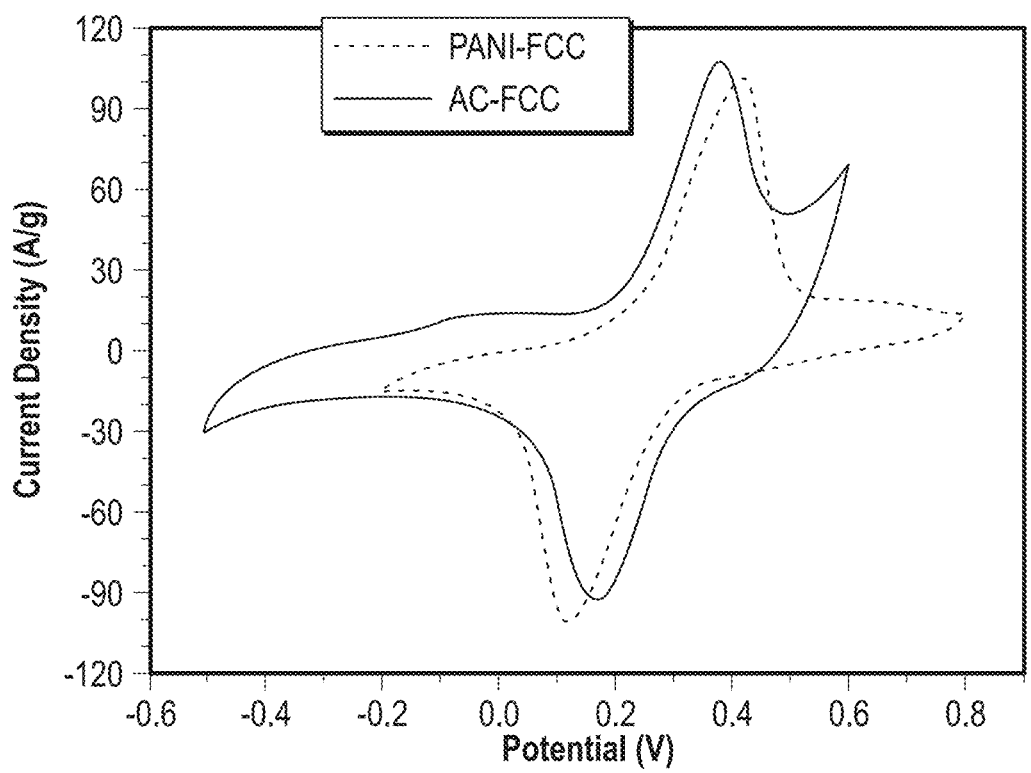
FIG. 19A displays exemplary CV curves of exemplary PANI-FCC and AC-FCC electrodes, in accordance with some embodiments.
Figure 19B:
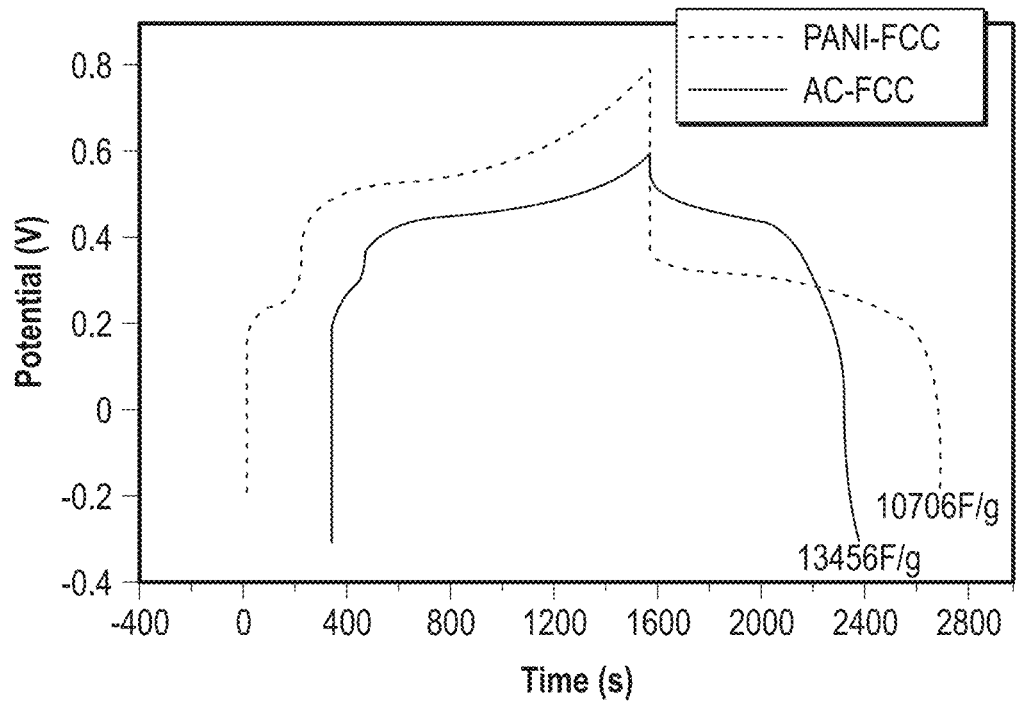
FIG. 19B displays exemplary CD curves of exemplary PANI-FCC and AC-FCC electrodes in the presence of NQ at a current density of 10 A/g, in accordance with some embodiments.
Figure 19C:
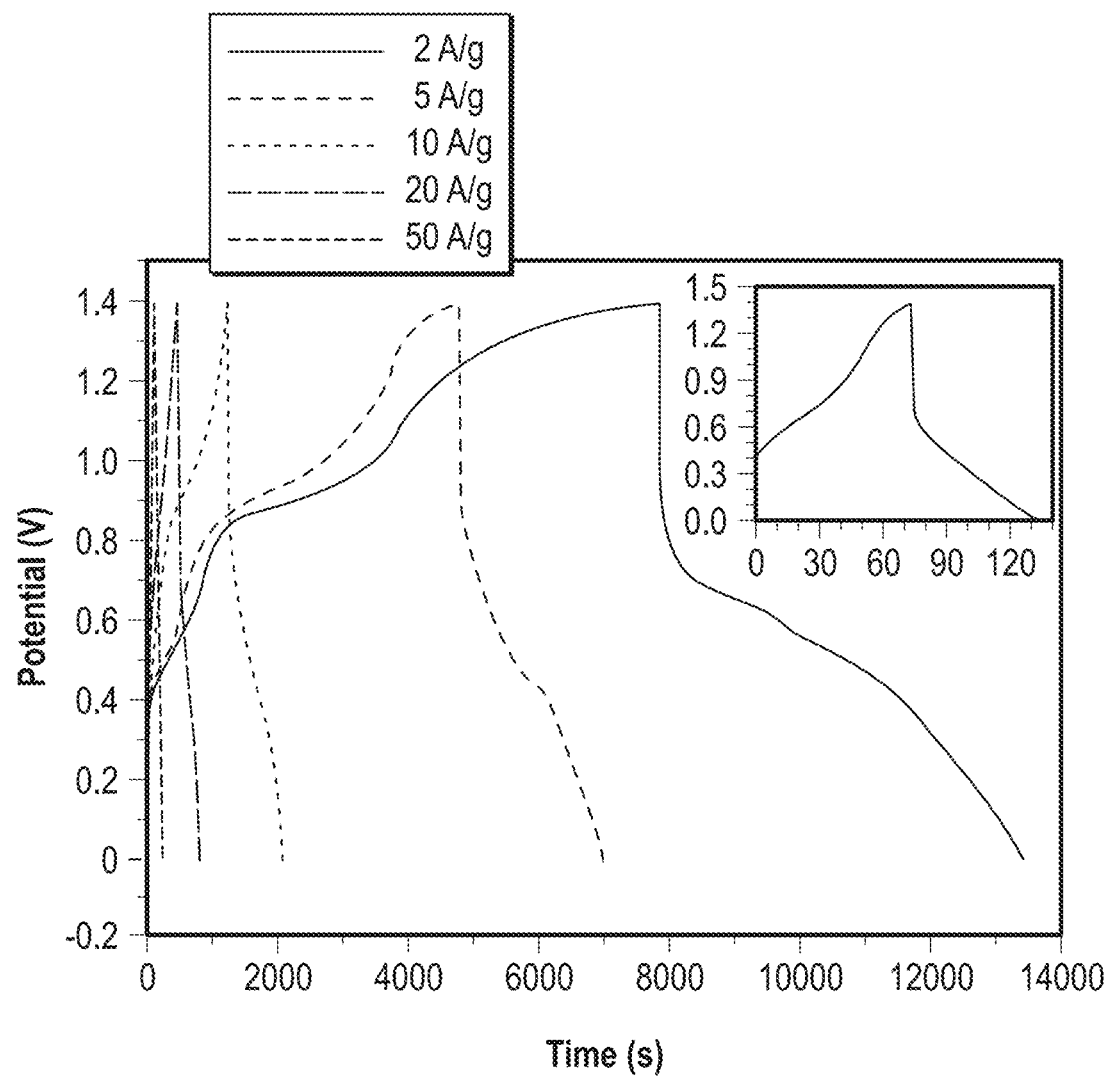
FIG. 19C displays exemplary CD curves of exemplary AC-FCC//PANI-FCC devices in the presence of NQ at different current densities, in accordance with some embodiments.

The addition of NQ is capable of not only increasing the capacitance of the PANI redox active electrodes, but also improves the capacitance of EDLC materials such as activated carbons. FIG. 19A shows the cyclic voltammogram of an exemplary device comprising an activated carbon electrode in PVA/$H_2SO_4$ gel redox electrolyte, which demonstrates an outstanding capacitance of about 13,456 F/g. As activated carbon, with its high hydrogen evolution overpotential, may operate at more negative voltages without causing electrolyte decomposition, an exemplary asymmetric supercapacitor exhibits an extended voltage window and a controlled charge storage capacity, via a redox electrolyte that acts on the negative and positive electrodes simultaneously. FIG. 19B shows CD curves of exemplary asymmetric AC-FCC and PANI-FCC electrodes in a 3E cell (triple stacked) configuration at a current density of 10 A/g, the results of which agree with that of CV experiments. FIG. 19C depicts that the exemplary device exhibits a long discharge time of about 2,000 seconds under a current density of 2 A/g. The appearance of a new plateau in the discharge curve may confirm the contribution from NQ towards the capacitance of the exemplary device. The inset to FIG. 19C demonstrates the CD curve of the device at a very high current density (100 A/g), revealing the high rate capability of the AC-FCC//PANI-FCC device in the presence of NQ.

| DEVICE | ELECTRO-LYTE | CAPACITANCE (F/g) | ENERGY DENSITY (Wh/kg) | VOLTAGE (V) |
|---|---|---|---|---|
| CC//CC | $H_2SO_4$ | 8 | 0.7 | 0.8 |
| FCC//FCC | $H_2SO_4$ | 126 | 11.2 | 0.8 |
| PANI//PANI | $H_2SO_4$ | 480 | 42.6 | 0.8 |
| | 0.5 mM NQ-in-$H_2SO_4$ (liquid) | 691 | 61.4 | 0.8 |
| | 10 mM NQ-in-$H_2SO_4$ (gel) | 710 | 63.1 | 0.8 |

| DEVICE | ELECTRO-LYTE | CAPACI-TANCE (F/g) | ENERGY DENSITY (Wh/kg) | VOLT-AGE (V) |
|---|---|---|---|---|
| PANI//AC | $H_2SO_4$ | 276 | 64.8 | 1.3 |
| | 0.5 mM NQ-in-$H_2SO_4$ (liquid) | 383 | 76.6 | 1.2 |
| | $H_2SO_4$ (gel) | 314 | 62.8 | 1.2 |
| | 10 mM NQ-in-$H_2SO_4$ (gel) | 5,661 @ 2 A/g | 1,541 | 1.4 |
| PANI//PANI//PANI | 10 mM NQ-in-$H_2SO_4$ (gel) | 10,706 @ 10 A/g | — | −1 |
| AC//AC//AC | 10 mM NQ-in-$H_2SO_4$ (gel) | 13,456 @ 10 A/g | — | −1.1 |

Figure 20A:
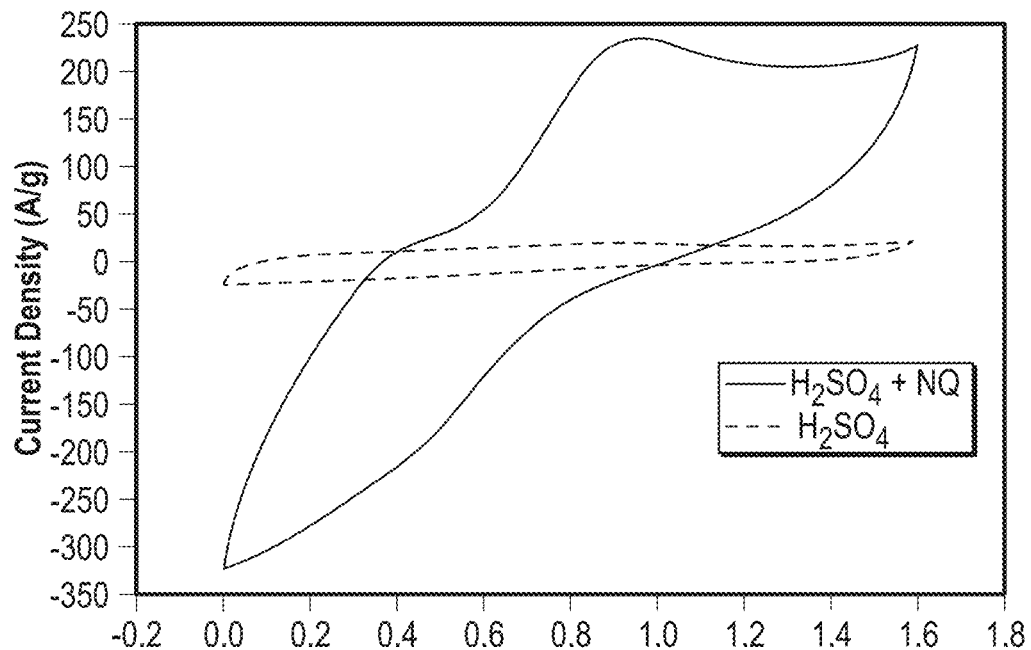
FIG. 20A displays exemplary CV curves of an exemplary asymmetric AC-FCC//PANI-FCC device in an NQ gel electrolyte, in accordance with some embodiments.
Figure 20B:
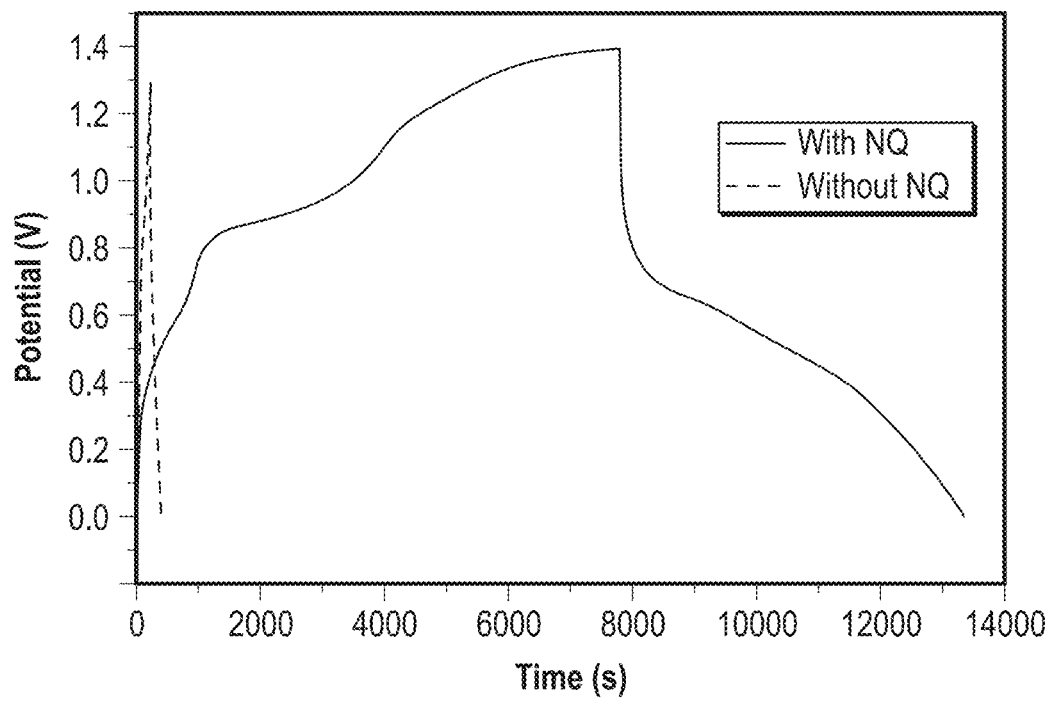
FIG. 20B displays exemplary charge and discharge curves of an exemplary asymmetric AC-FCC//PANI-FCC device with and without NQ, in accordance with some embodiments.

FIG. 20A shows the performance of an exemplary asymmetric supercapacitor comprising a PANI-FCC positive electrode and an AC-FCC negative electrode in an acidic polymer hydrogel electrolyte with and without the redox additive. This asymmetric supercapacitor bypasses the inherently low voltage of symmetric polyaniline devices (0.8 V) and extends the operation voltage window to 1.4 V. Furthermore, the integrated area of the cyclic voltammogram is obviously much higher in the presence of the redox additive. The charge and discharge curves in FIG. 20B show a discharge time of about 6,000 seconds under a current density of 1.88 A/g, whereas in the absence of NQ the same device discharges in only 185 seconds. In other words, the specific capacitance of the device in the presence of NQ is about 5,661 F/g (2.3 F/cm$^2$) under a current density of 1.88 A/g, which is more than 20 times higher than that in the absence of NQ.

Figure 20C:
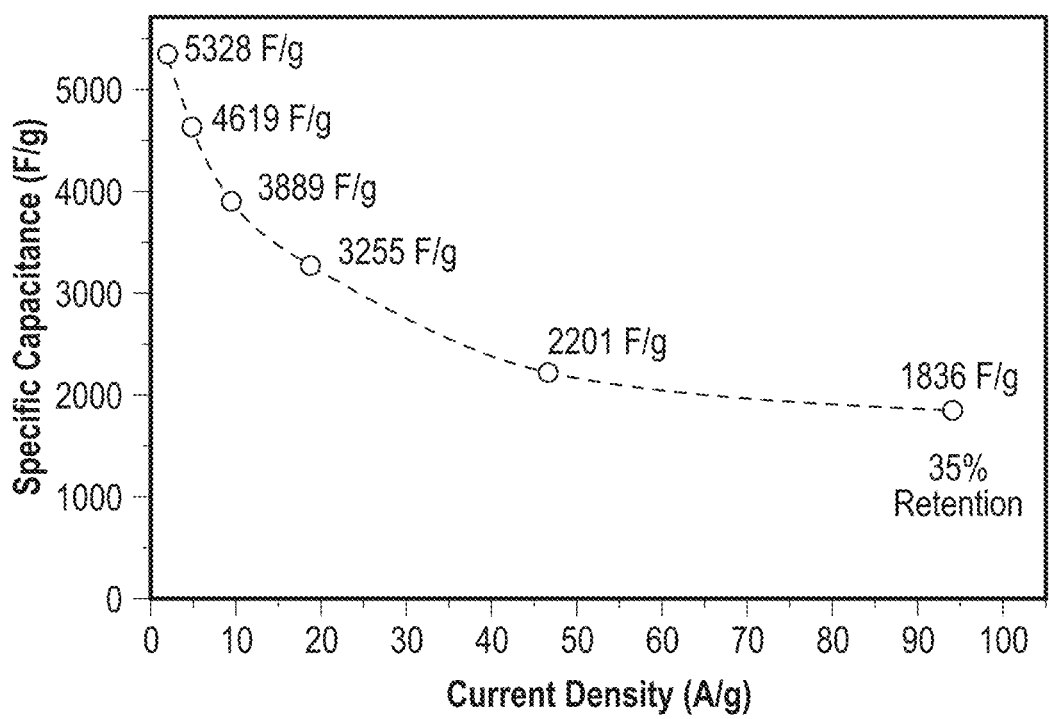
FIG. 20C displays the exemplary relationship between the current density and the specific capacitance of an exemplary AC-FCC//PANI-FCC device in the presence of NQ, in accordance with some embodiments.

FIG. 20C shows that the device maintains a high specific capacitance even at very high current densities of up to 94 A/g, revealing the high rate capability of the exemplary AC-FCC//PANI-FCC device in the presence of NQ.

Figure 20D:
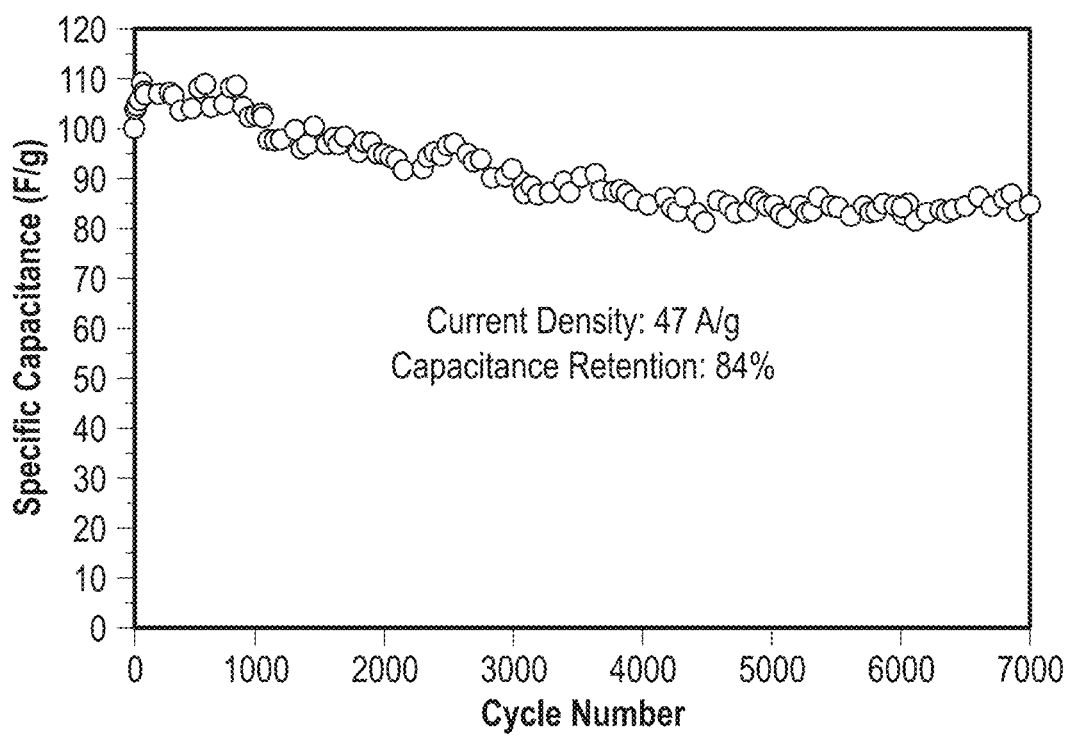
FIG. 20D displays exemplary charge and discharge curves of an exemplary asymmetric AC-FCC//PANI-FCC device under a current density of about 47 A/g, in accordance with some embodiments.

Additionally, the charge/discharge (GCD) cycling of the AC-FCC//PANI-FCC device under a current density of 47 A/g, per FIG. 20D, indicates an 84% capacitance retention over 7,000 cycles.

Figure 21:
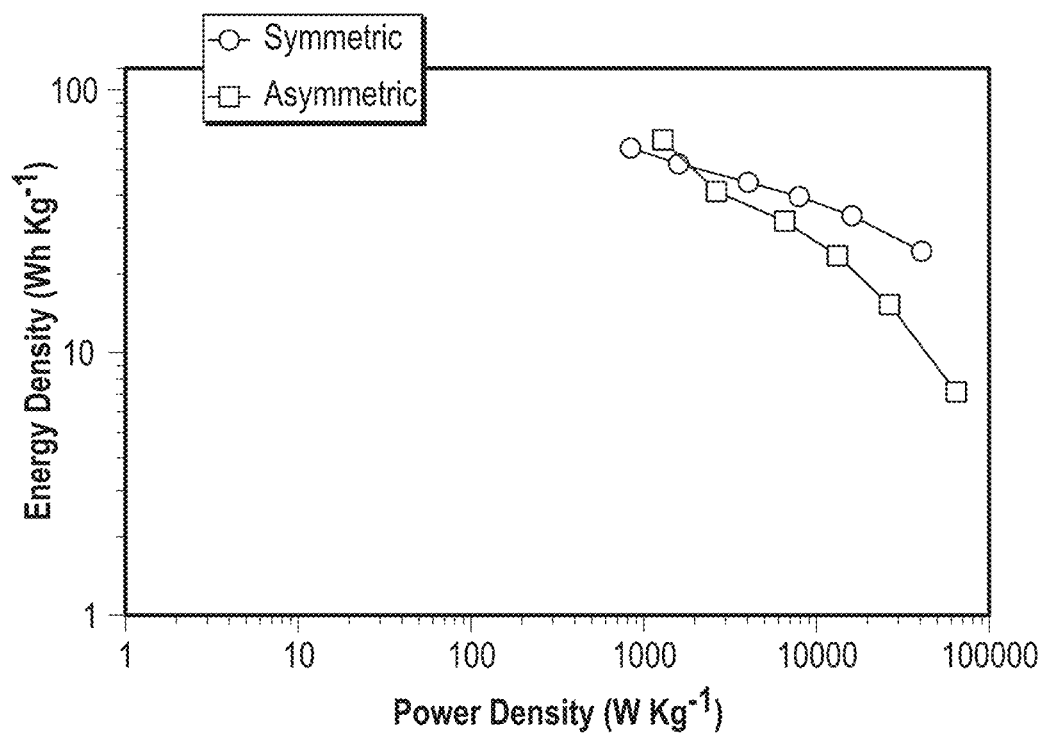
FIG. 21 displays the exemplary relationship between the power density and the energy density of exemplary symmetric and asymmetric devices, in accordance with some embodiments.

FIG. 21 displays an exemplary relationship between the power density and the energy density of exemplary symmetric and asymmetric devices, in accordance with some embodiments. An exemplary redox supercapacitor constructed in accordance with the present disclosure demonstrates an outstanding energy density of 1,541 Wh/kg based on the mass of the active materials only.

EXAMPLES

In one example, an exemplary electrochemical cell has a footprint of about 1 cm$^2$ and a thickness of about 1 millimeter, thus encompassing a volume of 0.005 cm$^3$. In this example, the composition of the exemplary electrochemical cell is shown below.

| | Mass (g) | Density (g/cm$^3$) | Volume (cm$^3$) |
|---|---|---|---|
| CC | 0.005 | 1.55 | 0.0032 |
| PANI | 0.0001 | 1.33 | $7.54 \times 10^{-5}$ |
| AC | 0.0001 | 0.5 | 0.0002 |
| NQ | 0.000085 | 1.42 | $5.99 \times 10^{-5}$ |

Figure 22:
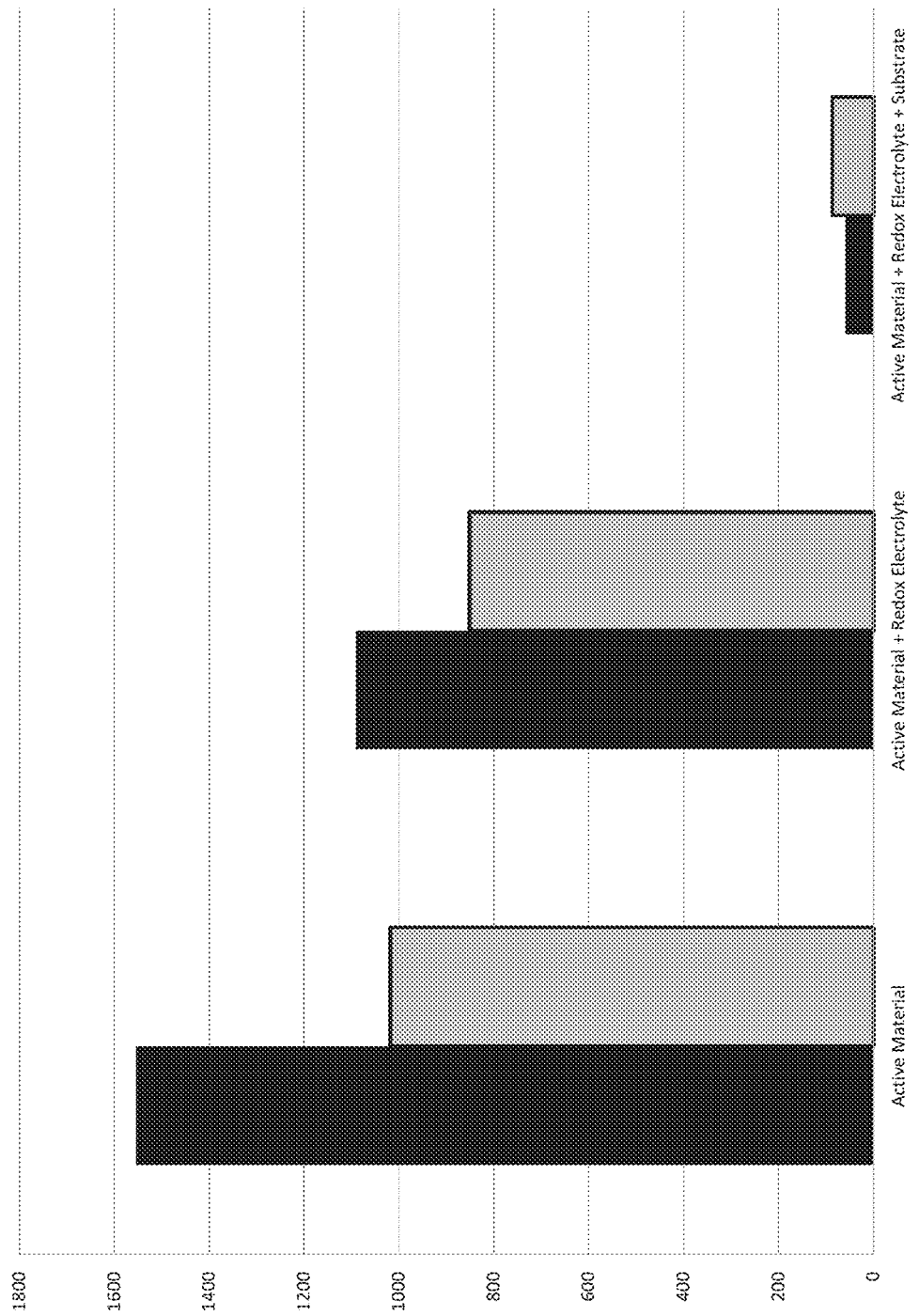
FIG. 22 displays the gravimetric and volumetric energy densities of the components of an exemplary electrochemical cell, in accordance with some embodiments.

In this example of the electrochemical cell, as the SEM images, per FIG. 5A, display that the PANI nanotubes have a porosity of about 28.4%, the actual PANI volume is calculated to be about $1.05 \times 10^{-4}$ cm$^3$. Additionally, In this example, the exemplary electrochemical cell displays a capacitance, voltage, and energy of about 1.14 F, 1.4 V, and 0.0003 Wh, respectively. Additionally, FIG. 22, displays the gravimetric and volumetric densities of an asymmetric PANI//AC device with an NQ redox electrolyte and carbon cloth, as normalized by the mass and volume of the electrodes (1554 Wh/kg, 1019 Wh/L), by the mass and volume of the electrodes and the redox electrolyte (1091 Wh/kg, 851 Wh/L), and by the mass and volume of the electrodes, the redox electrolyte and the carbon cloth (59 Wh/kg. 87 Wh/L).

Terms and Definitions

Unless otherwise defined, all technical terms used herein have the same meaning as commonly understood by one of ordinary skill in the art to which the device described herein belongs. As used in this specification and the appended claims, the singular forms "a," "an," and "the" include plural references unless the context clearly dictates otherwise. Any reference to "or" herein is intended to encompass "and/or" unless otherwise stated.

As used herein, and unless otherwise specified, the term AC refers to activated carbon.

As used herein, and unless otherwise specified, the term CC refers to carbon cloth.

As used herein, and unless otherwise specified, the term FCC refers to functionalized carbon cloth.

As used herein, and unless otherwise specified, the term PANI refers to Polyaniline.

As used herein, and unless otherwise specified, the term PANI-CC refers to a carbon cloth, on which Polyaniline structures have been synthesized.

As used herein, and unless otherwise specified, the term PANI-FCC refers to a functionalized carbon cloth, on which polyaniline structures have been synthesized.

As used herein, and unless otherwise specified, the term SDS refers to sodium dodecyl sulfate.

As used herein, and unless otherwise specified, a CV chart refers to a cyclic voltammogram chart.

As used herein, and unless otherwise specified, a CD chart refers to a charge-discharge chart.

While preferable embodiments of the present methods and devices taught herein have been shown and described herein, it will be obvious to those skilled in the art that such embodiments are provided by way of example only. Numerous variations, changes, and substitutions will now occur to those skilled in the art without departing from the methods and devices taught herein. It should be understood that various alternatives to the embodiments of the methods and devices taught herein described herein may be employed in practicing the methods and devices taught herein. It is intended that the following claims define the scope of the methods and devices taught herein and that methods and structures within the scope of these claims and their equivalents be covered thereby.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range.

In certain embodiments, the term "about" or "approximately" means within 100 nanometers, 90 nanometers, 80 nanometers, 70 nanometers, 60 nanometers, 50 nanometers, 40 nanometers, 30 nanometers, 20 nanometers, 10 nanometers, 9 nanometers, nanometers, 8 nanometers, 7 nanometers, 6 nanometers, 5 nanometers, 4 nanometers, 3 nanometers, 2 nanometers, or 1 nanometers of a given value or range. In certain embodiments, the term "about" or "approximately" means within 100 $mF/cm^2$, 90 $mF/cm^2$, 80 $mF/cm^2$, 70 $mF/cm^2$, 60 $mF/cm^2$, 50 $mF/cm^2$, 40 $mF/cm^2$, 30 $mF/cm^2$, 20 $mF/cm^2$, 10 $mF/cm^2$, 9 $mF/cm^2$, $mF/cm^2$, 8 $mF/cm^2$, 7 $mF/cm^2$, 6 $mF/cm^2$, 5 $mF/cm^2$, 4 $mF/cm^2$, 3 $mF/cm^2$, 2 $mF/cm^2$, or 1 $mF/cm^2$ of a given value or range. In certain embodiments, the term "about" or "approximately" means within 5V, 4V, 3V, 2V, 1V, 0.5V, 0.1V, or 0.05V of a given value or range. In certain embodiments, the term "about" or "approximately" means within 100 F/g, 90 F/g, 80 F/g, 70 F/g, 60 F/g, 50 F/g, 40 F/g, 30 F/g, 20 F/g, 10 F/g, 9 F/g, F/g, 8 F/g, 7 F/g, 6 F/g, 5 F/g, 4 F/g, 3 F/g, 2 F/g, or 1 F/g of a given value or range. In certain embodiments, the term "about" or "approximately" means within 100 Wh/kg, 80 Wh/kg, 60 Wh/kg, 40 Wh/kg, 20 Wh/kg, 15 Wh/kg, 10 Wh/kg, 9 Wh/kg, 8 Wh/kg, 7 Wh/kg, 6 Wh/kg, 5 Wh/kg, 4 Wh/kg, 3 Wh/kg, 2 Wh/kg, 1 Wh/kg, 0.5 Wh/kg, 0.1 Wh/kg, or 0.05 Wh/kg of a given value or range. In certain embodiments, the term "about" or "approximately" means within 40° C., 30° C., 20° C., 10° C., 9° C., ° C., 8° C., 7° C., 6° C., 5° C., 4° C., 3° C., 2° C., or 1° C. of a given value or range. In certain embodiments, the term "about" or "approximately" means within 60 minutes, 50 minutes, 40 minutes, 30 minutes, 20 minutes, 10 minutes, 9 minutes, minutes, 8 minutes, 7 minutes, 6 minutes, 5 minutes, 4 minutes, 3 minutes, 2 minutes, or 1 minute of a given value or range. In certain embodiments, the term "about" or "approximately" means within 60 hours, 50 hours, 40 hours, 30 hours, 20 hours, 10 hours, 9 hours, hours, 8 hours, 7 hours, 6 hours, 5 hours, 4 hours, 3 hours, 2 hours, or 1 hour of a given value or range. In certain embodiments, the term "about" or "approximately" means within 40.0 grams, 30.0 grams, 20.0 grams, 10.0 grams, 5.0 grams, 1.0 grams, 0.9 grams, 0.8 grams, 0.7 grams, 0.6 grams, 0.5 grams, 0.4 grams, 0.3 grams, 0.2 grams or 0.1 grams, 0.05 grams, or 0.01 grams of a given value or range. In certain embodiments, the term "about" or "approximately" means within 30.0 A/g, 20.0 A/g, 10.0 A/g, 5.0 A/g, 1.0 A/g, 0.9 A/g, 0.8 A/g, 0.7 A/g, 0.6 A/g, 0.5 A/g, 0.4 A/g, 0.3 A/g, 0.2 A/g, or 0.1 A/g of a given value or range. In certain embodiments, the term "about" or "approximately" means within 20 kW/kg, 15 kW/kg, 10 kW/kg, 9 kW/kg, 8 kW/kg, 7 kW/kg, 6 kW/kg, 5 kW/kg, 4 kW/kg, 3 kW/kg, 2 kW/kg, 1 kW/kg, 0.5 kW/kg, 0.1 kW/kg, or 0.05 kW/kg of a given value or range. In certain embodiments, the term "about" or "approximately" means within 5 L, 4 L, 3 L, 2 L, 1 L, 0.5 L, 0.1 L, or 0.05 L. In certain embodiments, the term "about" or "approximately" means within 30.0 ml, 20.0 ml, 10.0 ml, 5.0 ml, 1.0 ml, 0.9 ml, 0.8 ml, 0.7 ml, 0.6 ml, 0.5 ml, 0.4 ml, 0.3 ml, 0.2 ml, or 0.1 ml of a given value or range. In certain embodiments, the term "about" or "approximately" means within 5 M, 4 M, 3 M, 2 M, 1 M, 0.5 M, 0.1 M, or 0.05 M of a given value or range.

What is claimed is:

1. A supercapacitor comprising:
    two or more electrodes, wherein at least one of the two or more electrodes comprises a functionalized carbon electrode comprising a carbon substrate and one or more conducting polymer nanotubes disposed on the carbon substrate, wherein the one or more conducting polymer nanotubes comprise polyaniline, poly(p-phenylene oxide), poly(p-phenylene sulfide), poly(3,4-ethylenedioxythiophene), polypyrrole, polythiophene, poly(3- alkythiophene), poly(3-methylthiophene), poly (3-hexylthiophene), or any combination thereof;
    a current collector; and
    a redox electrolyte in direct contact with an interior surface and an exterior surface of the one or more conducting polymer nanotubes.

2. The supercapacitor of claim 1, wherein the carbon substrate comprises carbon cloth, carbon fiber, amorphous carbon, glassy carbon, carbon nanofoam, carbon aerogel, graphene foam, or any combination thereof.

3. The supercapacitor of claim 1, wherein the one or more conducting polymer nanotubes have a length of 100 nanometers to 10,000 nanometers.

4. The supercapacitor of claim 1, wherein the one or more conducting polymer nanotubes have an outer width of 10 nanometers to 1,000 nanometers.

5. The supercapacitor of claim 1, wherein the one or more conducting polymer nanotubes have an inner width of 50 nanometers to 800 nanometers.

6. The supercapacitor of claim 1, wherein a surface of the one or more conducting polymer nanotubes contains a nanostructure.

7. The supercapacitor of claim 6, wherein the nanostructure comprises a nanorod, nanochain, nanofiber, nanoflake, nanoflower, nanoparticle, nanoplatelet, nanoribbon, nanoring, nanosheet, or any combination thereof.

8. The supercapacitor of claim 6, wherein the nanostructure has a length of 4 nanometers to 50 nanometers.

9. The supercapacitor of claim 6, wherein the nanostructure has a width of 4 nanometers to 50 nanometers.

10. The supercapacitor of claim 1, wherein the functionalized carbon electrode has an areal capacitance of 150 $mF/cm^2$ to 750 $mF/cm^2$.

11. The supercapacitor of claim 1, wherein the functionalized carbon electrode has a resistance which decreases after 1,000 cycles of bending by at most 8%.

12. The supercapacitor of claim 1, wherein the redox electrolyte comprises a quinone.

13. The supercapacitor of claim 1, wherein the supercapacitor has a working potential of 0.1 V to 1.7 V.

14. The supercapacitor of claim 1, wherein the supercapacitor has a gravimetric capacitance which, after 1,000 cycles of charging, decreases by at most 26%.

15. The supercapacitor of claim 1, wherein the supercapacitor has a gravimetric capacitance which is 125 F/g to 20,000 F/g.

16. The supercapacitor of claim 1, wherein the supercapacitor has a gravimetric energy density which is 12 Wh/kg to 3,000 Wh/kg.

17. A method of fabricating a functionalized electrode comprising:
    a) functionalizing a carbon substrate to form a functionalized carbon substrate;
    b) preparing the functionalized carbon substrate;
    c) formulating a polymerization fluid; and
    d) synthesizing one or more conducting polymer nanotubes on the functionalized carbon substrate, wherein the one or more conducting polymer nanotubes comprise polyaniline, poly(p-phenylene oxide), poly(p-phenylene sulfide), poly(3,4-ethylenedioxythiophene), polypyrrole, polythiophene, poly(3-alkythiophene), poly(3-methylthiophene), poly(3-hexylthiophene), or any combination thereof.

18. The method of claim 17, wherein the functionalizing of the carbon substrate to form the functionalized carbon substrate comprises:
   i) forming a functionalization solution;
   ii) heating the functionalization solution;
   iii) cooling the functionalization solution;
   iv) displacing a piece of the carbon substrate into the functionalization solution to form a piece of the functionalized carbon substrate; and
   v) rinsing the piece of the functionalized carbon substrate.

19. The method of claim 18, wherein the heating of the functionalization solution occurs at a temperature of 30° C. to 120° C.

20. The method of claim 18, wherein the heating of the functionalization solution occurs for a period of time of 60 minutes to 240 minutes.

21. The method of claim 17, further comprising a step of annealing the functionalized carbon substrate before the preparing of the functionalized carbon substrate.

22. The method of claim 21, wherein the functionalized carbon substrate is annealed at a temperature of 100° C. to 400° C.

23. The method of claim 21, wherein the functionalized carbon substrate is annealed for a period of time of 0.5 hours to 14 hours.

24. The method of claim 17, wherein the preparing of the functionalized carbon substrate comprises:
   i) cutting a piece of the functionalized carbon substrate;
   ii) submerging the piece of functionalized carbon substrate in a solvent solution;
   iii) sonicating the piece of functionalized carbon substrate in the solvent solution; and
   iv) drying the piece of functionalized carbon substrate.

25. The method of claim 24, wherein the sonicating occurs for a period of time of 15 minutes to 60 minutes.

26. The method of claim 24, wherein the drying occurs at a temperature of 30° C. to 120° C.

27. The method of claim 24, wherein the drying occurs over a period of time of 3 hours to 12 hours.

28. The method of claim 17, wherein the formulating of the polymerization fluid comprises:
   i) forming a polymerization solution comprising:
      a conducting polymer;
      an acid;
      a detergent;
      water; and
      an oxidizing agent; and
   ii) stirring the polymerization solution to form the polymerization fluid.

29. The method of claim 28, wherein the conducting polymer comprises polyaniline, poly(p-phenylene oxide), poly(p-phenylene sulfide), poly(3,4-ethylenedioxythiophene), polypyrrole, polythiophene, poly(3-alkythiophene), poly(3-methylthiophene), poly(3-hexylthiophene), or any combination thereof.

30. The method of claim 28, wherein the stirring of the polymerization solution occurs for a period of time of 10 minutes to 40 minutes.

31. The method of claim 17, wherein the synthesizing of the one or more conducting polymer nanotubes on the functionalized carbon substrate comprises:
   i) agitating the polymerization fluid;
   ii) immersing the functionalized carbon substrate in the polymerization fluid;
   iii) storing the functionalized carbon substrate in the polymerization fluid;
   iv) removing the functionalized carbon substrate from the polymerization fluid;
   v) washing the functionalized carbon substrate; and
   vi) drying the functionalized carbon substrate.

32. The method of claim 31, wherein the storing of the functionalized carbon substrate in the polymerization fluid occurs at a temperature of 10° C. to 50° C.

33. The method of claim 31, wherein the storing of the functionalized carbon substrate in the polymerization fluid occurs for a period of time of at least 8 hours.

34. The method of claim 31, wherein the drying of the functionalized carbon substrate occurs at a temperature of 30° C. to 120° C.

* * * * *